United States Patent
Strongin et al.

(10) Patent No.: US 6,260,123 B1
(45) Date of Patent: Jul. 10, 2001

(54) METHOD AND SYSTEM FOR MEMORY CONTROL AND ACCESS IN DATA PROCESSING SYSTEMS

(75) Inventors: Geoffrey S. Strongin, Austin; Qadeer A. Qureshi, Round Rock, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/208,570

(22) Filed: Dec. 9, 1998

(51) Int. Cl.[7] ............................................ G06F 12/00
(52) U.S. Cl. .................... 711/158; 711/147; 711/150; 711/154; 711/168; 711/167; 711/169; 711/152
(58) Field of Search .................................... 711/158, 147, 711/150, 154, 168, 167, 169, 152

(56) References Cited

U.S. PATENT DOCUMENTS

| | | | |
|---|---|---|---|
| 4,796,232 | 1/1989 | House | 365/189.03 |
| 5,440,713 | 8/1995 | Lin et al. | 711/158 |
| 5,509,136 | 4/1996 | Korekata et al. | 711/151 |
| 5,630,096 | * 5/1997 | Zuraleff | 395/481 |
| 5,666,494 | 9/1997 | Mote, Jr. | 711/167 |
| 5,745,913 | * 4/1998 | Pattin | 711/105 |
| 5,761,706 | 6/1998 | Kessler et al. | 711/118 |
| 5,784,582 | 7/1998 | Hughes | 710/117 |
| 5,860,117 | * 1/1999 | Cherabuddi | 711/151 |
| 5,920,898 | * 7/1999 | Bolyn | 711/167 |
| 6,026,464 | 2/2000 | Cohen | 711/5 |
| 6,085,291 | 7/2000 | Hicks et al. | 711/137 |
| 6,104,417 | * 8/2000 | Nielsen | 345/521 |

OTHER PUBLICATIONS

Intel Corporation, *Accelerated Graphics Port Interface Specification*, Revision 1.0 (Jul. 31, 1996), pp. ii–x and 1–151.

* cited by examiner

Primary Examiner—David L. Robertson
Assistant Examiner—Kimberly McLean
(74) Attorney, Agent, or Firm—Skjerven Morrill MacPherson, LLP

(57) ABSTRACT

It has been discovered that a method and system can be produced which will, among other things, provide data processing systems having memory controllers with the ability to look ahead and intelligently schedule accesses to system memory. A method and system which improve data processing system memory access. The method and system provide a first-stage origin-sensitive memory access request reordering device, and a second-stage destination-sensitive memory access request reordering device operably coupled to said first-stage origin-sensitive memory access request reordering device. The first-stage origin-sensitive memory access request reordering device receives memory access requests having associated origin information, and reorders the memory access requests based upon the associated origin information. The first-stage origin-sensitive memory access request reordering device delivers to the second-stage destination-sensitive memory access request reordering device one or more memory access requests which the first-stage origin-sensitive memory access request reordering device has deemed to be the requests which should be next executed. The second-stage destination-sensitive memory access request reordering device receives such one or more reordered memory access requests from the first stage and, in conjunction with the state of various system memory devices, again reorders the requests on the basis of the state of various system memory devices, prior to executing the one or more requests.

75 Claims, 35 Drawing Sheets

| 4A | 4B |

FIG. 4 (4A | 4B)

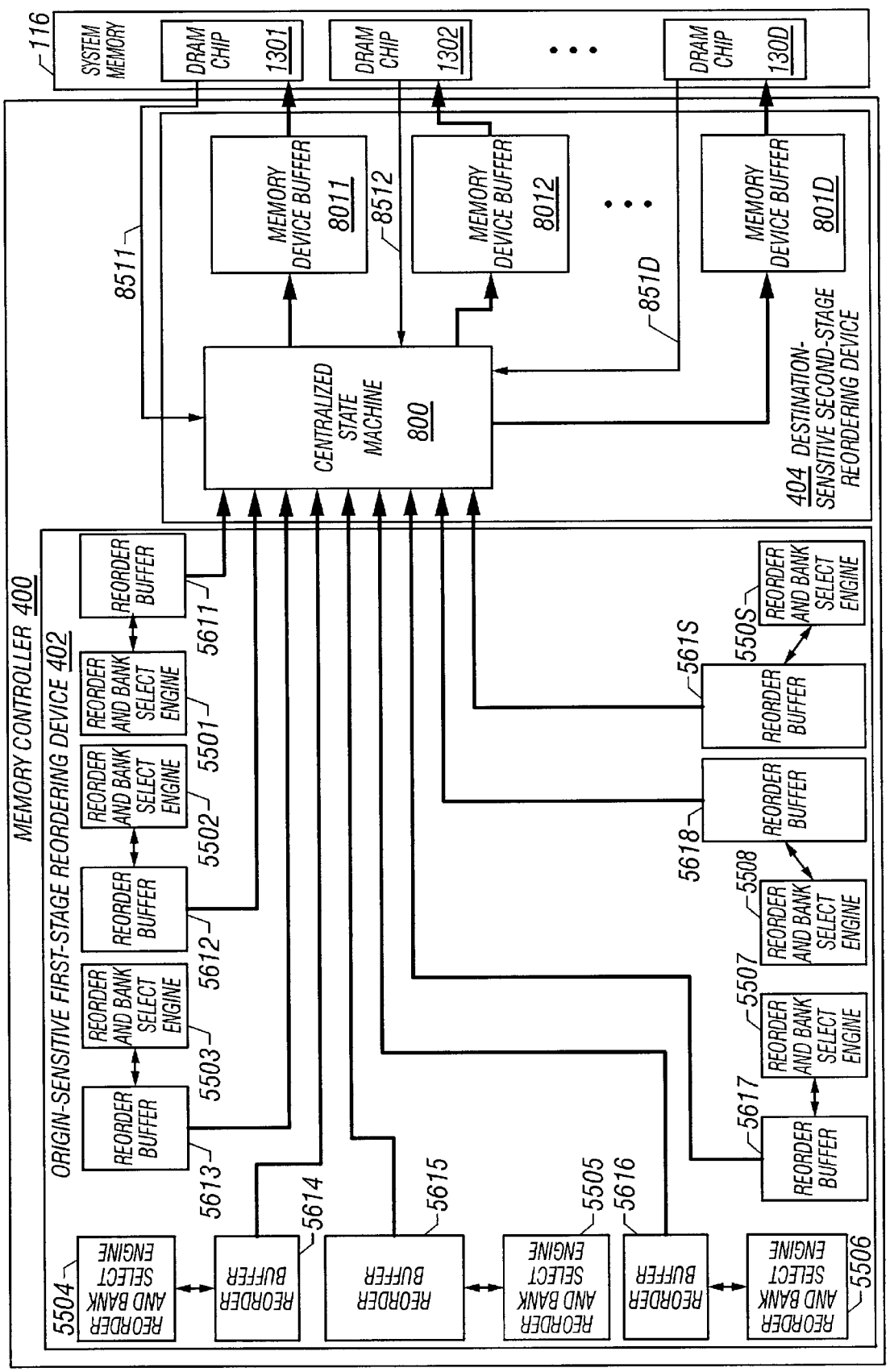
FIG. 8A1

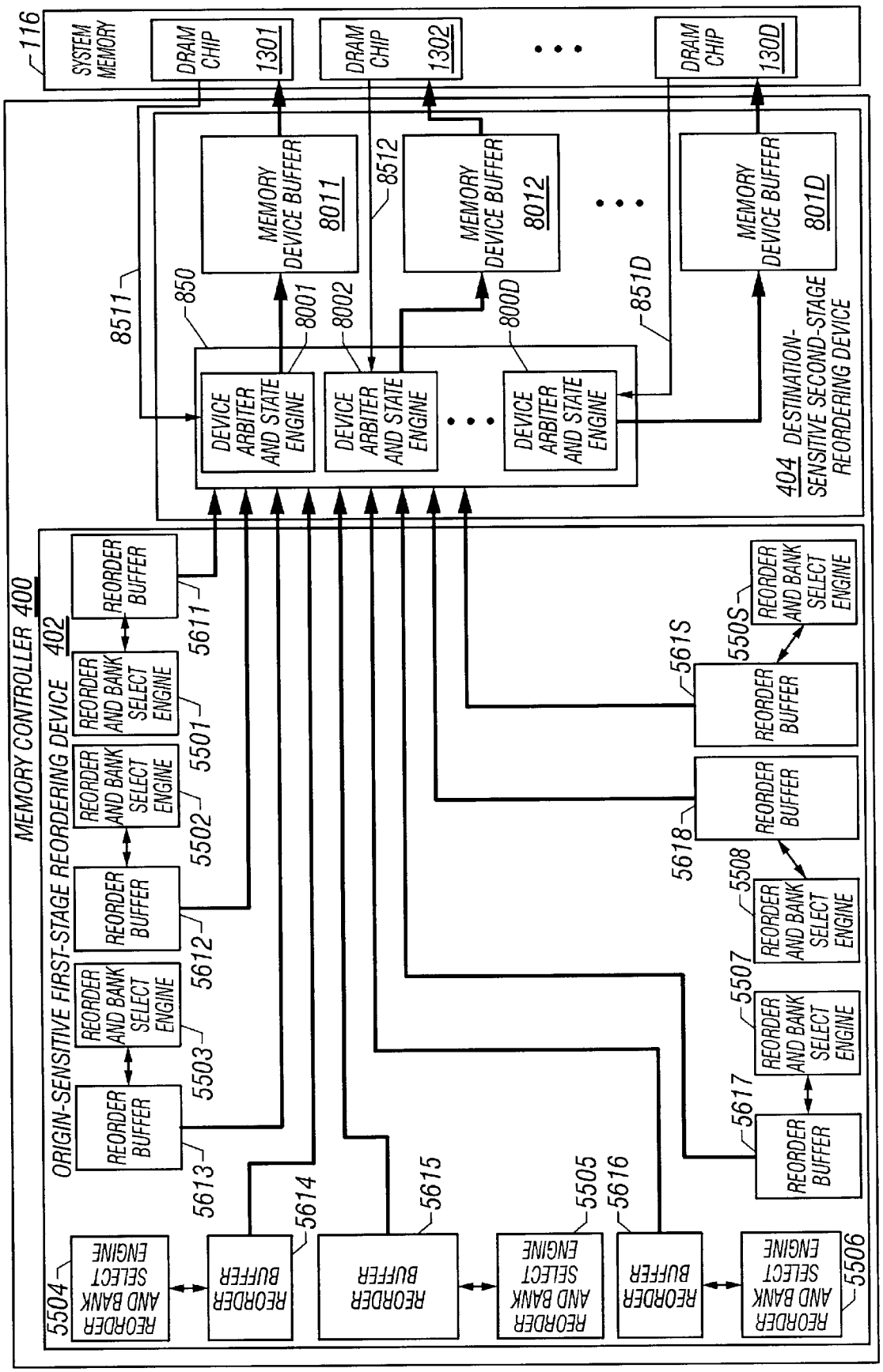
FIG. 8A2

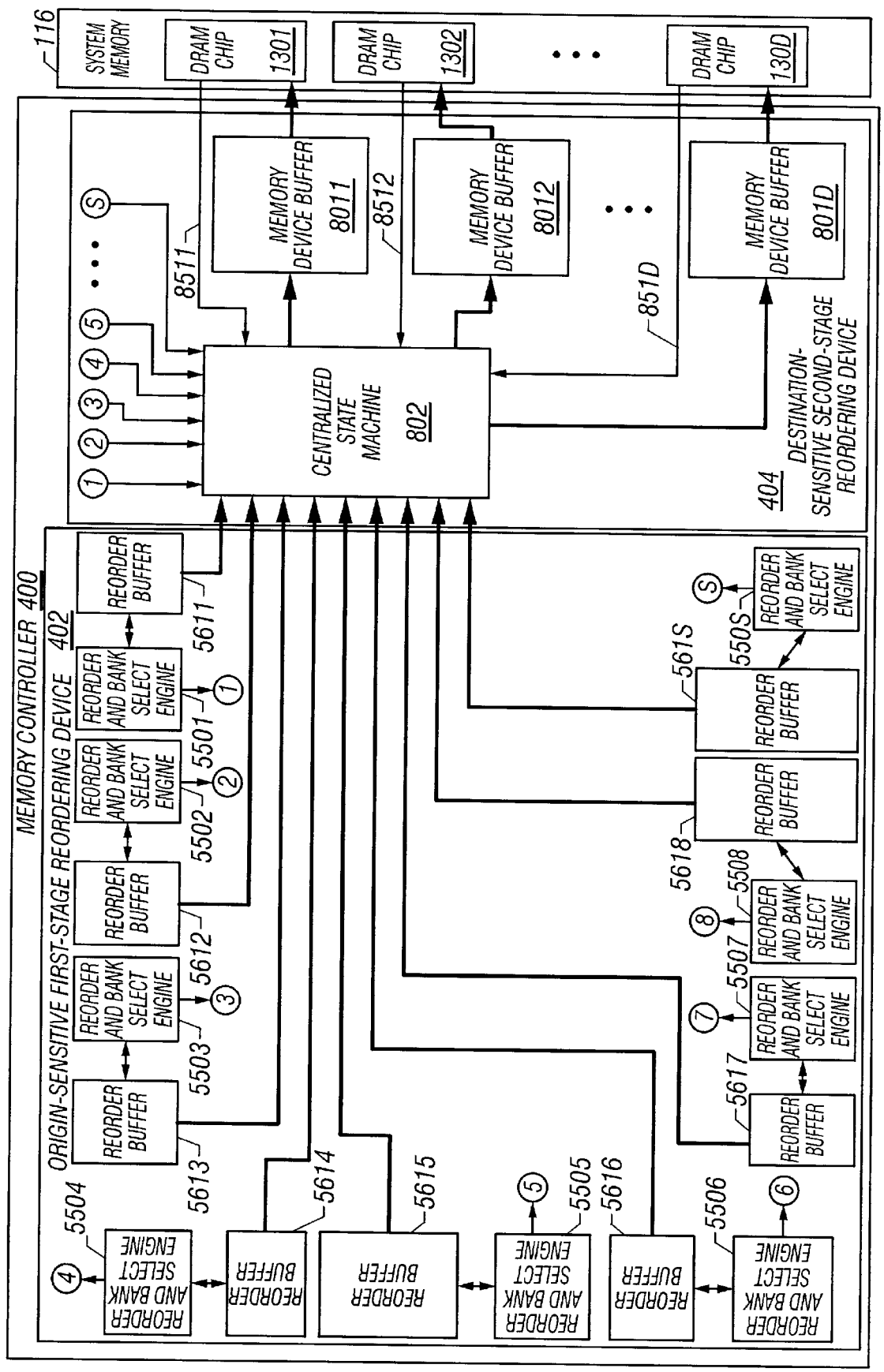
FIG. 8B1

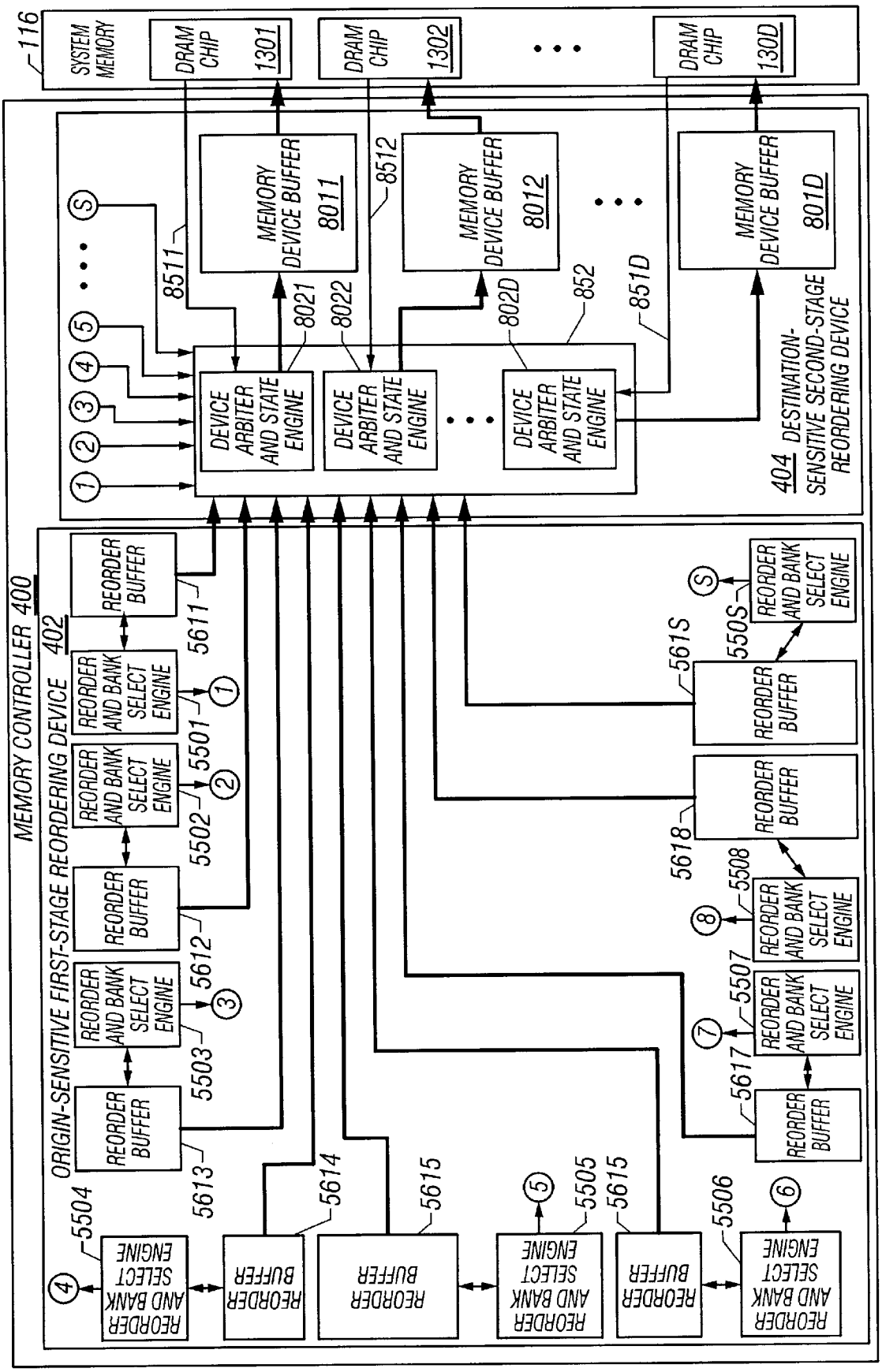
FIG. 8B2

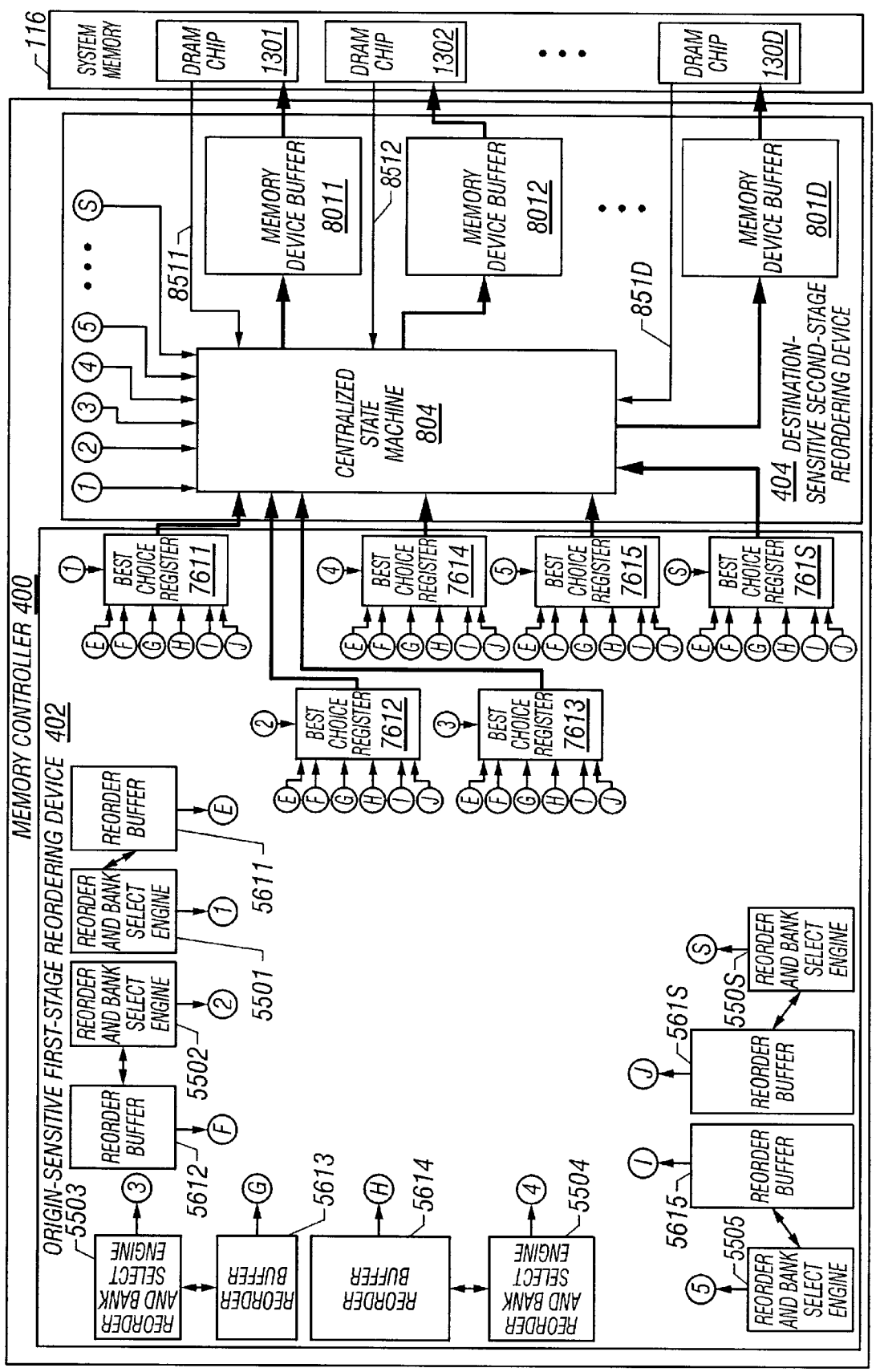
FIG. 8C1

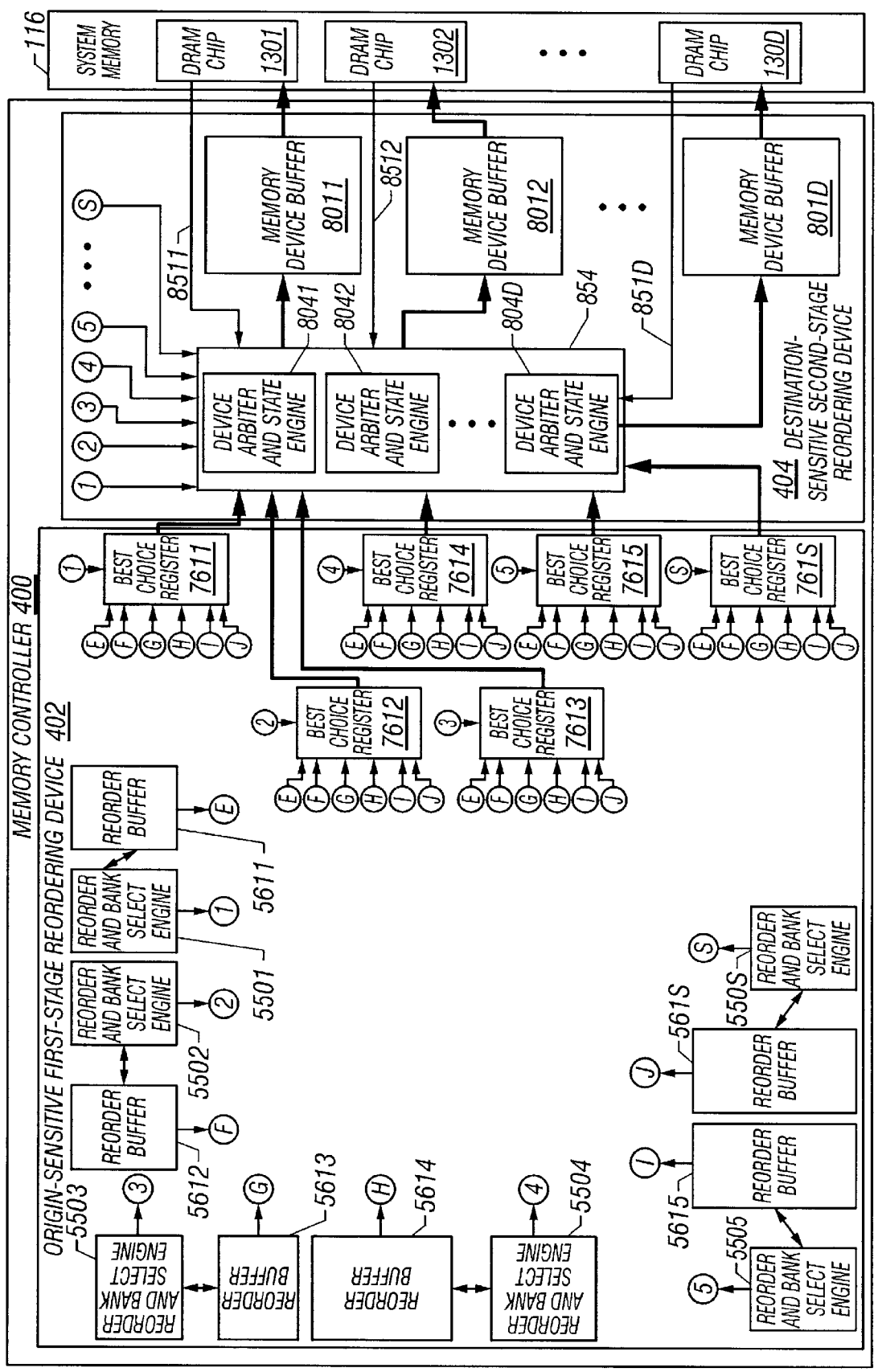
FIG. 8C2

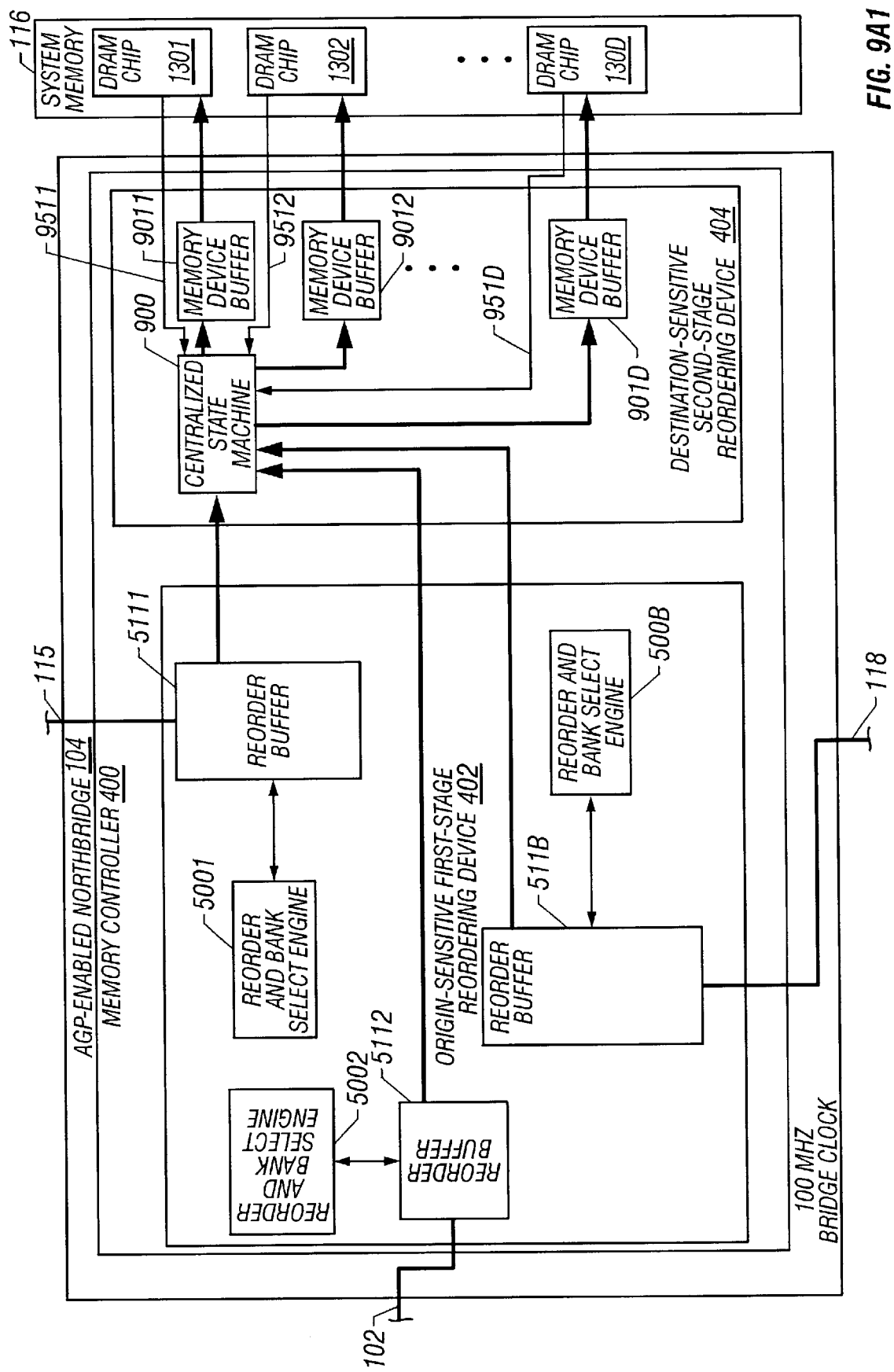
FIG. 9A1

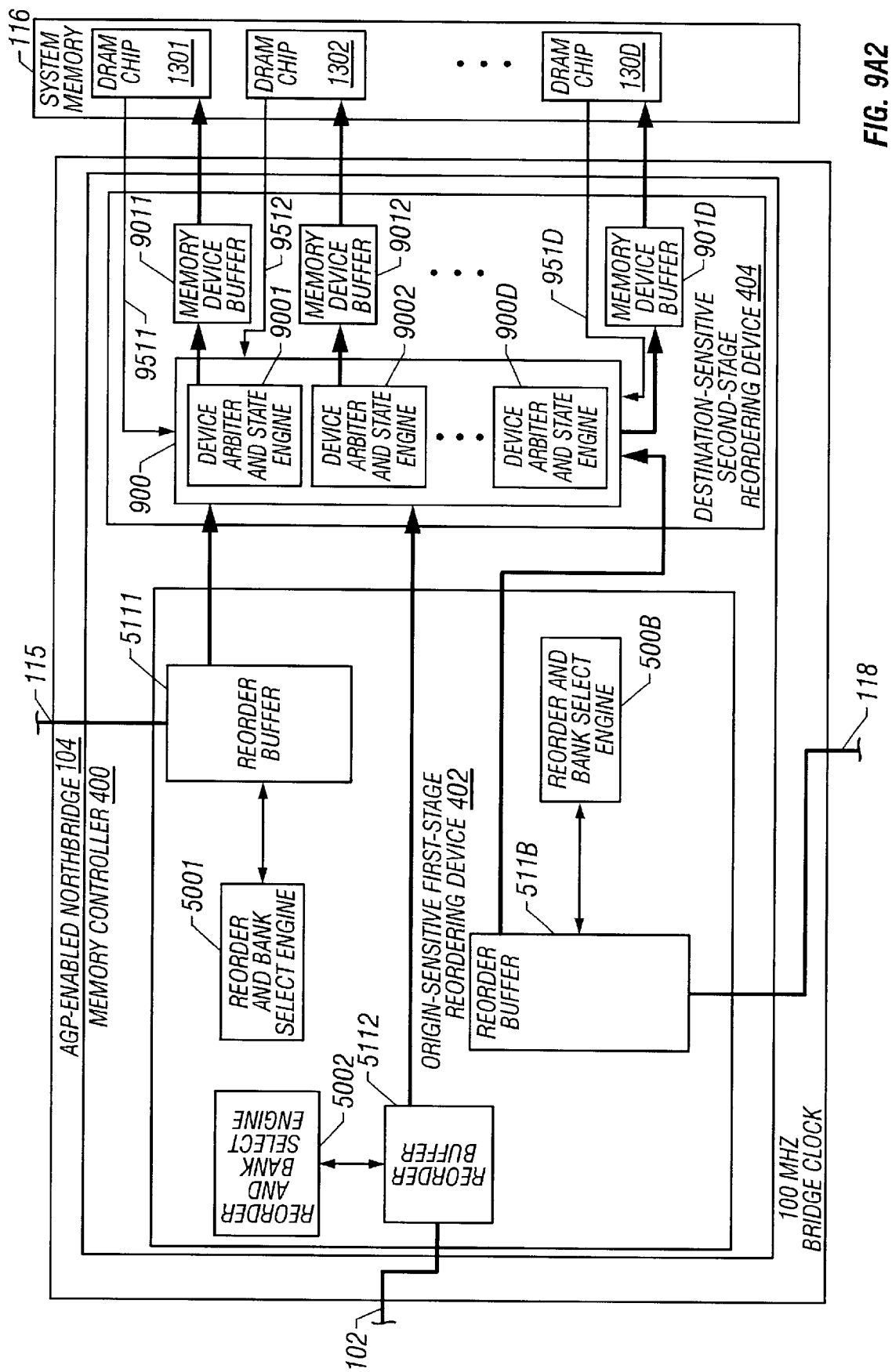
FIG. 9A2

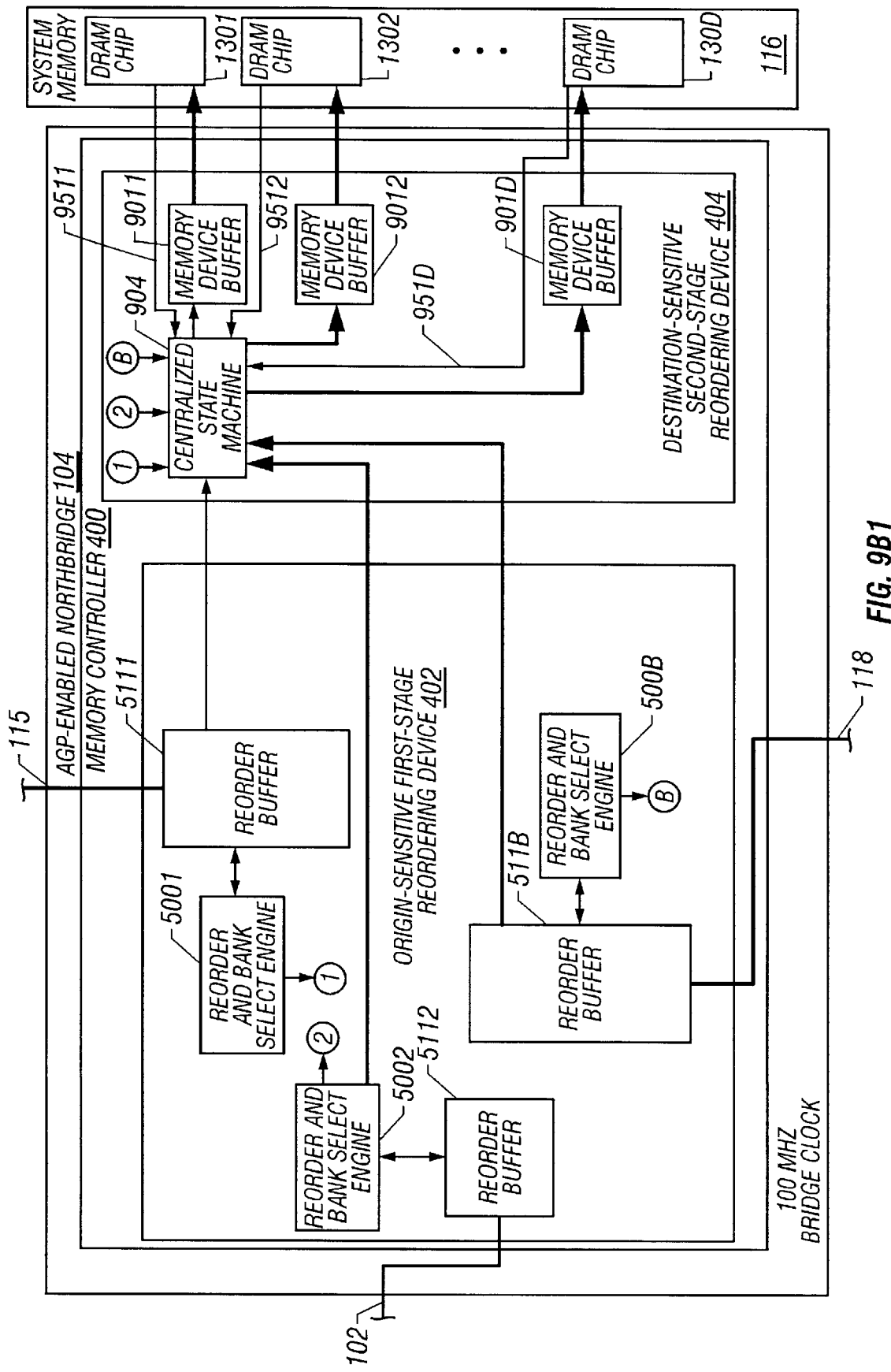
FIG. 9B1

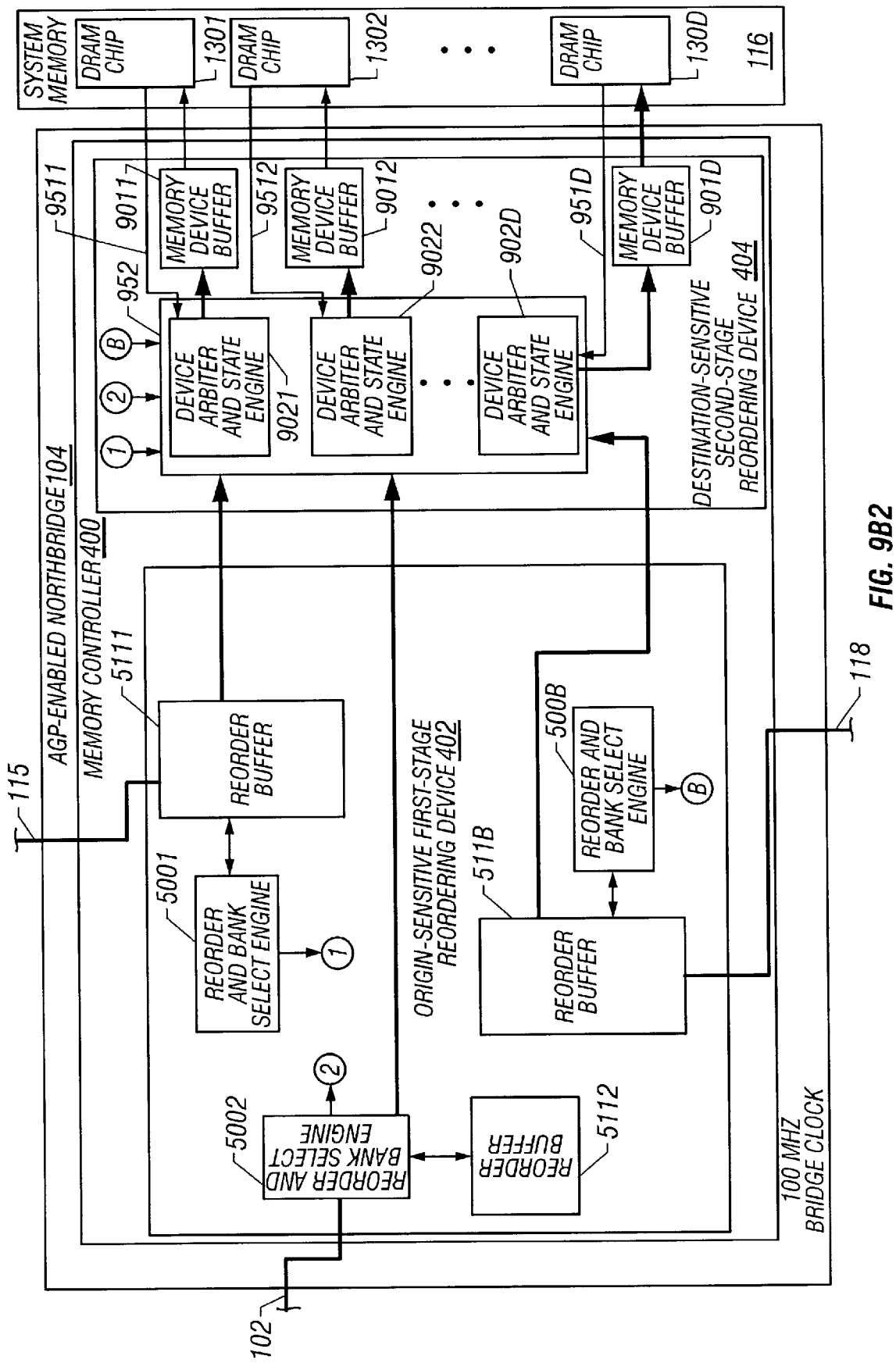
FIG. 9B2

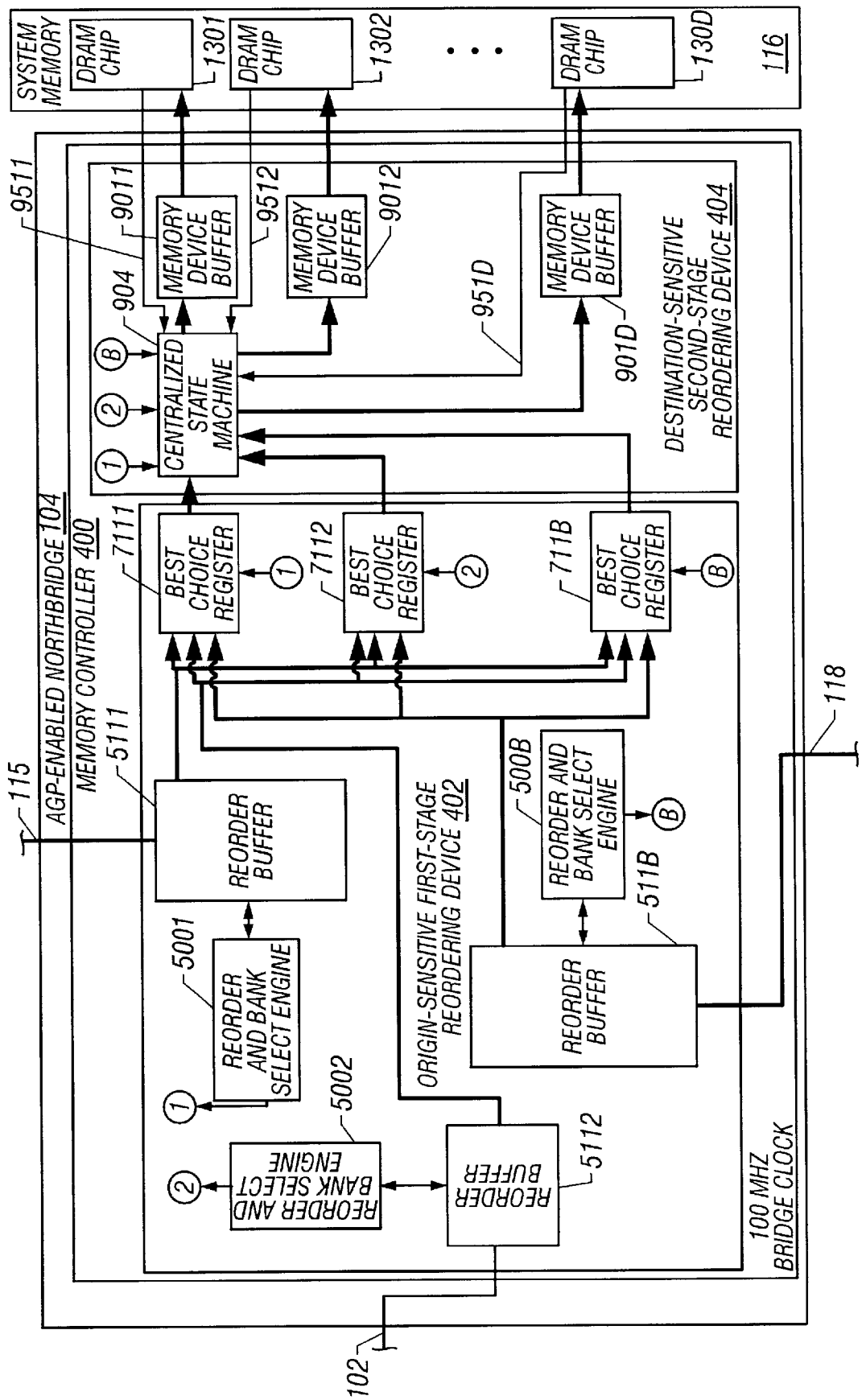
FIG. 9C1

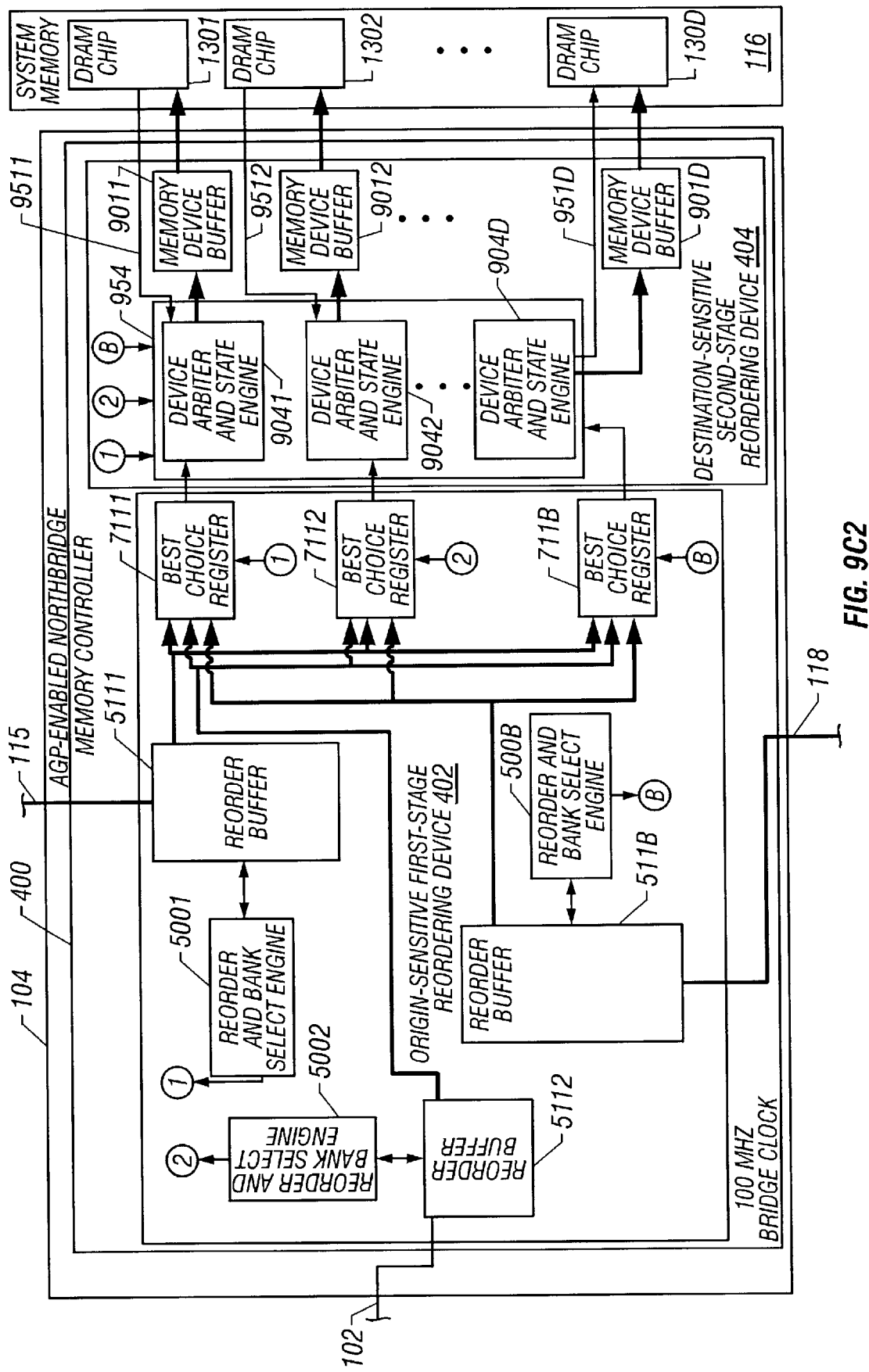
FIG. 9C2

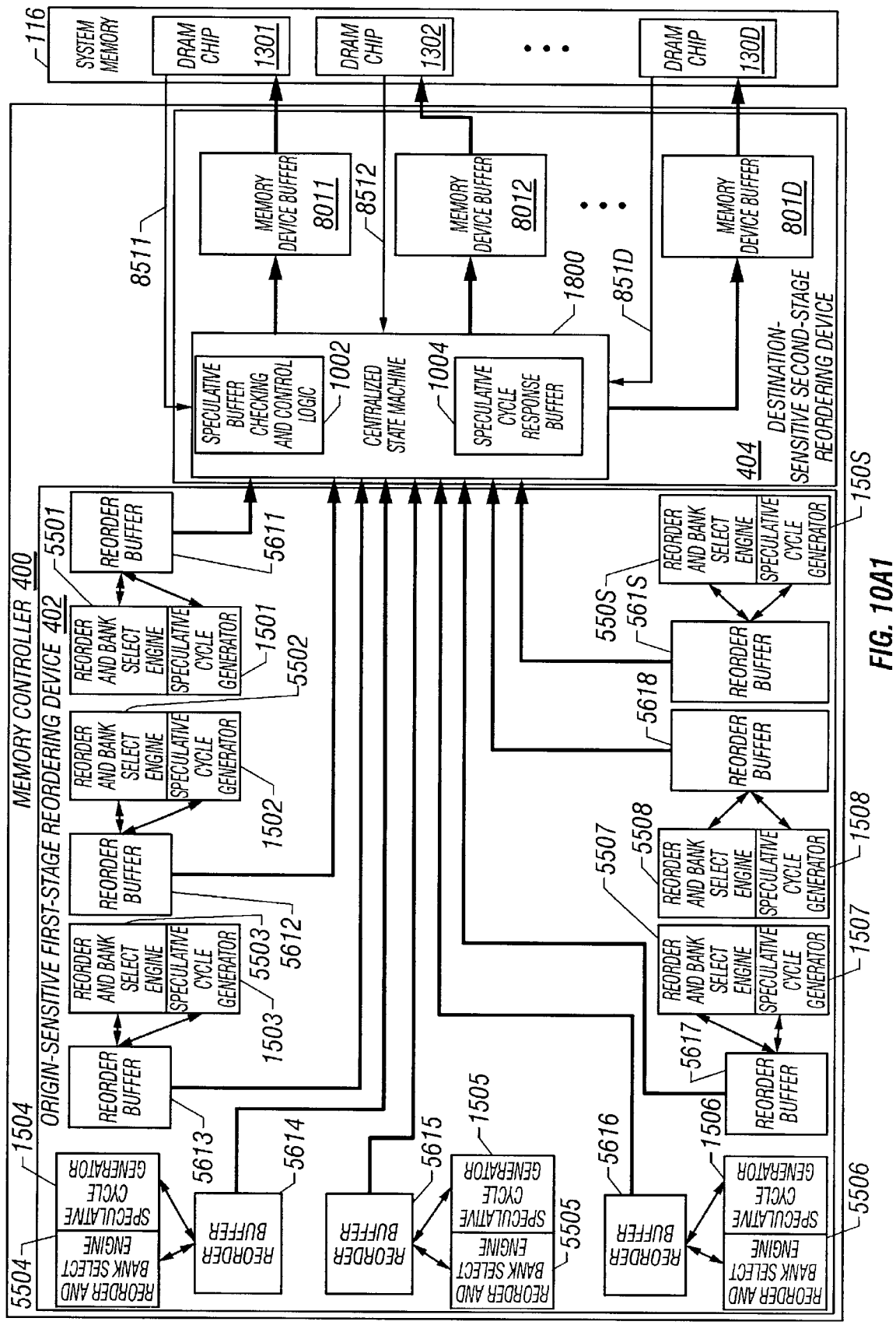
FIG. 10A1

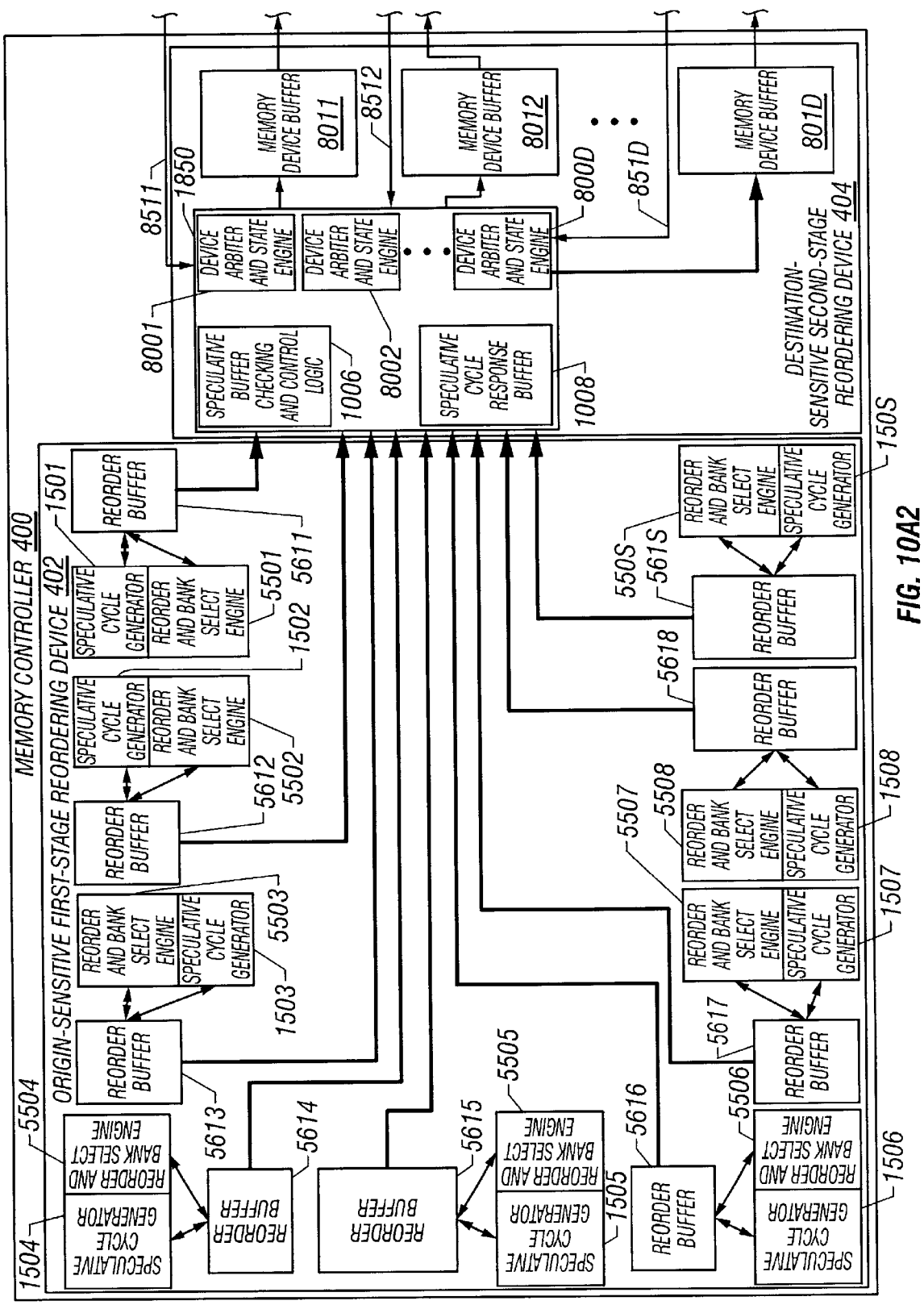
FIG. 10A2

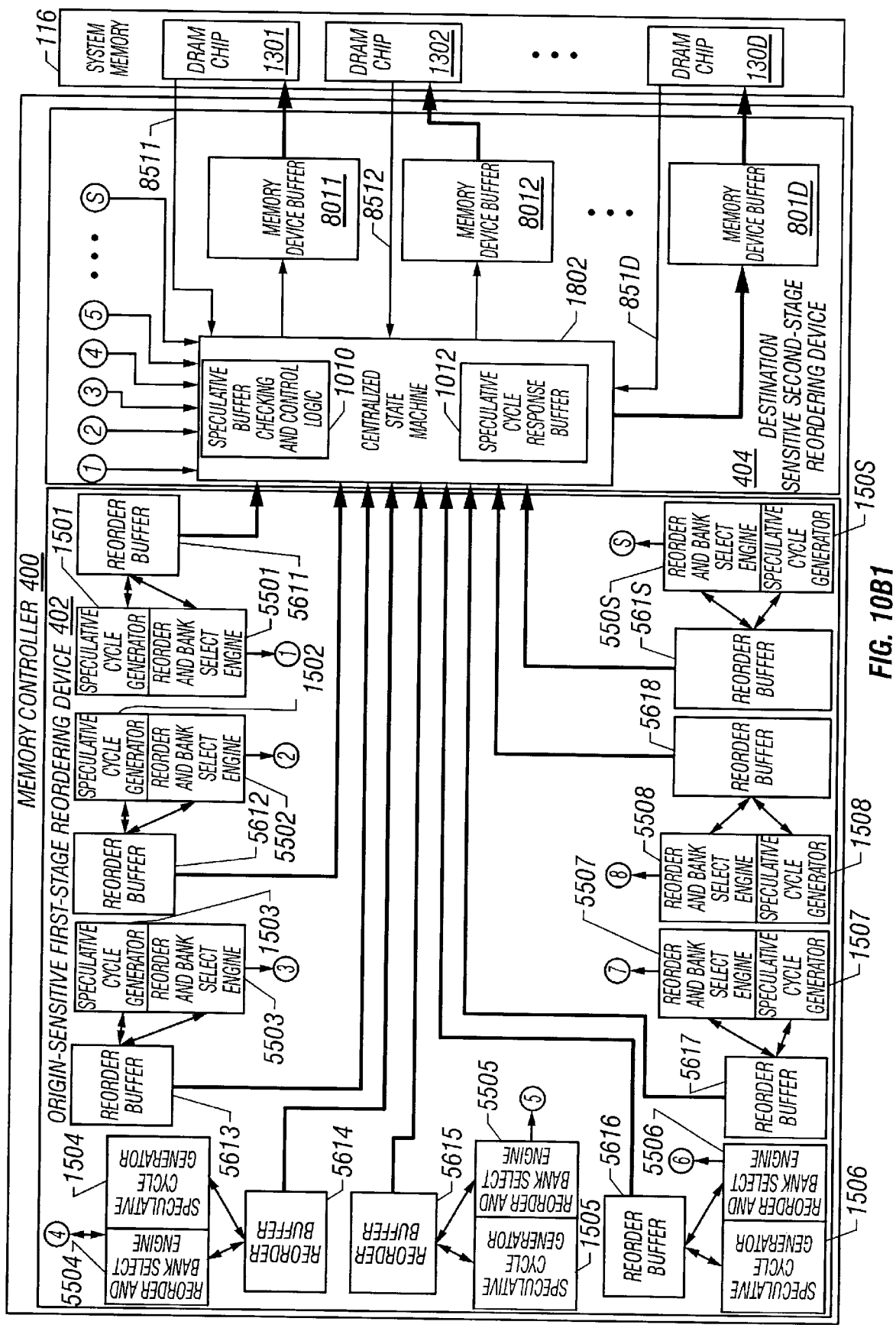
FIG. 10B1

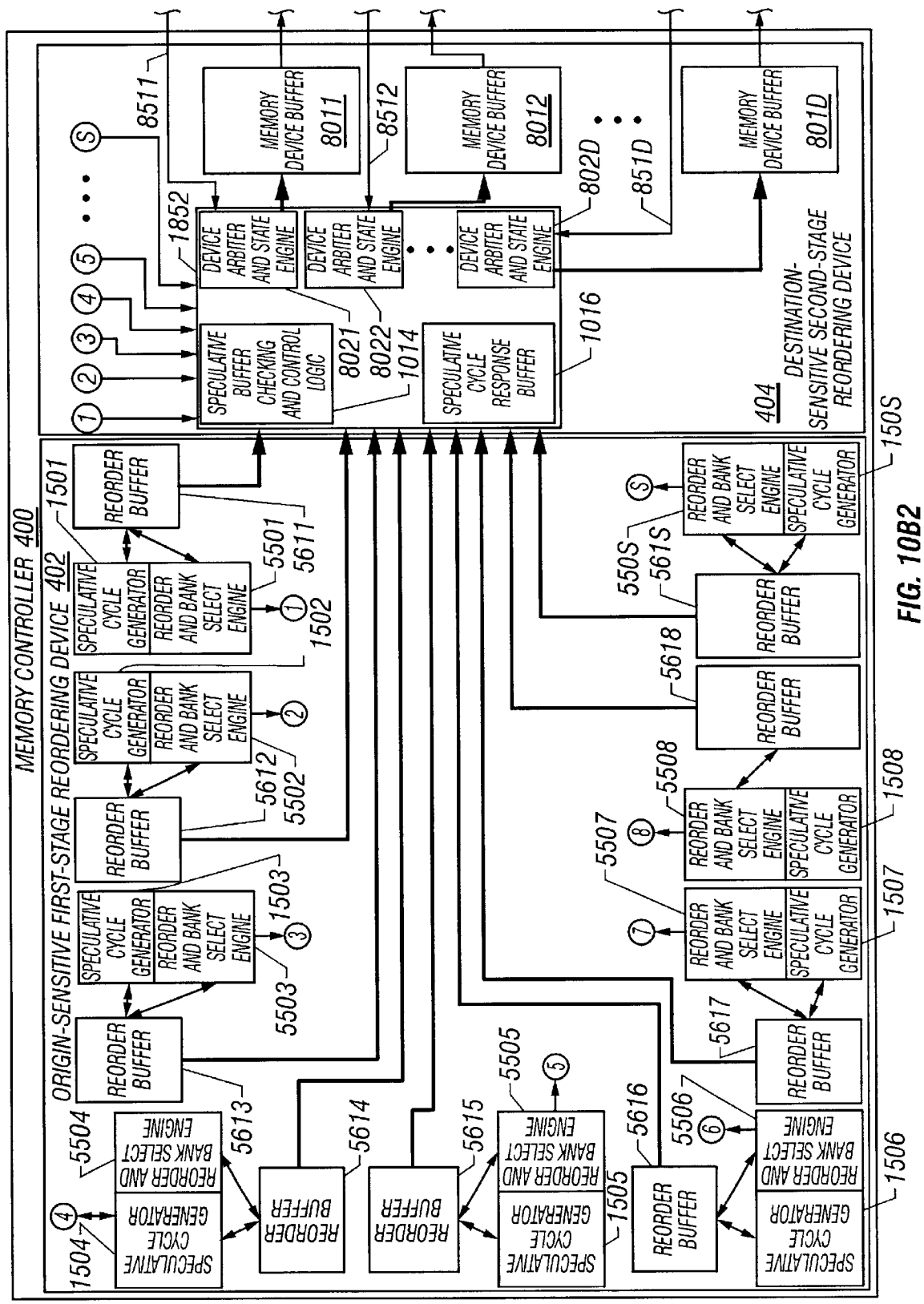
FIG. 10B2

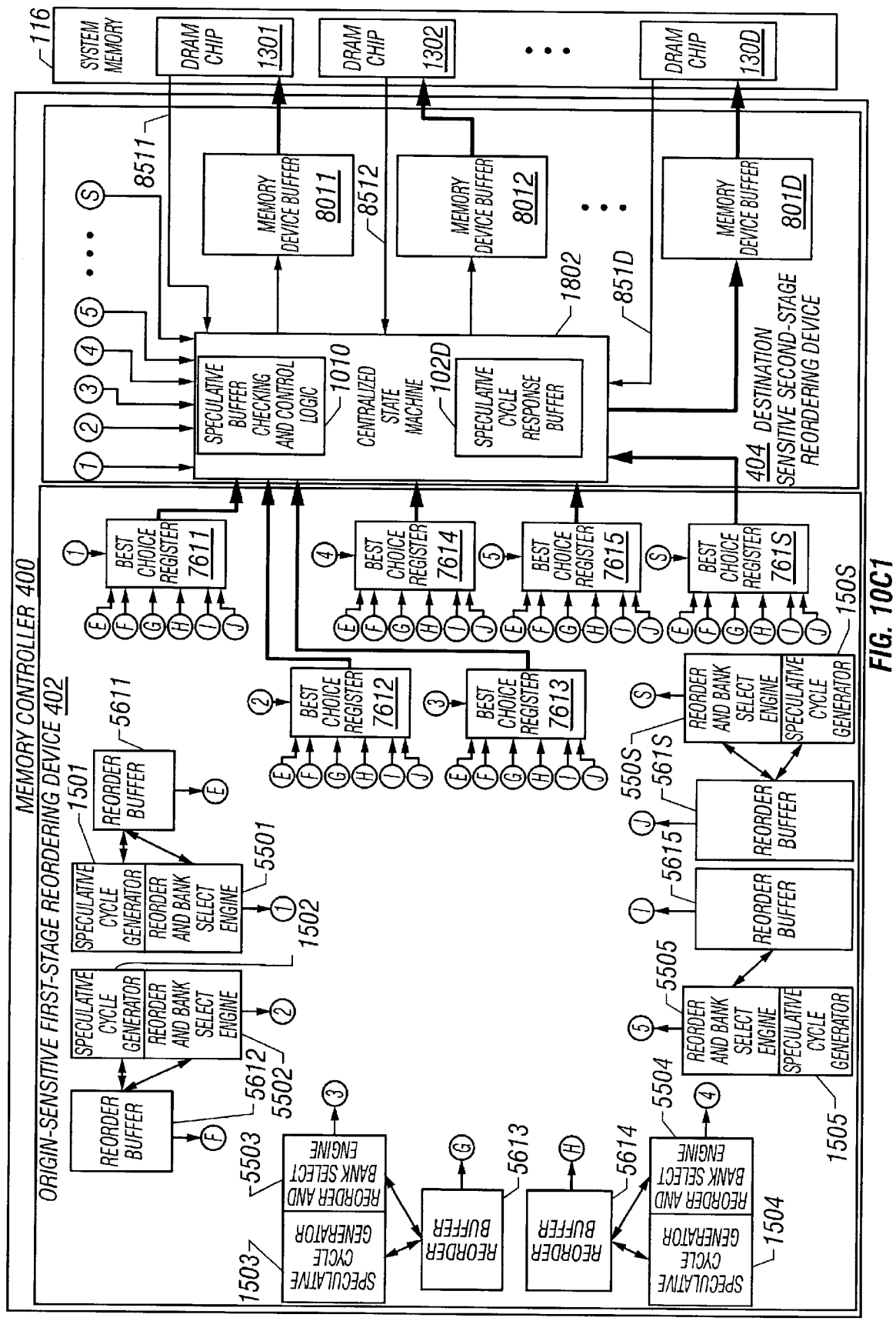
FIG. 10C1

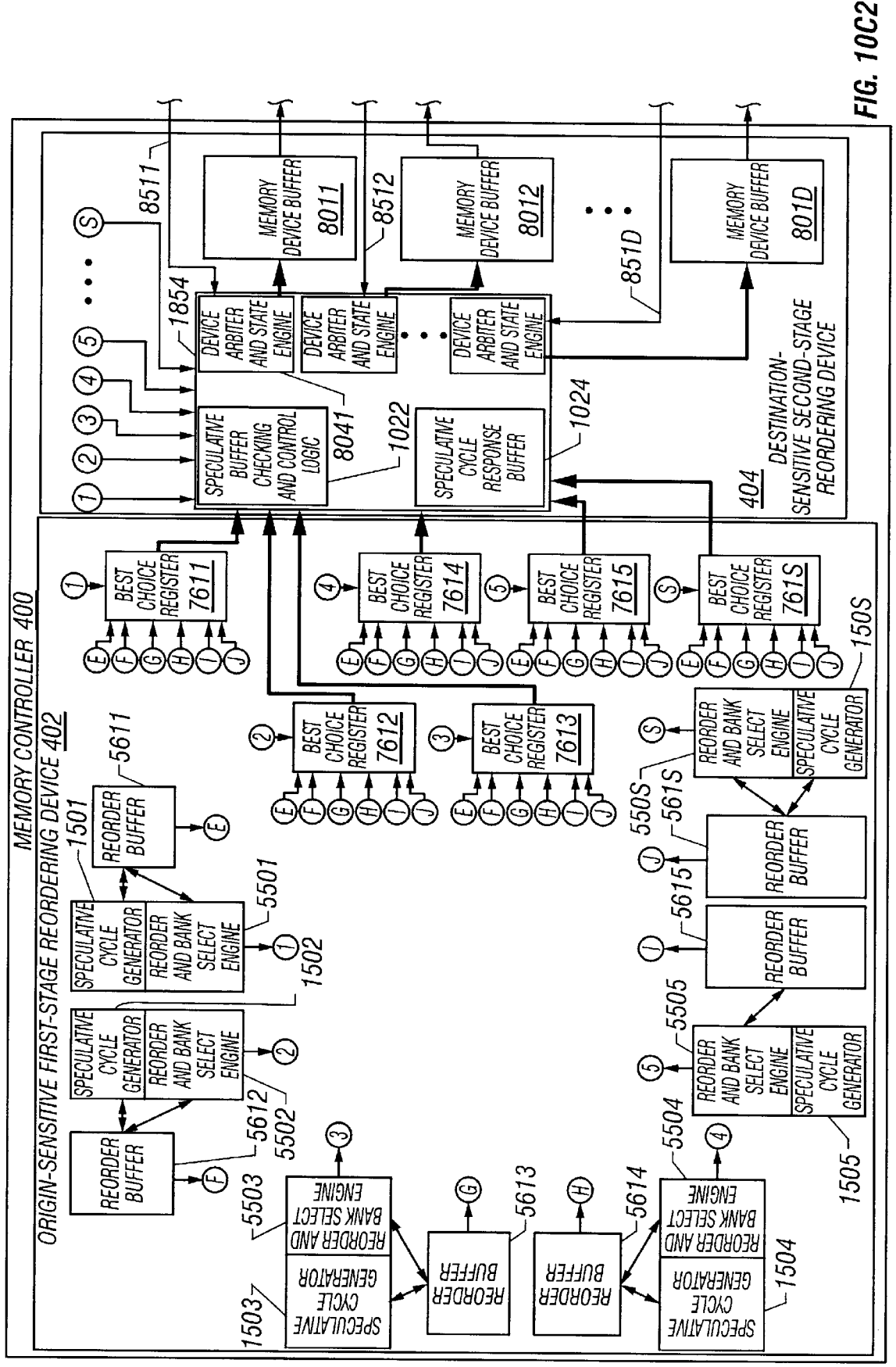
FIG. 10C2

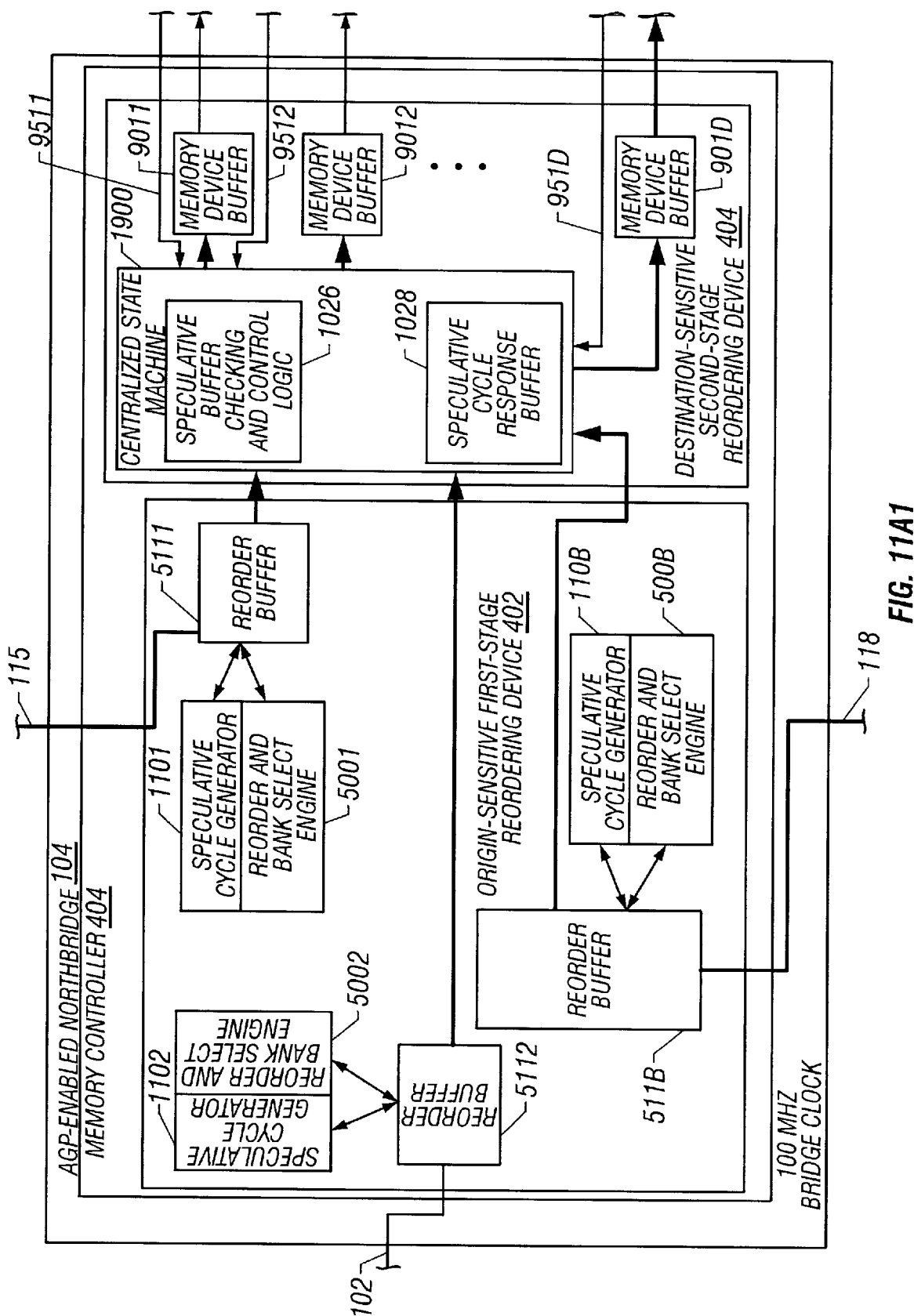
FIG. 11A1

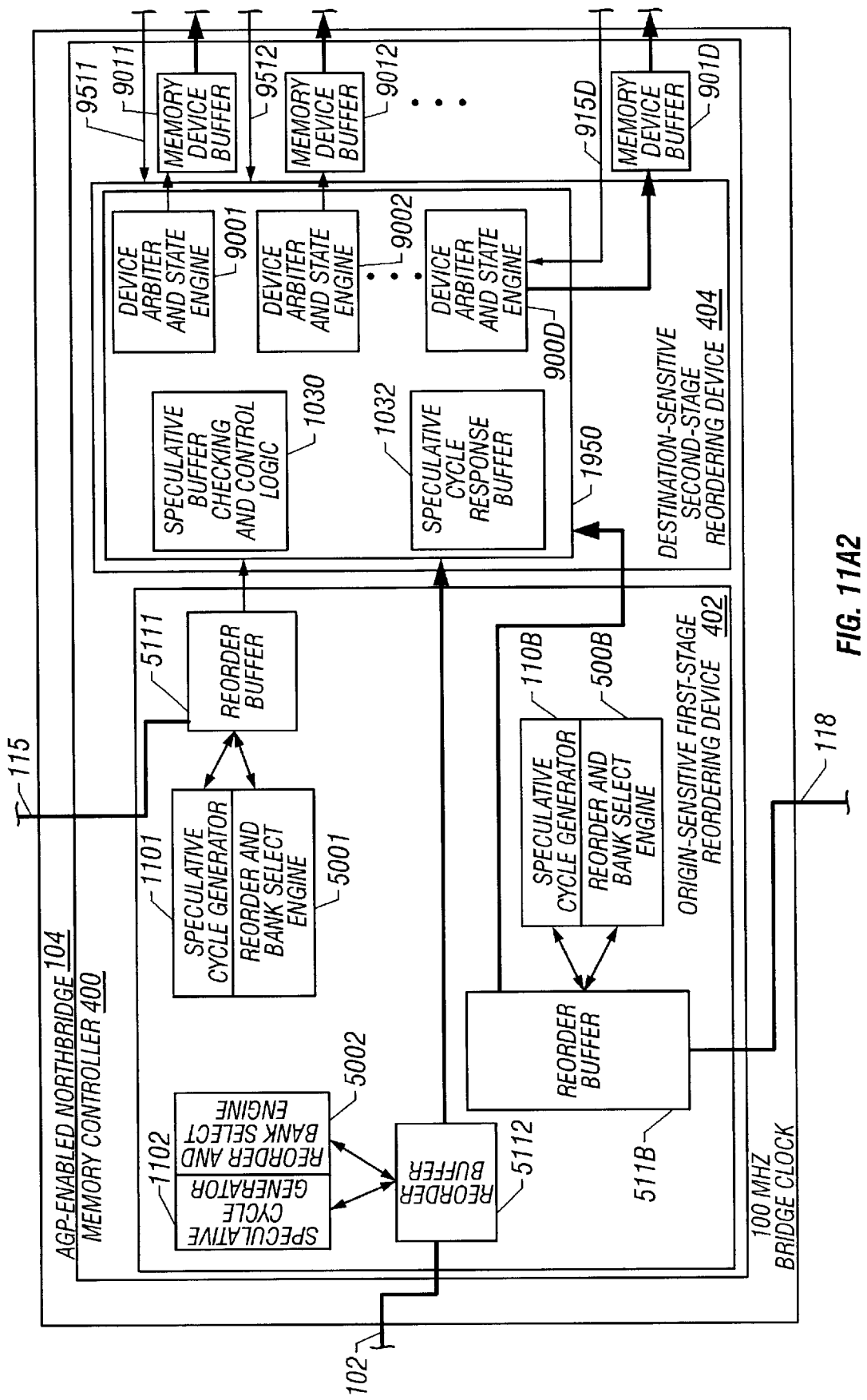
FIG. 11A2

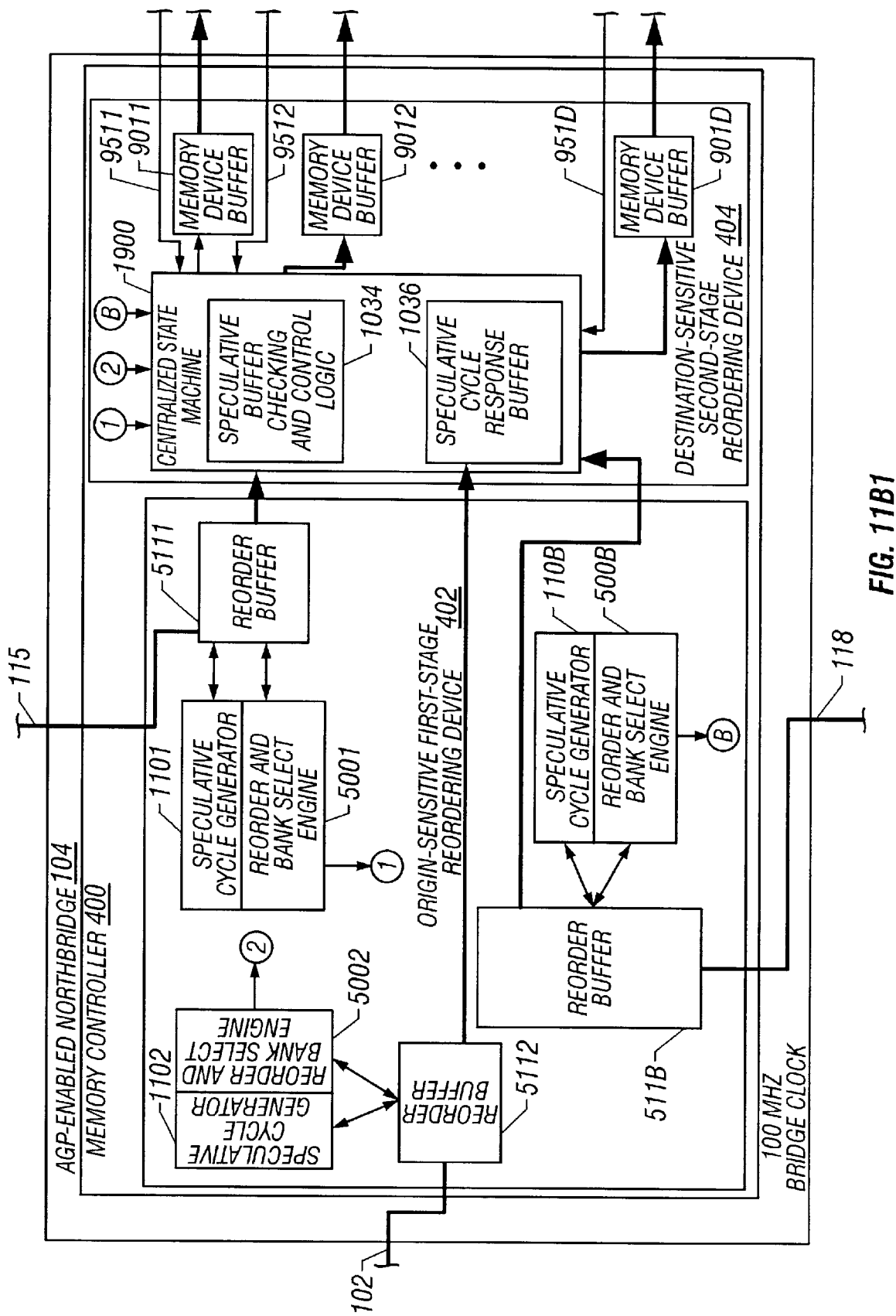
FIG. 11B1

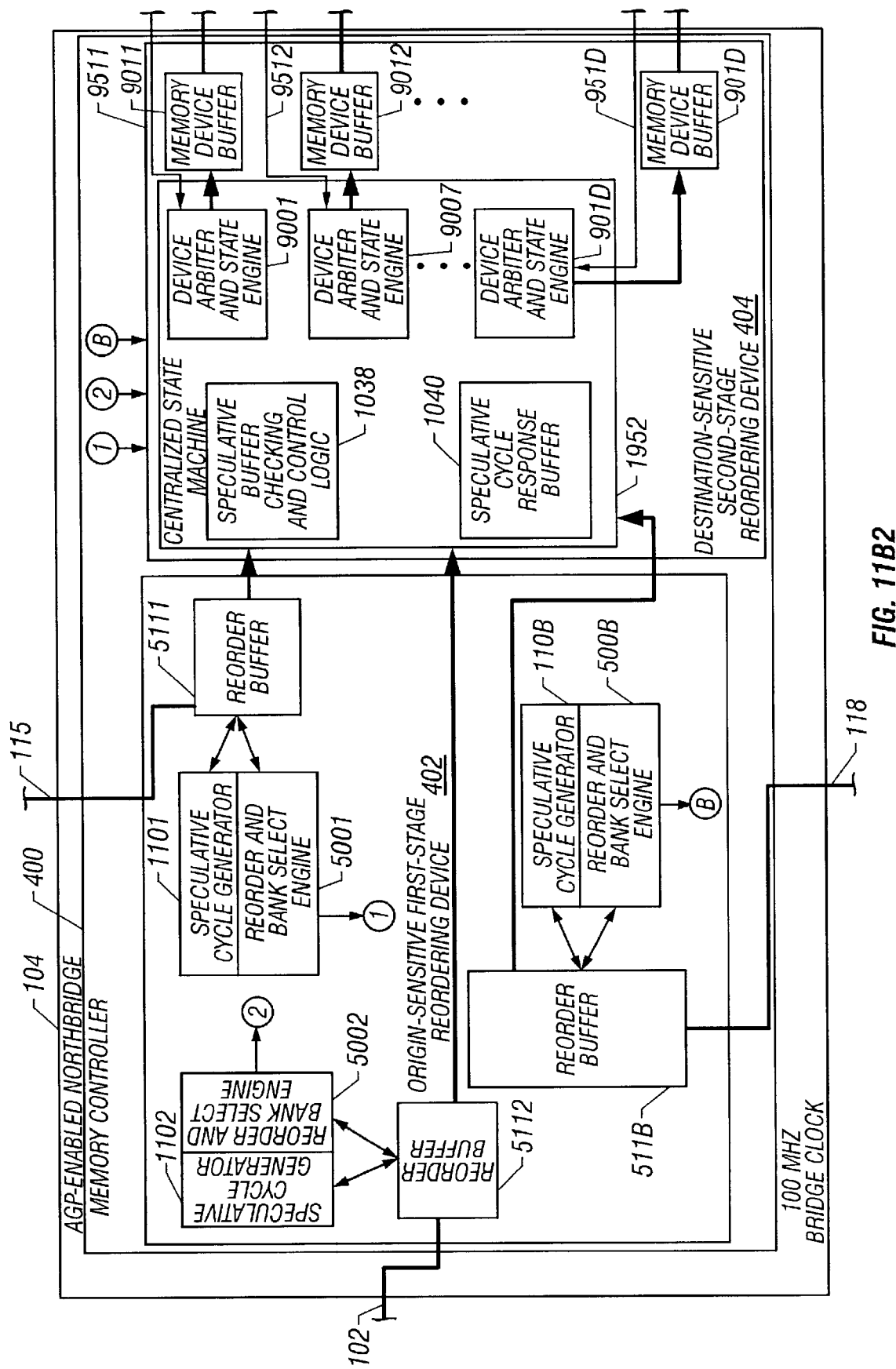
FIG. 11B2

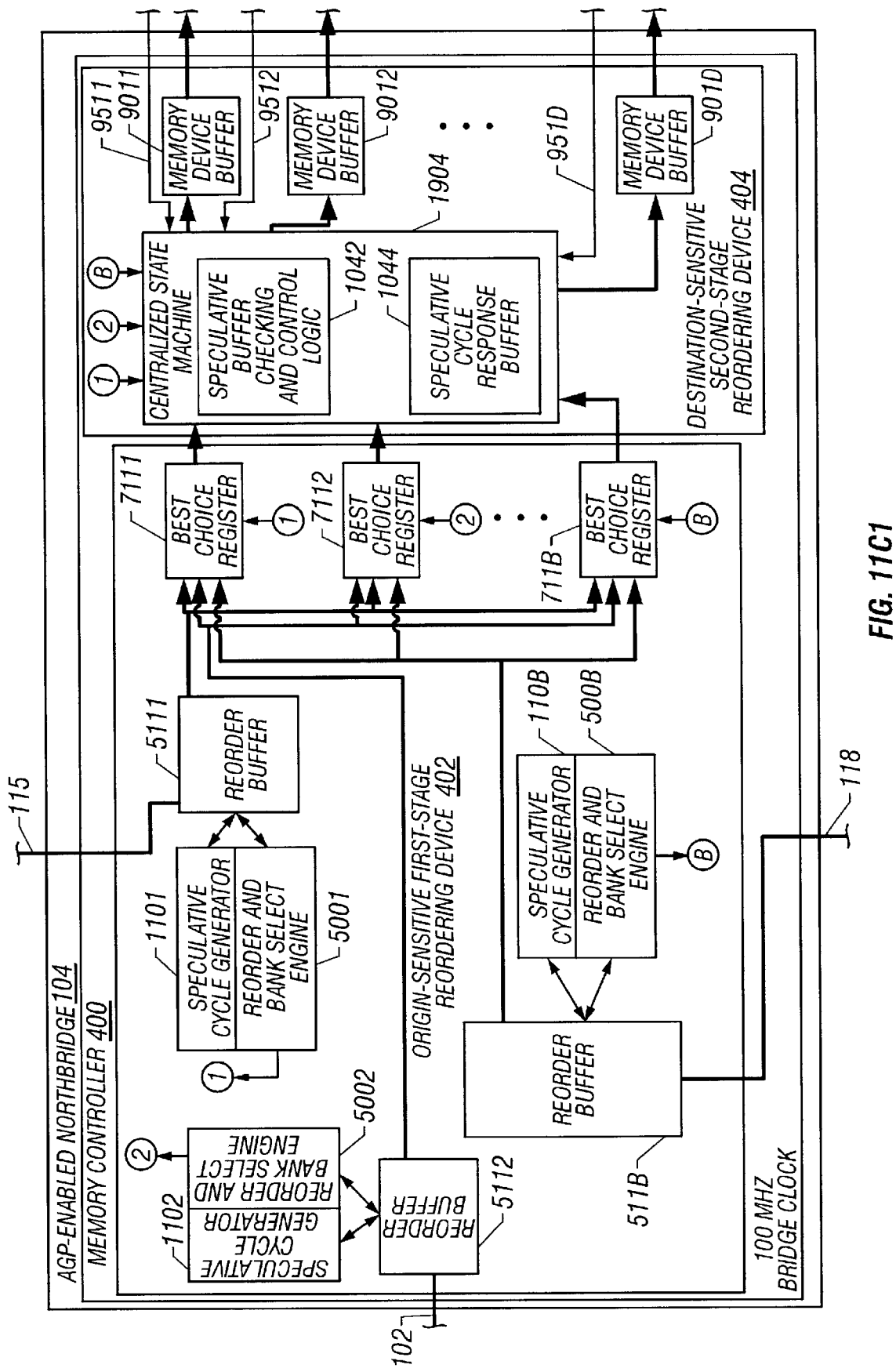
FIG. 11C1

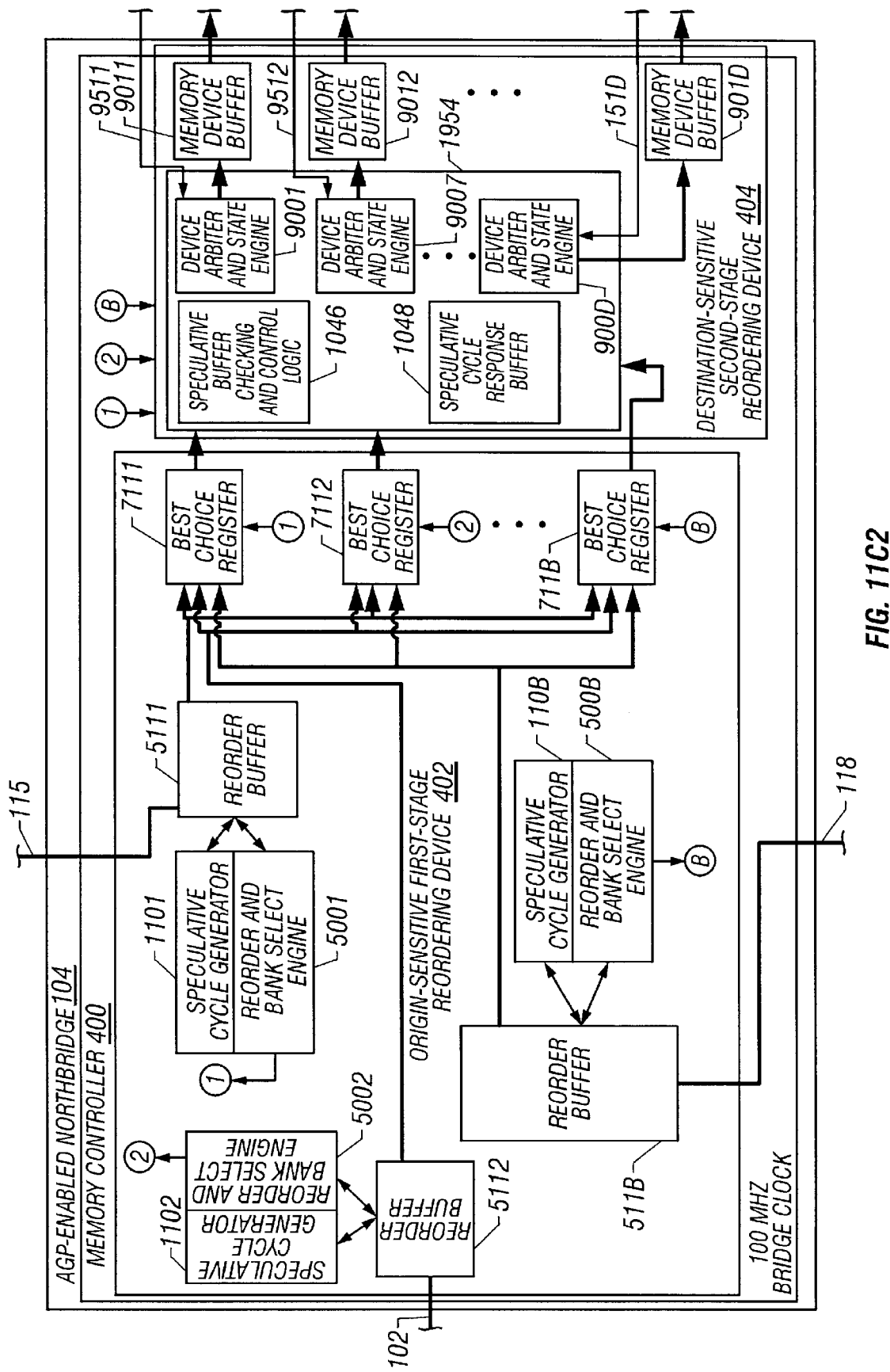
FIG. 11C2

METHOD AND SYSTEM FOR MEMORY CONTROL AND ACCESS IN DATA PROCESSING SYSTEMS

Cross-Reference

The present invention is related to subject matter disclosed in the following co-pending applications:

1. United States patent application entitled, "Method And System For Origin-Sensitive Memory Control And Access In Data Processing Systems", Ser. No. 09/208,305, naming Geoffrey S. Strongin and Qadeer A. Qureshi as inventors and filed Dec. 9, 1998, currently co-pending.
2. United States patent application entitled, "Method And System For Improved Data Access", Ser. No. 09/207,970, naming Geoffrey S. Strongin and Qadeer A. Qureshi as inventors and filed Dec. 9, 1998, currently co-pending;
3. United States patent application entitled, "Method And System For Generating And Utilizing Speculative Memory Access Requests In Data Processing Systems", Ser. No. 09/208,569, naming Geoffrey S. Strongin and Qadeer A. Qureshi as inventors and filed Dec. 9, 1998, currently co-pending;
4. United States patent application entitled, "Method And System For Destination-Sensitive Memory Control And Access In Data Processing Systems", Ser. No. 09/208,522, naming Geoffrey S. Strongin and Qadeer A. Qureshi as inventors and filed Dec. 9, 1998, currently co-pending; and
5. United States patent application entitled, "Method And System For PageState Sensitive Memory Control And Access In Data Processing Systems", Ser. No. 09/207,971, naming Geoffrey S. Strongin and Qadeer A. Qureshi as inventors, filed Dec. 9, 1998, currently co-pending, and incorporated by reference herein in its entirety.

BACKGROUND OF THE INVENTION

1. Field of the Invention

The present invention relates, in general, to a method and system to be utilized in data processing systems. In particular, the present invention relates to a method and system to be utilized in data processing systems wherein, for non-limiting example, a memory controller is utilized.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modern society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which high-performance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. Details on the PCI local bus standard can be obtained under the PCI Bus Specification, Revision 2.1, from the PCI Special Interest Group, which is hereby incorporated by reference in its entirety.

Two relatively high-bandwidth types of traffic that are communicated to and from system memory over the PCI bus are 1394 device traffic and networking traffic. The 1394 device traffic originates within a high speed serial device which communicates with a PCI bus through and over a Southbridge. The networking traffic originates within a network card which is reading network traffic information, regarding one or more networks of which the data processing system is a part, from a network buffer.

Relatively recently, techniques for rendering three-dimensional (3D) continuous-animation graphics have been implemented within PCs which have exposed limitations in the originally high performance of the PCI bus. The AGP interface standard has been developed to both (1) reduce the load on the PCI bus systems, and (2) extend the capabilities of systems to include the ability to provide 3D continuous-animation graphics with a level of quality previously found only on high-end computer workstations. The AGP interface standard adds an additional bus to data processing systems: the AGP Interconnect. The AGP interface standard is defined by the following document: Intel Corporation, *Accelerated Graphics Port Interface Specification*, Revision 1.0 (Jul. 31, 1996).

The AGP interface standard reduces the load on PCI bus systems and extends the capabilities of systems to include the ability to provide 3D continuous-animation graphics via a rather indirect process. Under the AGP interface standard, a CPU independently processes the geometric and texturing data (geometric and texturing data are data necessary to properly define an object to be displayed) associated with each object to be displayed in a scene. Subsequent to processing the geometric and texturing data, the CPU writes the geometric and texturing data back into system memory. Thereafter, the CPU informs a graphics processor that the information is ready, and the graphics processor retrieves the information from the system memory.

In current industry architectures, each preceding discussed bus (e.g., the system bus, the AGP interconnect, and the PCI bus) independently articulate with the system memory through a device known as the Northbridge. The various communications with, or accesses of, system memory are generally controlled by a device within the Northbridge known as a "memory controller".

A memory controller controls system memory which is typically a collection of Direct Random Access Memory chips (DRAMs). The computer system memory, composed of DRAMs, can store data, but there is conventionally no intelligence in the system memory. The intelligence concerning how data is going to be stored, where the data is going to be stored, how the data is going to be read or written, etc., is provided by the "memory controller".

The memory controller controls access to system memory, which has been noted is typically composed of DRAMs. A DRAM can be thought of as a collection of cells, or storage locations, wherein data is stored. For simplicity it will be assumed here that each cell stores a byte, but those skilled in the art will recognize that other storage sizes are possible.

When a memory access, such as a read cycle, is engaged in, the memory controller is given an address by another device, such as a graphics controller. That address needs to correctly specify one of the cells where data is actually stored. Ordinarily, cells within DRAMs are arranged in row and column format (i.e., the cells are arranged like a matrix).

Consequently, an address, which for sake of illustration will be assumed to be 16 bits long, customarily is conceived of as being composed of two parts: a first 8-bit portion of the address which is associated with a row address, and a second 8-bit portion which is associated with a column address (again, the bit lengths are hypothetical and merely utilized here for illustrative purposes). This fragmentation of the address into row and column portions allows the address to correctly specify a storage location, or cell, by its row and column.

Conventionally, a DRAM has at least two buses, or at least hypothetically what can be treated as two buses: a data bus, and an address bus. To minimize DRAM hardware, it is customary that the address bus be only eight bits wide, in order to minimize the number of pins on the DRAM, which those skilled in the art will recognize is a major constraint or limiting factor on how small one can make a DRAM chip. Due to this limitation on the width of the address bus, memory access is typically achieved by first placing the row portion of the address on the address bus, which will select the appropriate row, and second, a short time later, placing the column portion of the address on the address bus, which will select the appropriate column. This then correctly specifies the row and column location of the storage location that is desired. At some time after the row and column information have both been specified, the data from the memory location specified by the row and column address appears on the DRAM data bus.

From the foregoing, it can be seen that in order to make a single memory access there are three phases: a row address phase, a column address phase, and a data retrieval phase. In the past, it was noticed that typical programs tend to operate sequentially, so if there is a memory address accessed, it is likely that the next memory address accessed will be the very next cell, which means that the column address is likely to change, while the row address is not likely to change. Consequently, typical DRAMs are structured such that once the row address has been driven, thereafter the DRAM responds to new addresses on the address bus as if those addresses are column indicators, and thus will use such addresses as column addresses within a current row until the DRAM is notified that a new row address will be appearing on the address bus, or the extent of the columns within the row is exceeded and a page fault occurs. DRAM devices using this scheme (driving the row once and then operating upon columns within the row) are known in the art as "page mode" DRAMs.

In light of the foregoing, in the event that a memory controller has several memory accesses to be done sequentially, then once a page is open it would make sense (but it is not currently done in the art) from an efficiency standpoint to examine pending as well as current memory accesses in order to determine which of those pending memory accesses will be to memory locations that are within a currently open page (that is, the row of the request is the row from which a memory controller is currently reading within a DRAM). In other words, assuming a page X is open, if there are four memory accesses A, B, C, and D, waiting to be performed, and assuming the first access A is to page Z, the second access B is to page X, the third access C is to page Y, and the fourth access D is to page W, it is preferable from a memory efficiency standpoint that the data access (i.e., access B) appropriate to the page that is open (i.e., page X) be made first.

Current memory controllers do not typically "look ahead" to see if certain pending memory accesses are destined for currently open pages. Furthermore, at any given time, typically more than one page of memory is generally open and in future systems this will become more likely. For example, under the Direct RDRAM scheme (not currently available, but expected to be available in the near future), it is expected that up to 8 pages per RDRAM chip will be open simultaneously. Thus, if a system has eight RDRAM chips (a reasonable assumption), it will be possible to have up to 64 pages open simultaneously.

Controlling memory access via the use of "look ahead" would be undeniably valuable. Furthermore, as the foregoing has shown, the prospective ability of the memory controllers to schedule memory access on the basis of look ahead is likely become even more important in that future system memories are likely to be able provide a very large number of open pages of memory simultaneously. It is therefore apparent that a need exists in the art for a method and system which will provide data processing systems, having memory controllers, with the ability to look ahead and intelligently schedule accesses to system memory utilizing information gained from such looking ahead.

In addition to the foregoing, it has been noted that multiple devices (e.g., one a or more CPUs, PCI bus devices, 1394 devices, and network devices) communicate over various different buses in order to access data processing system memory through a memory controller. Different types of devices have different types of memory access needs as do different data buses. At present, current data processing system memory controllers do not recognize and/or utilize the differing memory access requirements of the various devices, or the different access requirements of the buses over which they communicate, in order to efficiently schedule data processing system memory access. It is therefore apparent that a need exists for a method and system which will provide data processing systems, having memory controllers, with the ability to recognize and take advantage of the varying needs of differing devices and/or the needs of the various data buses through which such devices communicate with data processing system memory.

SUMMARY OF THE INVENTION

It has been discovered that a method and system can be produced which will, among other things, provide data processing systems having memory controllers with the ability to intelligently schedule accesses of system memory. The method and system provide a first-stage origin-sensitive memory access request reordering device, and a second-stage destination-sensitive memory access request reordering device operably coupled to the first-stage origin-sensitive memory access request reordering device. The first-stage origin-sensitive memory access request reordering device receives memory access requests having associated origin information, and reorders the memory access requests based upon the associated origin information. The first-stage origin-sensitive memory access request reordering device delivers to the second-stage destination-sensitive memory access request reordering device one or more memory access requests which the first-stage origin-sensitive memory access request reordering device has determined to be the requests which should next be executed. The second-stage destination-sensitive memory access request reordering device receives such one or more reordered memory access requests from the first stage and, in conjunction with the state of various system memory devices, again reorders the requests to take advantage of the state of various system memory devices, prior to executing one or more requests.

In one embodiment, the first-stage origin-sensitive memory access request reordering device further includes one or more reorder and bank select engines, at least one of the one or more reorder and bank select engines associated with at least one origin of one or more memory access requests. In another embodiment, the one or more reorder and bank select engines, at least one of the one or more reorder and bank select engines associated with at least one origin of one or more memory access requests, further include one or more reorder buffers, at least one of the one or more reorder buffers associated with the at least one origin of one or more memory access requests; and at least one of the one or more reorder and bank select engines operably coupled to at least one of the one or more reorder buffers. In another embodiment, the one or more reorder buffers, at least one of the one or more reorder buffers associated with the at least one origin of one or more memory access requests, further include the at least one of the one or more reorder buffers associated with at least one bus. In another embodiment, the at least one bus further includes at least one processing unit bus. In another embodiment, the at least one bus further includes at least one graphics bus. In another embodiment, the at least one bus further includes at least one input-output bus. In another embodiment, the one or more reorder buffers, at least one of the one or more reorder buffers associated with the at least one origin of one or more memory access requests, further include at least one of the one or more reorder buffers structured to receive source information. In another embodiment, the at least one of the one or more reorder buffers structured to receive source information further include at least one of the one or more reorder buffers structured to receive at least one source informant from the group including an indicator of an initiator of a memory access request, an ordinal number delimiter of a memory access request, and a memory access request tag wherein the tag is selected from the group including a tag indicative of a speculative nature of a memory access request and a tag indicative of a priority of a memory access request.

In another embodiment, the first-stage origin-sensitive memory access request reordering device further includes one or more reorder and bank select engines, at least one of the one or more reorder and bank select engines associated with at least one origin of one or more memory access requests. In another embodiment, the one or more reorder and bank select engines, at least one of the one or more reorder and bank select engines associated with at least one origin of one or more memory access requests, further include one or more best-choice registers, at least one of the one or more best choice registers associated with the at least one origin of one or more memory access requests, and at least one of the one or more reorder and bank select engines operably coupled to at least one of the one or more best-choice registers. In another embodiment, the one or more best-choice registers, at least one of the one or more best choice registers associated with the at least one origin of one or more memory access requests, further include at least one of the one or more best choice registers associated with at least one source of memory access requests. In another embodiment, the at least one source of memory access requests further includes at least one source from the group including a microprocessor, a graphics controller, a device operably connected to an input-output bus, an isochronous-stream device, and an input-output card.

In another embodiment, the or more best-choice registers, at least one of the one or more best choice registers associated with the at least one origin of one or more memory access requests further include at least one of the one or more best-choice registers structured to receive source information. In another embodiment, the at least one of the one or more best-choice registers structured to receive source information further include the at least one of the one or more best-choice registers structured to receive at least one source informant from the group including an indicator of an initiator of a memory access request, an ordinal number delimiter of a memory access request, and memory access request tag wherein the tag is selected from the group including a tag indicative of a speculative nature of a memory access request and a tag indicative of a priority of a memory access request. In another embodiment, the at least one of the one or more reorder and bank select engines operably coupled to at least one of the one or more best-choice registers further include the one or more reorder and bank select engines operably connected to the one or more best choice registers such that control information related to the at least one origin of one or more memory access requests can be conveyed.

In another embodiment, the second-stage destination-sensitive memory access request reordering device operably coupled to the first-stage origin-sensitive memory access request reordering device further includes a centralized state machine, and the centralized state machine operably connected to one or more memory devices. In another embodiment, the centralized state machine further includes the centralized state machine operably connected to one or more reorder and bank select engines of the first-stage origin-sensitive memory access request reordering device. In another embodiment, the centralized state machine operably connected to one or more reorder and bank select engines of the first-stage origin-sensitive memory access request reordering device further includes one or more control lines connecting the centralized state machine to at least one of the one or more reorder and bank select engines of the first-stage origin-sensitive memory access request reordering device. In another embodiment, the centralized state machine is structured such that control information can be received from at least one of the one or more reorder and bank select engines of the first-stage origin-sensitive memory access request reordering device over the one or more control lines connecting the centralized state machine to the at least one of the one or more reorder and bank select engines of the first-stage origin-sensitive memory access request reordering device.

In another embodiment, the centralized state machine further includes the centralized state machine structured to accept memory access requests. In another embodiment, the centralized state machine structured to accept memory access requests further includes the centralized state machine structured to accept one or more memory access requests having associated origin information. In another embodiment, the centralized state machine structured to accept one or more memory access requests having associated origin information further includes the centralized state machine structured such that one or more specific inputs to the centralized state machine are associated with one or more specific origins of the one or more specific memory access requests. In another embodiment, the centralized state machine structured such that one or more specific inputs to the centralized state machine are associated with one or more specific origins of the one or more specific memory access requests further includes the centralized state machine structured such that the one or more specific inputs to the centralized state machine are associated with one or more specific reorder buffers of the first-stage origin-sensitive memory access request reordering device. In another embodiment, the one or more specific reorder buffers of the first-stage origin-sensitive memory access request reordering device further include the one or more specific reorder buffers of the first-stage origin-sensitive memory access request reordering device associated with one or more buses over which one or more specific memory access requests traveled. In another embodiment, the one or more specific reorder buffers of the first-stage origin-sensitive memory access request reordering device further include: the one or more specific reorder buffers of the first-stage origin-sensitive memory access request reordering device associated with one or more sources of the one or more specific memory access requests. In another embodiment, the centralized state machine structured such that one or more specific inputs to the centralized state machine are associated with one or more specific origins of the one or more specific memory access requests further includes the centralized state machine structured such that the one or more specific inputs to the centralized state machine are associated with one or more best-choice registers of the first-stage origin-sensitive memory access request reordering device. In another embodiment, the one or more best-choice registers of the first-stage origin-sensitive memory access request reordering device further include the one or more best-choice registers of the first-stage origin-sensitive memory access request reordering device associated with one or more buses over which the one or more specific memory access requests traveled. In another embodiment, the one or more best-choice registers of the first-stage origin-sensitive memory access request reordering device further include the one or more best-choice registers of the first-stage origin-sensitive memory access request reordering device associated with one or more sources of the one or more specific memory access. In another embodiment, the centralized state machine structured to accept one or more memory access requests having associated origin information further includes the centralized state machine structured to receive memory access request source information. In another embodiment, the centralized state machine structured to receive memory access request source information further includes the centralized state machine structured to receive at least one source informant from the group including an indicator of the initiator of a memory access request, an ordinal number delimiter of a memory access request, a memory access request tag selected from the group including, a tag indicative of a priority of a source of a memory access request and a tag indicative of a speculative nature of a memory access request.

In another embodiment, the centralized state machine operably connected to one or more memory devices further includes the centralized state machine operably connected to at least one interface of the one or more system memory devices such that the state of the one or more system memory devices may be received. In another embodiment, the centralized state machine operably connected to at least one interface of the one or more system memory devices such that the state of the one or more system memory devices may be received further includes the centralized state machine operably connected to at least one interface of the one or more system memory devices via one or more memory status lines. In another embodiment, the centralized state machine operably connected to one or more memory devices further includes at least one memory device buffer having at least one input and at least one output, the at least one input of the at least one memory device buffer operably coupled to at least one output of the centralized state machine, and the at least one output of the at least one memory device buffer operably connected to at least one interface of the one or more system memory devices. In another embodiment, the one or more system memory devices further include one or more DRAM chips. In another embodiment, the one or more system memory devices further include one or more banks of memory.

In another embodiment, the second-stage destination-sensitive memory access request reordering device operably coupled to the first-stage origin-sensitive memory access request reordering device further includes a centralized state machine and the centralized state machine operably connected to one or more memory devices. In another embodiment, the centralized state machine operably connected to one or more memory devices further includes one or more device arbiter and state engines. In another embodiment, the one or more device arbiter and state engines further include at least one of the one or more device arbiter and state engines operably connected to one or more reorder and bank select engines of the first-stage origin-sensitive memory access request reordering device. In another embodiment, the at least one of the one or more device arbiter and state engines operably connected to one or more reorder and bank select engines of the first-stage origin-sensitive memory access request reordering device further includes one or more control lines connecting the at least one of the one or more device arbiter and state engines to at least one of the one or more reorder and bank select engines of the first-stage origin-sensitive memory access request reordering device. In another embodiment, the at least one of the one or more device arbiter and state engines operably connected to one or more reorder and bank select engines further includes the at least one of the one or more device arbiter and state engines structured such that control information can be received from at least one of the one or more reorder and bank select engines of the first-stage origin-sensitive memory access request reordering device over the one or more control lines connecting the at least one of the one or more device arbiter and state machines to the one or more reorder and bank select engines of the first-stage origin-sensitive memory access request reordering device. In another embodiment, the one or more device arbiter and state engines further include at least one of the one or more device arbiter and state engines structured to accept memory access requests. In another embodiment, the at least one of the one or more device arbiter and state engines structured to accept memory access requests further includes the at least one of the one or more device arbiter and state engines structured to accept memory access requests having associated memory access request origin information. In another embodiment, the at least one of the one or more device arbiter and state engines structured to accept memory access requests having associated memory access request origin information further includes the at least one of the one or more device arbiter and state engines structured such that one or more specific inputs to the at least one of the one or more device arbiter and state engines are associated with one or more specific origins of one or more specific memory access requests. In another embodiment, the at least one of the one or more device arbiter and state engines structured such that one or more specific inputs to the at least one of the one or more device arbiter and state engines are associated with one or more specific origins of one or more specific memory access requests further includes the at least one of the one or more device arbiter and state engines structured such that at least one of the one or more specific inputs to the at least one of the one or more device arbiter and state engines is associated with at least one specific reorder buffer of the first-stage origin-sensitive memory access request reordering device. In another embodiment, the at least one specific reorder buffer of the first-stage origin-sensitive memory access request reordering device further includes the at least one specific reorder buffer of the first-stage origin-sensitive memory access request reordering device associated with at least one bus over which the one or more specific memory access requests traveled. In another embodiment, the at least one specific reorder buffer of the first-stage origin-sensitive memory access request reordering device further includes the at least one specific reorder buffer of the first-stage origin-sensitive memory access request reordering device associated with at least one source of the one or more specific memory access requests. In another embodiment, the at least one of the one or more device arbiter and state engines structured such that one or more specific inputs to the at least one of the one or more device arbiter and state engines are associated with one or more specific origins of one or more specific memory access requests further includes the at least one of the one or more device arbiter and state engines structured such that at least one of the one or more specific inputs to the one or more device arbiter and state engines is associated with at least one or more best-choice registers of the first-stage origin-sensitive memory access request reordering device associated with at least one specific origin of the one or more specific memory access requests. In another embodiment, the at least one specific origin of the one or more specific memory access requests further includes at least one bus over which the one or more specific memory access requests traveled. In another embodiment, the at least one specific origin of the one or more specific memory access requests further includes at least one source of the one or more specific memory access requests. In another embodiment, the at least one of the one or more device arbiter and state engines structured to accept memory access requests having associated memory access request origin information further includes the at least one of the one or more device arbiter and state engines structured to receive memory access request source information. In another embodiment, the at least one of the one or more device arbiter and state engines structured to receive memory access request source information further includes the at least one of the one or more device arbiter and state engines structured to receive at least one source informant from the group including an indicator of the initiator of a memory access request, an ordinal number delimiter of a memory access request, and a memory access request tag selected from the group including a tag indicative of a priority of a source of a memory access request and a tag indicative of a speculative nature of a memory access request.

In another embodiment, the centralized state machine operably connected to one or more memory devices further includes one or more device arbiter and state engines operably connected to at least one interface of the one or more system memory devices such that the state of the one or more system memory devices may be received by at least one of the one or more device arbiter and state engines. In another embodiment, the one or more device arbiter and state engines operably connected to at least one interface of the one or more system memory devices such that the state of the one or more system memory devices may be received by at least one of the one or more device arbiter and state engines further include at least one of the one or more device arbiter and state engines connected to at least one interface of the one or more memory devices via one or more memory status lines. In another embodiment, the one or more device arbiter and state engines operably connected to at least one interface of the one or more system memory devices further includes one or more memory device buffers with at least one memory device buffer having at least one input and at least one output, the at least one input of the at least one memory device buffer operably coupled to at least one output of the one or more device arbiter and state engines, and the at least one output of the at least one memory device buffer operably connected to at least one interface of at least one of the one or more system memory devices. In another embodiment, the one or more system memory devices further include one or more DRAM chips. In another embodiment, the one or more system memory devices further include one or more banks of memory. In another embodiment, the method and system providing a first-stage origin-sensitive memory access request reordering device, and a second-stage destination-sensitive memory access request reordering device operably coupled to the first-stage origin-sensitive memory access request reordering device further include a processing unit, a first bridge, a system memory, a graphics bus, an input-output bus, a graphics controller, a local frame buffer, a display device, and an input-output bridge.

In another embodiment, the method and system engage in the following process: monitoring one or more origin-related memory access requests, reordering the one or more origin-related memory access requests, receiving the reordered one or more origin-related memory access requests, and executing the one or more origin-related memory access requests. In another embodiment, the monitoring one or more origin-related memory access requests further includes monitoring one or more memory access requests associated with one or more specific origins. In another embodiment, the monitoring one or more memory access requests associated with one or more specific origins further includes monitoring one or more reorder buffers associated with the one or more specific origins. In another embodiment, the monitoring one or more reorder buffers associated with the one or more specific origins further includes monitoring one or more reorder buffers associated with one or more specific buses over which the one or more memory access requests traveled. In another embodiment, the monitoring one or more reorder buffers associated with the one or more specific origins further includes monitoring one or more reorder buffers associated with one or more specific sources from which the one or more memory access requests originated. In another embodiment, the reordering the one or more origin-related memory access requests further includes reordering the one or more origin-related memory access requests on the basis of the one or more specific origins. In another embodiment, the reordering the one or more origin-related memory access requests further includes reordering the one or more origin-related memory access requests on the basis of origin-related information. In another embodiment, the reordering the one or more origin-related memory access requests on the basis of origin-related information further includes reordering the of the one or more origin-related memory access requests on the basis of at least one source-related informant selected from the group including at least one source indicator associated with the one or more origin-related access requests, at least one ordinal indicator associated with the one or more origin-related access requests, and at least one tag associated with the one or more origin-related access requests wherein the at least one tag includes at least one tag selected from the group including a tag indicative of the priority of the one or more origin-related memory access requests and a tag indicative of a speculative nature of the one or more source origin-related memory access requests.

In another embodiment, the method and system further include presenting at least one of the reordered one or more memory access requests for execution. In another embodiment, the presenting at least one of the reordered one or more memory access requests for execution further includes arranging the one or more memory access requests in a reorder buffer such that the at least one of the reordered one or more memory access requests will be the request next retrieved from the reorder buffer.

In another embodiment, the method and system further include selecting at least one of the one or more memory access requests for execution, where the selecting is achieved by one or more best choice registers. In another embodiment, the selecting at least one of the one or more memory access requests for execution, where the selecting is achieved by one or more best choice registers ether includes communicating control information to at least one of the one or more best choice registers, and the one or more best choice registers selecting at least one of the one or more memory access requests for execution in response to the control information. In another embodiment, the receiving the reordered one or more origin-related memory access requests for includes receiving one or more memory access requests associated with one or more specific origins. In another embodiment, the receiving one or more memory access requests associated with one or more specific origins further includes receiving the one or more memory access requests from one or more reorder buffers associated with the one or more specific origins. In another embodiment, the receiving the one or more memory access requests from one or more reorder buffers associated with the one or more specific origins further includes receiving the one or more memory access requests from one or more reorder buffers associated with one or more specific buses over which the one or more memory access requests traveled. In another embodiment, the receiving the one or more memory access requests from one or more reorder buffers associated with the one or more specific origins further includes receiving the one or more memory access requests from one or more reorder buffers associated with one or more specific sources from which the one or more memory access requests originated.

In another embodiment, the executing the one or more origin-related memory access requests further includes executing at least one of the one or more origin-related memory access requests on the basis of the one or more specific origins. In another embodiment, the executing the one or more origin-related memory access requests further includes executing at least one the one or more origin-related memory access requests on the basis of origin-related information. In another embodiment, the executing at least one of the one or more origin-related memory access requests on the basis of origin-related information further includes executing the at least one of the one or more origin-related memory access requests on the basis of at least one source-related informant selected from the group including at least one source indicator associated with the one or more origin-related access requests, at least one ordinal indicator associated with the one or more origin-related access requests, and at least one tag associated with the one or more origin-related access requests wherein the at least one tag includes at least one tag selected from the group including a tag indicative of the priority of the one or more origin-related memory access requests and a tag indicative of a speculative nature of the one or more origin-related memory access requests. In another embodiment, the executing at least one of the one or more origin-related memory access requests on the basis of origin-related information further includes receiving status information from one or more memory devices, and executing at least one of the one or more speculative memory access requests in response to the status information from one or more memory devices. In another embodiment, the receiving status information from one or more memory devices further includes receiving status information from one or more DRAMs. In another embodiment, the receiving status information from one or more memory devices further includes receiving status information from one or more banks of memory. In another embodiment, the executing at least one of the one or more speculative memory access requests in response to the status information from one or more memory devices further includes determining the contents of one or more memory device buffers, and executing the at least one of the one or more speculative memory access requests in response to the status information from one or more memory devices and the contents of the one or more memory device buffers.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 8A1 illustrates an expanded view of an embodiment of a destination-sensitive second-stage memory access request reordering device.

FIG. 8A2 shows yet another embodiment of a destination-sensitive second-stage memory access request reordering device.

FIG. 8B1 depicts another embodiment of a destination-sensitive second-stage memory access request reordering device.

FIG. 8B2 illustrates yet another embodiment of a destination-sensitive second-stage memory access request reordering device.

FIG. 8C1 shows yet another embodiment of a destination-sensitive second-stage memory access request reordering device.

FIG. 8C2 depicts yet another embodiment of a destination-sensitive second-stage memory access request reordering device.

FIG. 9A1 illustrates an expanded view of an embodiment of a destination-sensitive second-stage memory access request reordering device.

FIG. 9A2 shows yet another embodiment of a destination-sensitive second-stage memory access request reordering device.

FIG. 9B1 depicts another embodiment of a destination-sensitive second-stage memory access request reordering device.

FIG. 9B2 illustrates yet another embodiment of a destination-sensitive second-stage memory access request reordering device.

FIG. 9C1 shows yet another embodiment of a destination-sensitive second-stage memory access request reordering device.

FIG. 9C2 depicts yet another embodiment of a destination-sensitive second-stage memory access request reordering device.

FIG. 10A1 illustrates an expanded view of an embodiment of a memory controller wherein is contained an embodiment of a speculative memory access request generation and utilization structure and operation.

FIG. 10A2 shows an expanded view of another embodiment of a memory controller wherein is contained an embodiment of a speculative memory access request generation and utilization structure and operation.

FIG. 10B1 an expanded view of another embodiment of a memory controller wherein is contained an embodiment of a speculative memory access request generation and utilization structure and operation.

FIG. 10B2 illustrates an expanded view of another embodiment of a memory controller wherein is contained an embodiment of a speculative memory access request generation and utilization structure and operation.

FIG. 10C1 shows an expanded view of another embodiment of a memory controller wherein is contained an embodiment of a speculative memory access request generation and utilization structure and operation.

FIG. 10C2 depicts an expanded view of another embodiment of a memory controller wherein is contained an embodiment of a speculative memory access request generation and utilization structure and operation.

FIG. 11A1 illustrates an expanded view of another embodiment of a memory controller wherein is contained an embodiment of a speculative memory access request generation and utilization structure and operation.

FIG. 11A2 shows an expanded view of another embodiment of a memory controller wherein is contained an embodiment of a speculative memory access request generation and utilization structure and operation.

FIG. 11B1 depicts an expanded view of another embodiment of a memory controller wherein is contained an embodiment of a speculative memory access request generation and utilization structure and operation.

FIG. 11B2 illustrates an expanded view of another embodiment of a memory controller wherein is contained an embodiment of a speculative memory access request generation and utilization structure and operation.

FIG. 11C1 shows an expanded view of another embodiment of a memory controller wherein is contained an embodiment of a speculative memory access request generation and utilization structure and operation.

FIG. 11C2 shows an expanded view of another embodiment of a memory controller wherein is contained an embodiment of a speculative memory access request generation and utilization structure and operation.

The use of the same reference symbols in different drawings indicates similar or identical items.

DETAILED DESCRIPTION

The following sets forth a detailed description of the best contemplated mode for carrying out the multiple independent inventions described herein. The description is intended to be illustrative and should not be taken to be limiting. In addition, the following detailed description has been divided into sections (e.g., sections I–V) in order to highlight the multiple independent inventions described herein; however, those skilled in the art will appreciate that such sections are merely for illustrative focus, and that each invention herein disclosed typically draws its support from multiple sections. Consequently, it is to be understood that the division of the detailed description into separate sections is merely done as an aid to understanding and is in no way intended to be limiting.

I. Environment for Methods and Systems

Figure 1:
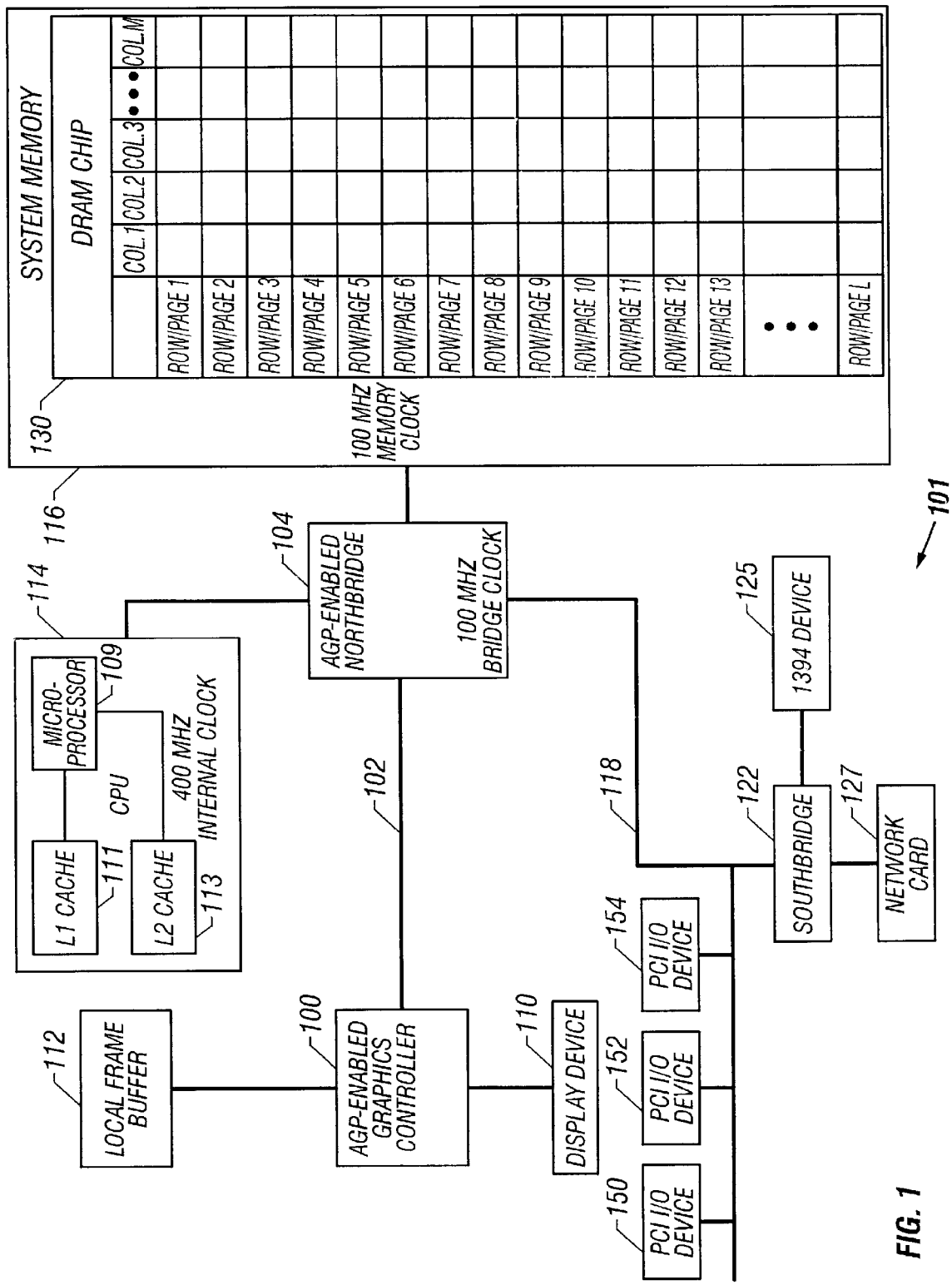
FIG. 1 shows a high-level component diagram depicting a related art AGP-enabled data processing system which forms an environment wherein one or more embodiments of the present invention may be practiced.

Referring now to FIG. 1, shown is a high-level component diagram depicting an AGP-enabled data processing system 101 which forms an environment wherein one or more embodiments of the present invention may be practiced. Shown are AGP-enabled graphics controller 100, AGP interconnect 102 (a data bus), and AGP-enabled Northbridge 104. Not shown, but deemed present is an AGP-enabled operating system. The term AGP-enabled is intended to mean that the so-referenced components are engineered such that they interface and function under the standards defined within the AGP interface specification, referenced above. Further depicted are display device 110, local frame buffer 112, Central Processing Unit (CPU) 114 (wherein are depicted microprocessor 109, L1 Cache 111, and L2 Cache 113), CPU bus 115, system memory 116, Peripheral Component Interconnect (PCI) bus 118, various PCI Input-Output (I/O) devices 150, 152, and 154, Southbridge 122, 1394 Device 125, and network card 127.

The foregoing components and devices are used herein as examples for sake of conceptual clarity. As for (non-exclusive) examples, CPU 114 is utilized as an exemplar of any general processing unit, including but not limited to multiprocessor units; CPU bus 115 is utilized as an exemplar of any processing bus, including but not limited to multiprocessor buses; PCI bus 118 is utilized as an exemplar of any input-output device attached to an I/O bus; AGP Interconnect 102 is utilized as an exemplar of any graphics bus; AGP-enabled graphics controller 100 is utilized as an exemplar of any graphics controller; Northbridge 104 and Southbridge 122 are utilized as exemplars of any type of bridge; 1394 device 125 is utilized as an exemplar of any type of isochronous source; and network card 127, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 104, in that it is to be understood that it translates and coordinates between the various data buses which communicate through AGP-enabled Northbridge 104.

Notwithstanding the issue of differing bus protocols, further illustrated in FIG. 1 is that various system components operate off of various internal clocks, where each internal clock can vary from others present. Regarding the non-limiting exemplary clock speeds shown, it will be understood by those within the art that, typically, CPU 114 multiplies a bus clock (an external clock, not shown) in order to generate an internal clock that is faster (e.g., twice, three time, four times, etc.) than the bus clock. In contrast, AGP-enabled Northbridge 104 and system memory 116 typically use the bus clock as their respective internal clocks without multiplying the bus clock. Specifically, shown is that CPU 114 operates off an internal clock whose speed is illustrated at 400 MHz, AGP-enabled Northbridge 104 operates off an internal bridge clock whose speed is illustrated at 100 MHz, and system memory 116 operates off an internal memory clock whose speed is illustrated at 100 MHz. Those skilled in the art will recognize that these clock speeds are non-limiting, exemplary only and can vary widely, and that each described component can have a clock speed varying from each of the other described components.

Those skilled in the art will recognize that microprocessor 109 sends a request to memory only when the data it is seeking to access is not resident in either L1 cache 111 or L2 cache 113. That is, processor 109 only seeks to read from system memory 116 when a miss occurs with respect to microprocessor's 109 L1 cache 111 or L2 cache 113. One problem that arises when processor 109 must access system memory 116 is that while the processor is running at an internal speed of 400 MHz, AGP-enabled Northbridge 104 and system memory 116 are only running at 100 MHz, so when processor 109 has to access system memory 116, the internal clock speeds of AGP-enabled Northbridge 104 and system memory 116 become the factors ultimately controlling the speed of system memory 116 access. Thus, when microprocessor 109 has to go outside CPU 114 to access data, the speed of access becomes controlled by the 100 MHz bridge and memory clocks. Those skilled in the art will recognize that typically AGP-enabled Northbridge 104 may require up to two bridge clock cycles to determine what to do with a specific memory request from processor 109. Notice that in the example shown this translates into 8 CPU 114 internal clock cycles in that the CPU 114 internal clock is running 4 times faster than the bridge clock.

Once AGP-enabled Northbridge 104 has determined that it has received a request from processor 109 to access system memory 116, AGP-enabled Northbridge 104 thereafter sends the request to system memory 116. Upon receipt of the request, system memory 116 has to drive the address on a DRAM chip 130 address bus, and DRAM chip 130 has to decode the address, access the location, and drive the data back to AGP-enabled Northbridge 104 which thereafter drives the data back to microprocessor 109. Those skilled in the art will recognize that the foregoing operations generally require anywhere from 5 to 15 bridge/memory clock cycles (bridge and memory clocks are shown as running at the same speed in FIG. 1, but those skilled in the art will recognize that this is not necessarily the case) between processor 109 requesting data from system memory 116, and processor 109 receiving the data in response to its request. The foregoing noted clock cycles translate into a very substantial latency from the standpoint of processor 109 (e.g., 20–60 CPU 114 internal clock cycles). Consequently, CPU 114 often spends a significant amount of time waiting for system memory 116 to respond to a request for data. Furthermore, it is significant that the foregoing described example was based on an assumption that DRAM 130 in system memory 116 was in a state in which it could service a request, and those skilled in the art will recognize that if DRAM 130 had not been in a state wherein it could service a request (e.g., a page in DRAM 130 had been closed or had been in a transitional "refresh" state), the foregoing described latency could have been much, much greater than that illustrated.

Those skilled in the art will recognize that another problem, in addition to the foregoing described problem of latency, is that typically a memory request on CPU bus 115 tends to function as a blocking cycle, so data processing system 101 tends to come to a halt while processor 109 is waiting to access system memory 116. Thus, the foregoing has demonstrated via non-exclusive examples that main memory latency is one of the most significant issues limiting the performance of current data processing systems.

In addition to the foregoing, newer systems have AGP subsystems which can put a significant amount of extra loading on system memory 116. Under the current specification, AGP-enabled devices can put up to 1 Gbyte per second of load on system memory 116. Thus, in systems where AGP-devices are present (such as data processing system 101), when a memory controller (not shown) is servicing AGP requests, it is apparent that the foregoing described latencies will tend to go even higher. In addition, PCI bus 118 also adds yet more loading onto system memory 116. Thus, in the presence of AGP devices and PCI devices, system memory 116 latency becomes even more of an issue than that previously described, which as can be seen was actually effectively a "best case" (or least latency) scenario.

It has been discovered that significant reductions in main memory latency can be achieved by taking advantage of correlations internal to multiple independent streams of memory accesses. As used herein, the term "correlation" means that different addresses corresponding to different accesses tend to fall within a relatively narrow range. For non-limiting example, when AGP-enabled graphics controller 100 accesses system memory 116, such accessing tends to be highly correlated in that the memory locations accessed tend to be in closely situated addresses. The present invention, among other things, improves the ability to take advantage of calculations present in order to reduce memory latency.

Figure 2:
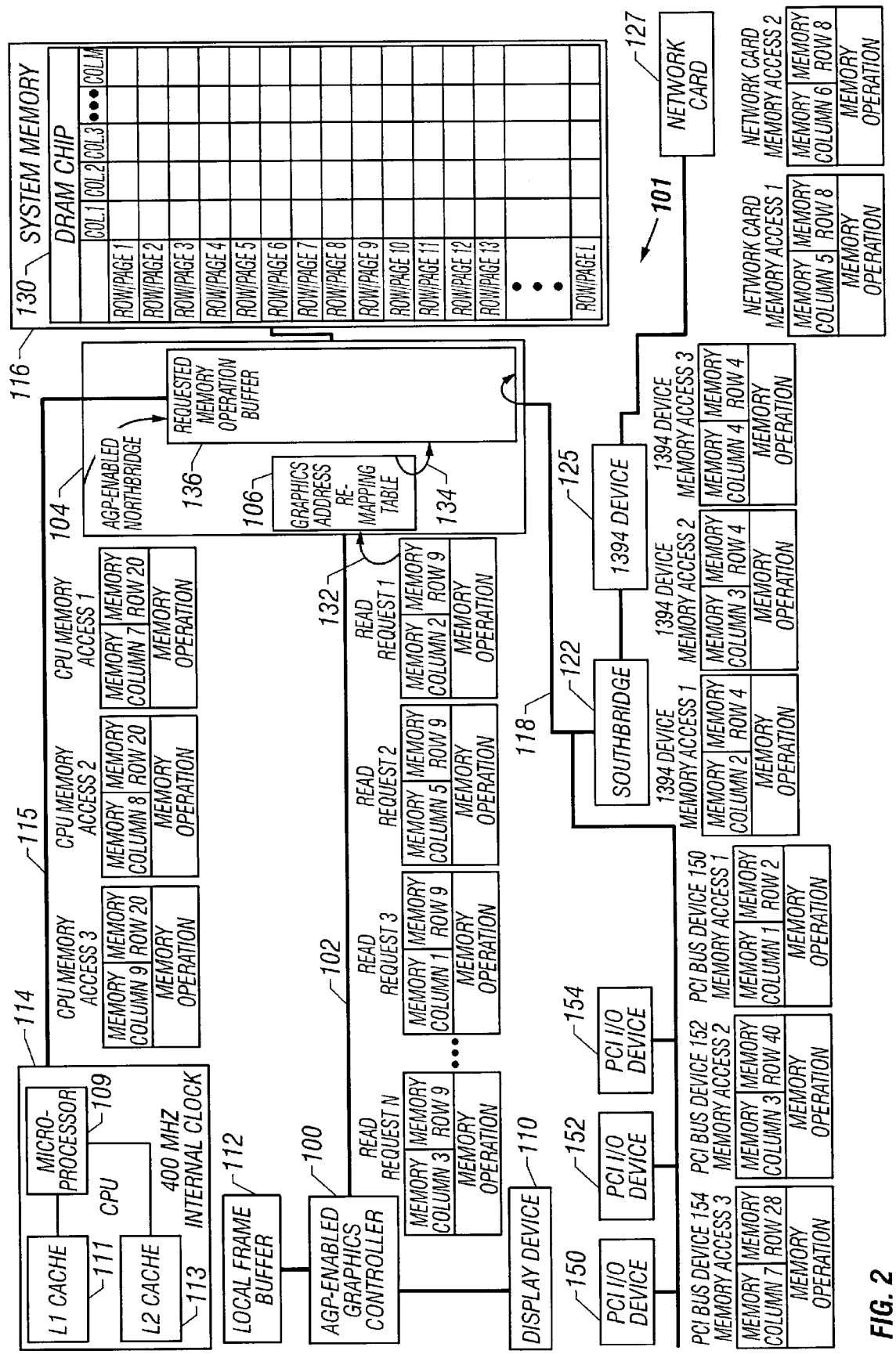
FIG. 2 depicts a high-level block diagram illustrating in broad overview how data requests may arise within the AGP-enabled system of FIG. 1, which forms an environment wherein one or more embodiments of the present invention may be practiced.

Referring now to FIG. 2, shown is a high-level block diagram illustrating in broad overview how data requests may arise within AGP-enabled system 101 of FIG. 1, which forms an environment wherein one or more embodiments of the present invention may be practiced. The components shown function substantially similarly to the like-numbered components described in relation to FIG. 1.

Those skilled in the art will recognize that under the AGP interface standard a graphics controller is free to issue pipelined requests for data. Shown is that AGP-enabled graphics controller issues N (where N is some positive integer) read requests to read data from a particular cell, or row and column location, from DRAM chip 130 in system memory 116 prior to any of the N−1 outstanding read requests being answered. It should be noted that although for conceptual clarity the read requests are shown in FIG. 1 as labeled requests 1 through N, under the AGP standard there is no such labeling, and under the AGP standard such ordering is merely denoted by transmission order of the requests. Further illustrated is that within DRAM chip 130 each row can be conceptualized as a "page" in memory.

Those skilled in the art will recognize that the AGP interface standard allows AGP-enabled devices to treat AGP memory as if it were one contiguous whole, while in point of fact it may consist of several discontinuous regions of system memory. Accordingly, under the AGP-interface standard read requests to system memory first transit 132, 134 Graphics Address Re-mapping Table (GART) 106 prior to being loaded into requested memory operation buffer 136. Ordinarily, GART 106 re-maps the row and column AGP-memory addresses for which accesses are requested into row and column physical memory addresses. However, for sake of clarity of presentation and understanding, herein GART 106 will be treated as if it is transparent to the process. That is, while those skilled in the art will recognize that GART 106 will typically re-map requested addresses, in the present detailed description GART 106 will be treated as if it merely passes the addresses through without re-mapping them so that the embodiments discussed herein can be more clearly understood.

Those skilled in the art will recognize that under some CPU bus protocols, CPU 114 is free to issue pipelined memory accesses. Shown is that CPU 114 issues 3 memory accesses, each of which is to a particular cell, or row and column location, within DRAM chip 130 in system memory 116 prior to any of the 2 outstanding memory accesses being performed. It should be noted that although for conceptual clarity the read requests are shown in FIG. 1 as labeled requests 1 through 3, under the CPU bus standards there is no such labeling, and under the CPU bus standards such ordering is merely denoted by transmission order of responses to the requested accesses.

Depicted are three PCI bus devices 150–154 which are shown to have placed 3 separate memory access requests on PCI bus 118. It will be understood by those within the art that ordinarily only one such PCI bus device memory access may be resident on PCI bus 118 at any particular time. Consequently, it will be understood by those within the art that the depicted 3 PCI bus 118 memory access requests are illustrative of the three requests occurring at three distinct different instances in time.

Historically, any PCI bus device requesting memory access via PCI bus 118 had to wait for the requested memory access to be completed prior to relinquishing PCI bus 118. This was found to result in inefficiency due to PCI bus 118 being monopolized by any such PCI bus device waiting for an access to complete. It has been found that a way around the monopolization problem is to terminate each PCI request to access memory without waiting for the data to be manipulated by the request to travel all the way from/to memory (i.e., without waiting for the cycle to complete). For example, it is conceivable to have multiple PCI requests outstanding within AGP-enabled Northbridge 104 by mandating that AGP-enabled Northbridge 104, in response to a request for memory access from PCI bus device 150–154, direct the PCI master to retry, which will result in the PCI master releasing the bus thus freeing PCI bus 118 so that other PCI masters can issue requests. Any subsequently retried accesses will often be completed quickly because AGP-enabled Northbridge 104 will typically have the data ready when the request is retried. Thus, the foregoing schemes demonstrate that there could be multiple memory transactions pending within AGP-enabled Northbridge 104 from various PCI devices at any given time, even though PCI bus 118 can ostensibly support only one transaction at a given time.

Likewise with the five remaining accesses depicted. Although depicted are three 1394 device 125 memory access requests, it will be understood by those within the art that ordinarily only one such memory access may be resident on PCI bus 118 at any particular time. In like fashion, although depicted are two network card 127 memory access requests, it will be understood by those within the art that ordinarily only one such memory access may be resident on PCI bus 118 at any particular time. Consequently, it will be understood by those within the art that the depicted five remaining memory access requests are illustrative of the five requests occurring at five distinct instances in time. Lastly, illustrated is that 1394 device 125 requests and network card 127 requests travel to and from AGP-enabled Northbridge 104 by and through Southbridge 122 in conjunction with PCI bus 118.

Figure 3:
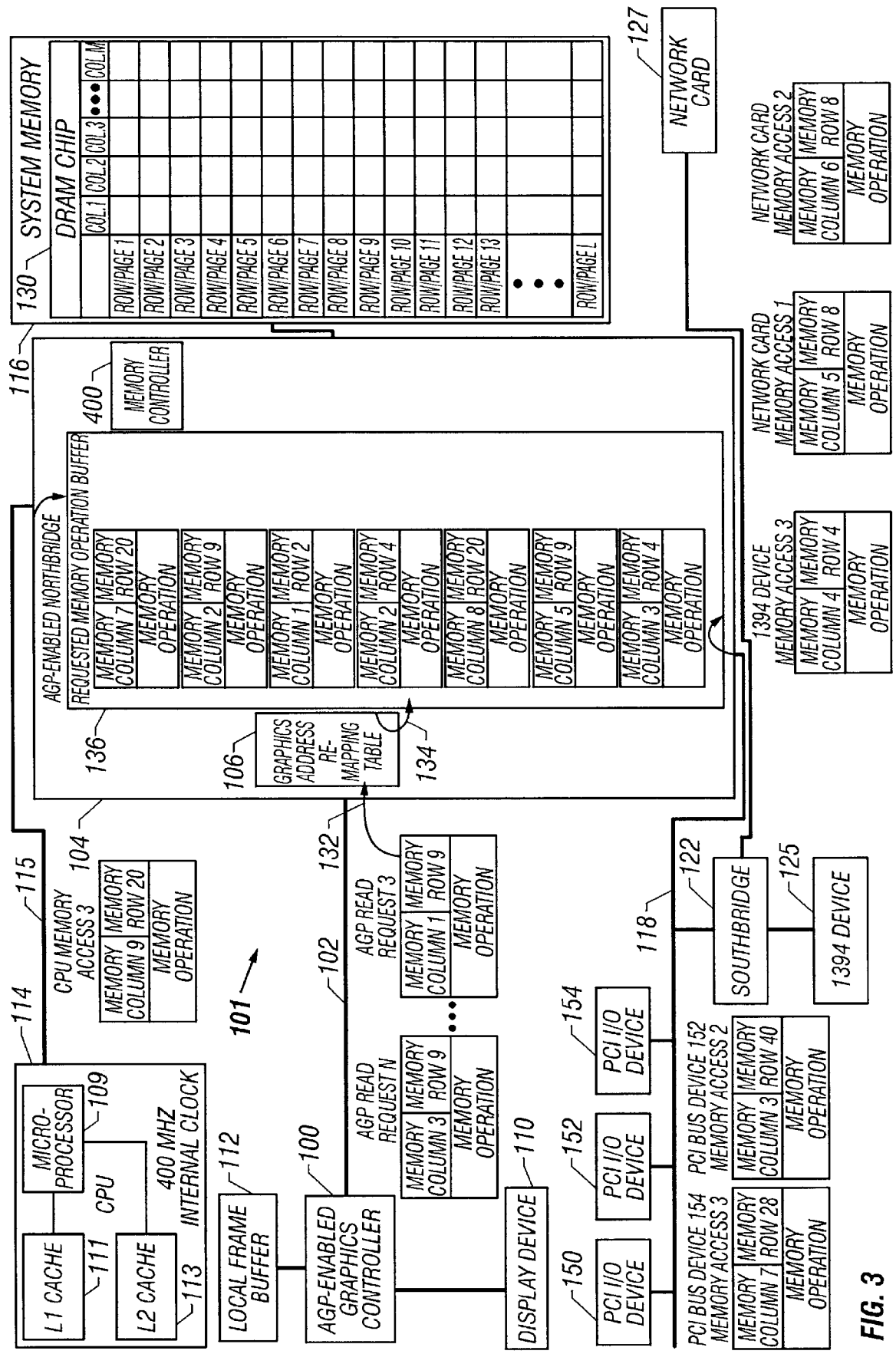
FIG. 3 illustrates a high-level block diagram showing in broad overview how the AGP-enabled system of FIG. 1, which forms an environment wherein one or more embodiments of the present invention may be practiced, accesses memory and manipulates data within the memory locations specified by the memory access requests illustrated in FIG. 2.

Referring now to FIG. 3, shown is a high-level block diagram illustrating in broad overview how the AGP-enabled system 101 of FIG. 1, which forms an environment wherein one or more embodiments of the present invention may be practiced, accesses memory and manipulates data within the memory locations specified by the memory access requests illustrated in FIG. 2. Shown are AGP-enabled graphics controller 100, AGP interconnect 102 (a data bus), and AGP-enabled Northbridge 104. The remaining shown components function substantially similar to the like-numbered components described in relation to FIGS. 1 and 2.

As has been shown in relation to FIG. 2, in a typical data processing system multiple devices are often vying for access to system memory, a fact illustrated in FIG. 2 by the fact that various and different requests to access system memory are simultaneously present on CPU bus 115, AGP interconnect 102, and PCI bus 118. Those skilled in the art will recognize that there are a myriad of ways in which the various requests vying for system memory access can be serviced. For sake of illustration, depicted in FIG. 3 is that the requests are serviced in counter-clockwise "round-robin" fashion, starting with the requests on CPU bus 115. That is, depicted in FIG. 3 is that CPU memory access 1 is the first requested memory operation loaded into requested memory operation buffer 136; thereafter, in accordance with a counter-clockwise round robin scheme, appear within requested memory operation buffer 136 AGP read request 1, PCI I/O device 150 request, 1394 device memory access 1, CPU memory access 2, AGP read request 2, and 1394 device memory access 2. The order in which the requests appear in requested memory operation buffer 136 is consistent with the round-robin scheme, with the understanding that 1394 device memory access 2 appears on PCI bus 118 before PCI bus device memory access 2, and thus that is why 1394 device memory access 2 is shown as loaded in requested memory operation buffer 136.

With the requested memory operations so loaded, memory controller 400 can thereafter service the requests in requested memory operation buffer 136 in the fashion dictated by the system. Various ways of servicing such requests are set forth below in the various following embodiments.

II. Structure and Operation for Memory Control and Access in Data Processing Systems It has been discovered that the efficiency of memory controller 400 can be enhanced by separating the servicing decisions made by memory controller 400 into two different stages: (1) an "origin-sensitive" first stage which uses information not directly related to the state of system memory 116, but rather uses information, available at various interfaces within AGP-enabled data processing system 101, regarding specific qualitative aspects of each memory request (such information including but not limited to identification of an access initiator, identification of which stream or thread resulted in an access, whether or not an access is speculative, the urgency or priority of an access, and whether or not an access can be completed out of order); and (2) a "destination-sensitive" second stage which utilizes information and decisions gleaned from the first stage, in conjunction with, among other things, the state of system memory, to ultimately determine the order in which memory accesses will be carried out. The embodiments described herein will set forth various mechanisms by which such information can be conveyed. Utilizing the two stage mechanism, memory controller 400 can reorder memory transactions to substantially maximize memory efficiency. This approach can, among other things, increase the page-hit rate, thus improving the memory subsystem performance. Similarly, among transactions from a given source, the memory controller may reorder transactions such that accesses to currently open pages are completed ahead of transactions that are targeted to pages not currently open.

Figures 4, 4A:
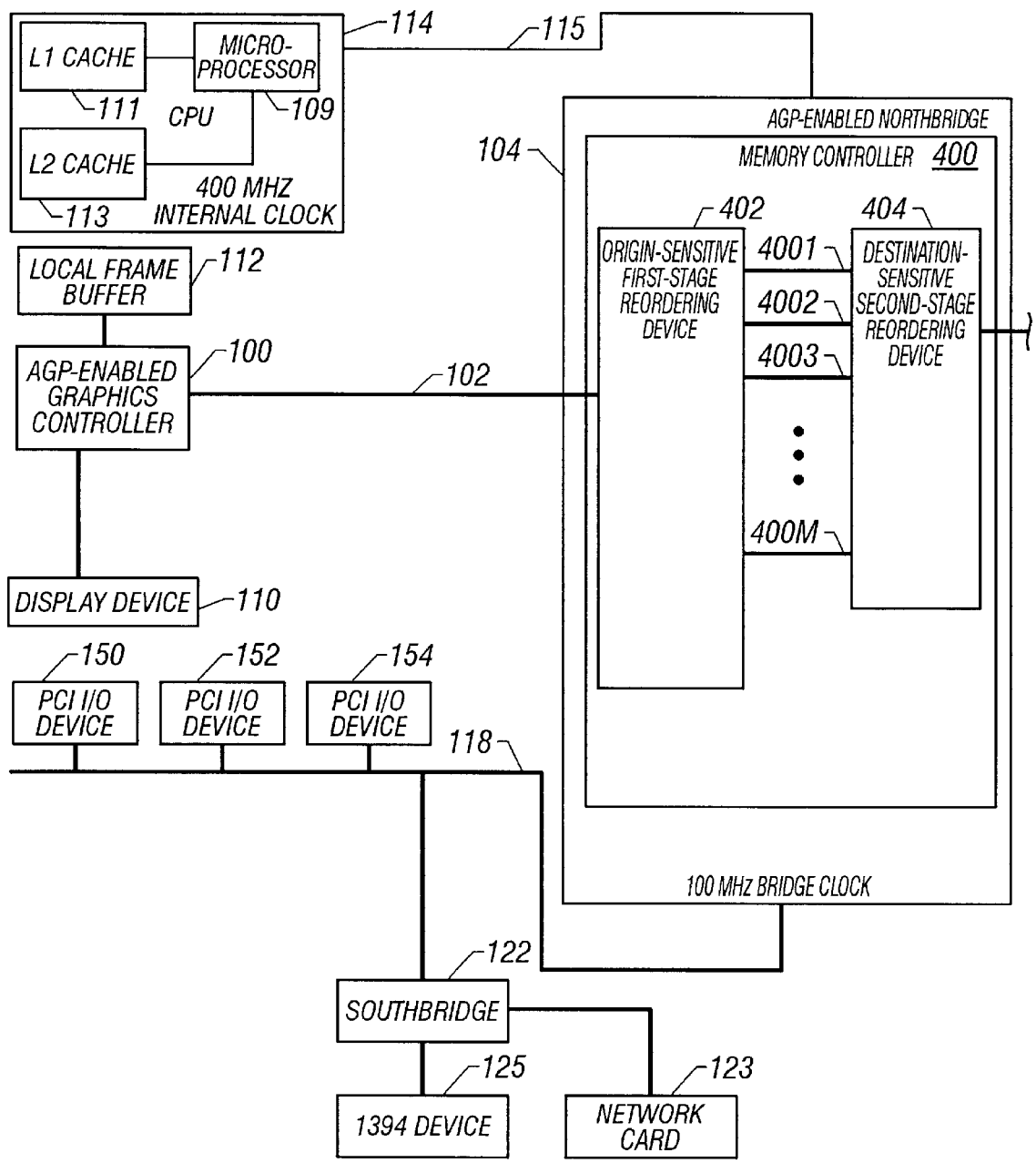
FIG. 4 shows a high-level pictographic representation of an embodiment of structure and operation for memory control and access in data processing systems.
Figure 4B:
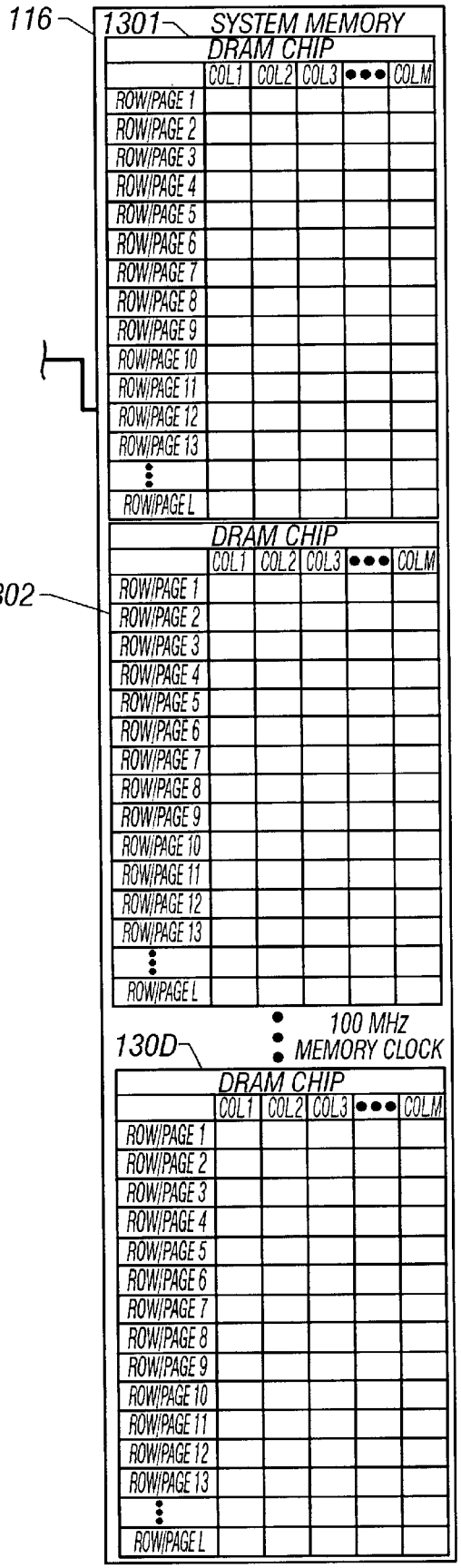

With reference now to FIG. 4, shown is a high-level pictographic representation of an embodiment of the present invention. Illustrated is that memory controller 400 has contained within it two devices: origin-sensitive first-stage memory access request reordering device 402, and destination-sensitive second-stage memory access request reordering device 404. Depicted is that origin-sensitive first-stage memory access request reordering device 402 accepts memory access requests directly over CPU bus 115, AGP Interconnect 102, and PCI bus 118. Illustrated is that origin-sensitive first-stage memory access request reordering device 402 outputs multiple reordered memory access streams 4001–400M (where M is some positive integer) which are accepted by destination-sensitive second-stage memory access request reordering device 404. As shown, destination-sensitive second-stage memory access request reordering device 404 is interposed between origin-sensitive first-stage memory access request reordering device 402 and system memory 116. Accordingly, as will be shown below, various embodiments can utilize the information from origin-sensitive first-stage memory access request reordering device 402 in conjunction with information gleaned relative to the state of system memory 116 in order to again reorder the requested memory accesses for even yet more efficient utilization of system memory 116.

Figure 5A:
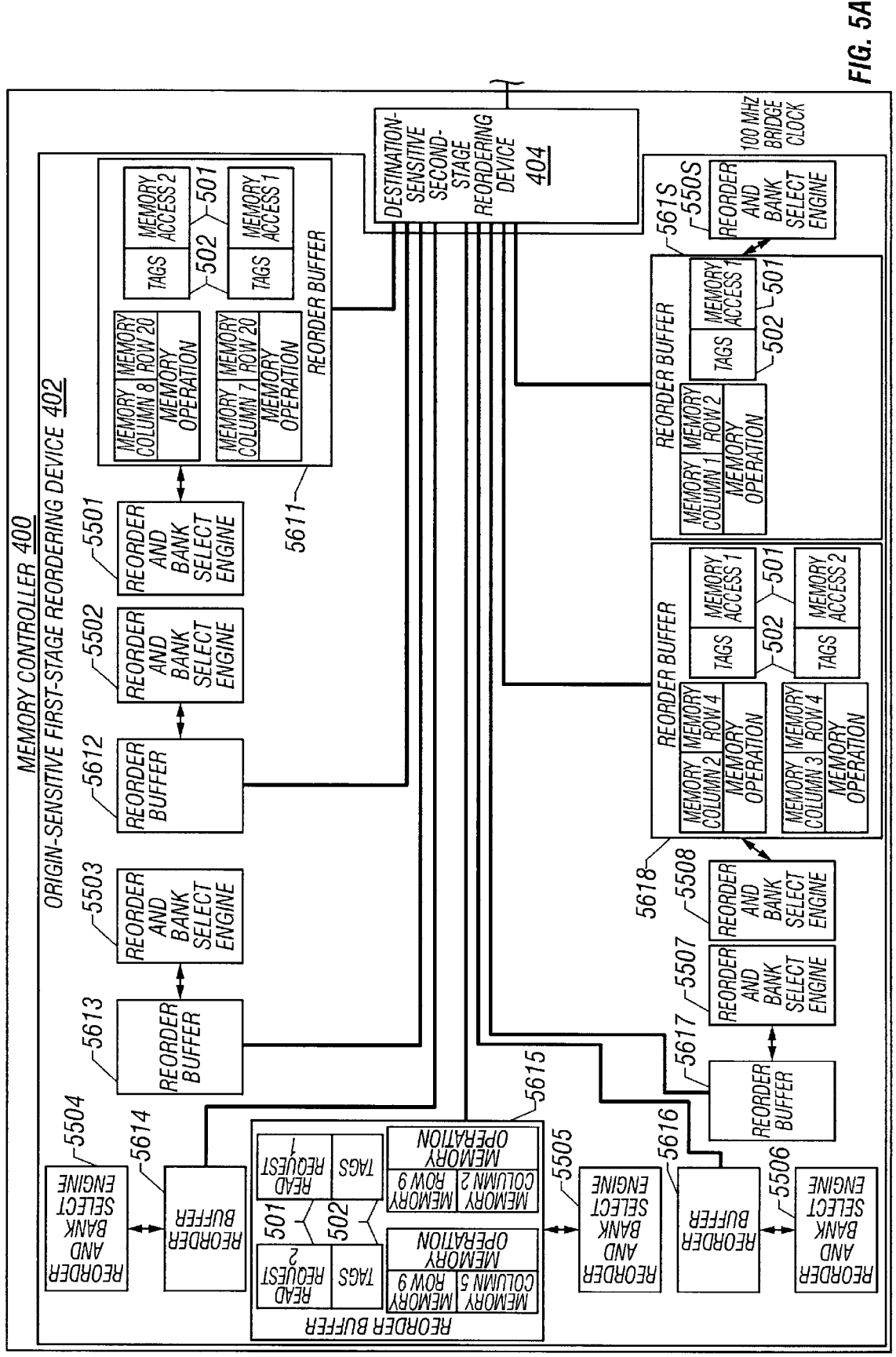
FIG. 5A depicts an expanded view of an embodiment of a memory controller containing an origin-sensitive first-stage memory access request reordering device and a destination-sensitive second-stage memory access request reordering device.

III. Structure and Operation for Origin-Sensitive Memory Control and Access in Data Processing Systems Referring now to FIG. 5A, depicted is an expanded internal view of an embodiment of memory controller 400 containing origin-sensitive first-stage memory access request reordering device 402 and destination-sensitive second-stage memory access request reordering device 404. Illustrated is that contained within origin-sensitive first-stage memory access request reordering device 402 are S (where S is some positive integer associated with a number of sources of memory access requests attached to any one or more of CPU bus 115, AGP interconnect 102, and PCI bus 118) reorder and bank select engines 5501–550S, which are respectively paired with reorder buffers 5611–561S. (As used herein, the term reorder and bank select engine refers to devices which can optionally reorder, bank select, or reorder and bank select exactly which capability or capabilities may be employed in any particular embodiment will become apparent in the context of the discussion, below.) Depicted is that each reorder buffer 5611–561S is paired with a specific source of memory access requests, such as for non-exclusive example microprocessor 109 paired with reorder buffer 561I, AGP-enabled graphics engine 100 paired with reorder buffer 561G, PCI I/O device 150 paired with reorder buffer 561S, and 1394 device 125 paired with reorder buffer 561B. Since each source is now associated with a buffer, the initiator of a request is now implicitly indicated by which reorder buffer 5511–551S a request is resident within, which means that it is not necessary for each buffered requested memory operation to be associated with an indicator of the initiator (or source) of the requested memory transaction in order to specify the identity of the initiator. Shown is that each such buffered memory operation may optionally have associated with it an ordinal number delimiter 501 which indicates a request's order relative to other requests from the same source. Further shown is that each such buffered memory operation may (optionally) also have associated with it a "tag" 502 which may contain one or more units indicative of one or more parameters related to the source of the memory operation. Utilizing such information, origin-sensitive first-stage memory access request reordering device 402 can more efficiently reorder the memory requests on the basis of the source from which the memory transaction originates, the ordinal number of the request, or any tags which may be present, or any combination of such information (e.g., source and/or tags and/or ordinal number delimiter) which may be present. In other words, origin-sensitive first-stage memory access request reordering device 402 is capable of utilizing any possible correlations that exist in data received on the basis of various and sundry source attributes, which is not done in the absence of the current invention.

Figure 5B:
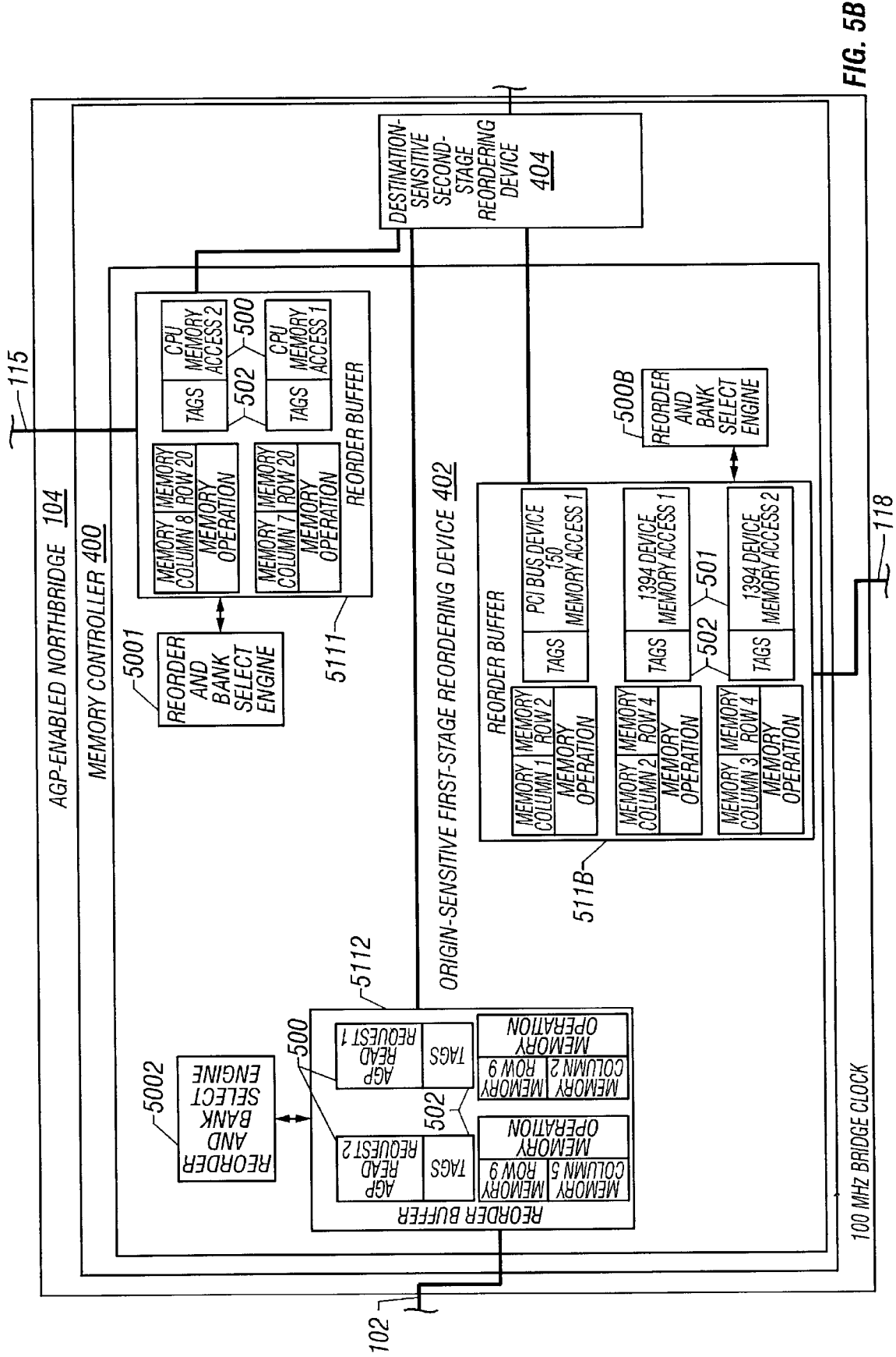
FIG. 5B illustrates an expanded view of another embodiment of a memory controller containing an origin-sensitive first-stage memory access request reordering device and a destination-sensitive second-stage memory access request reordering device.

Referring now to FIG. 5B, depicted is an expanded internal view of AGP-enabled Northbridge 104 containing an embodiment of origin-sensitive first-stage memory access request reordering device 402 and destination-sensitive second-stage memory access request reordering device 404. Illustrated is that contained within origin-sensitive first-stage memory access request reordering device 402 are B (where B is some positive integer associated with a number of buses feeding AGP-enabled Northbridge 104) reorder and bank select engines 5001–500B, which are respectively paired with reorder buffers 5111–511B (B equals 3 in the example shown). Depicted is that each reorder buffer 5111–511B is paired with a specific bus, such as CPU bus 115, AGP Interconnect 102, and PCI bus 118. Further depicted is that within each reorder buffer 5111–511B, the buffered requested memory operations may be associated with an indicator 500 of the initiator of the requested memory transaction. Further shown is that each such memory operation may also have associated with it a "tag" 502 which may contain one or more units indicative of one or more parameters related to the source of the memory operation. Utilizing such information, origin-sensitive first-stage memory access request reordering device 402 can more efficiently reorder the memory requests on the basis of the bus from which the memory transaction originates, the initiator, or any tags which may be present, or any combination of such information (e.g., bus and/or tags and/or initiator id) which may be present. In other words, origin-sensitive first-stage memory access request reordering device 402 is capable of utilizing any possible correlations that exist in data received on the basis of various and sundry source attributes, which is not done in the absence of the current invention.

Figure 6A:
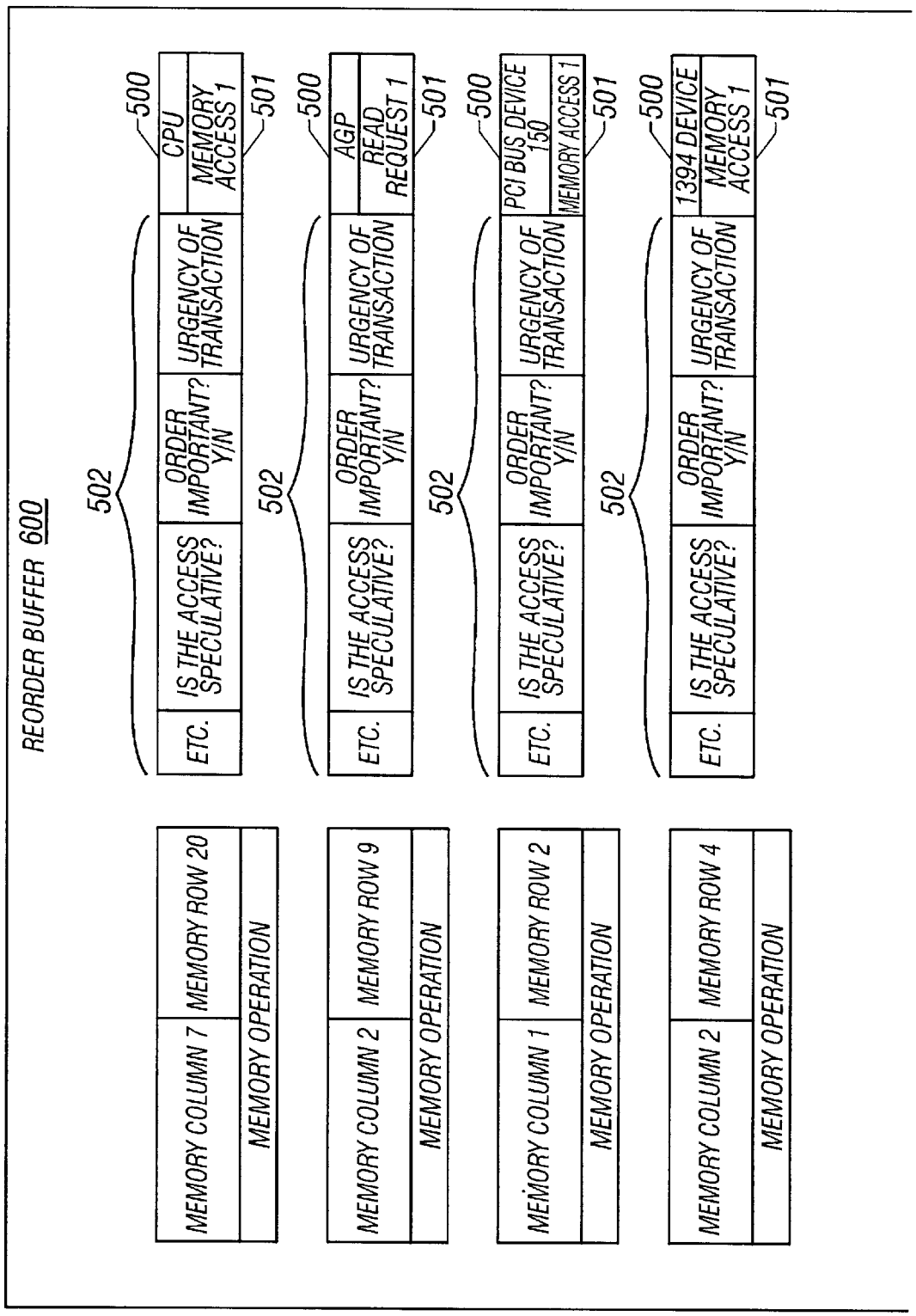
FIG. 6 shows non-exclusive examples of information which may be contained within tags utilized by embodiments of the present invention.
Figure 6B:
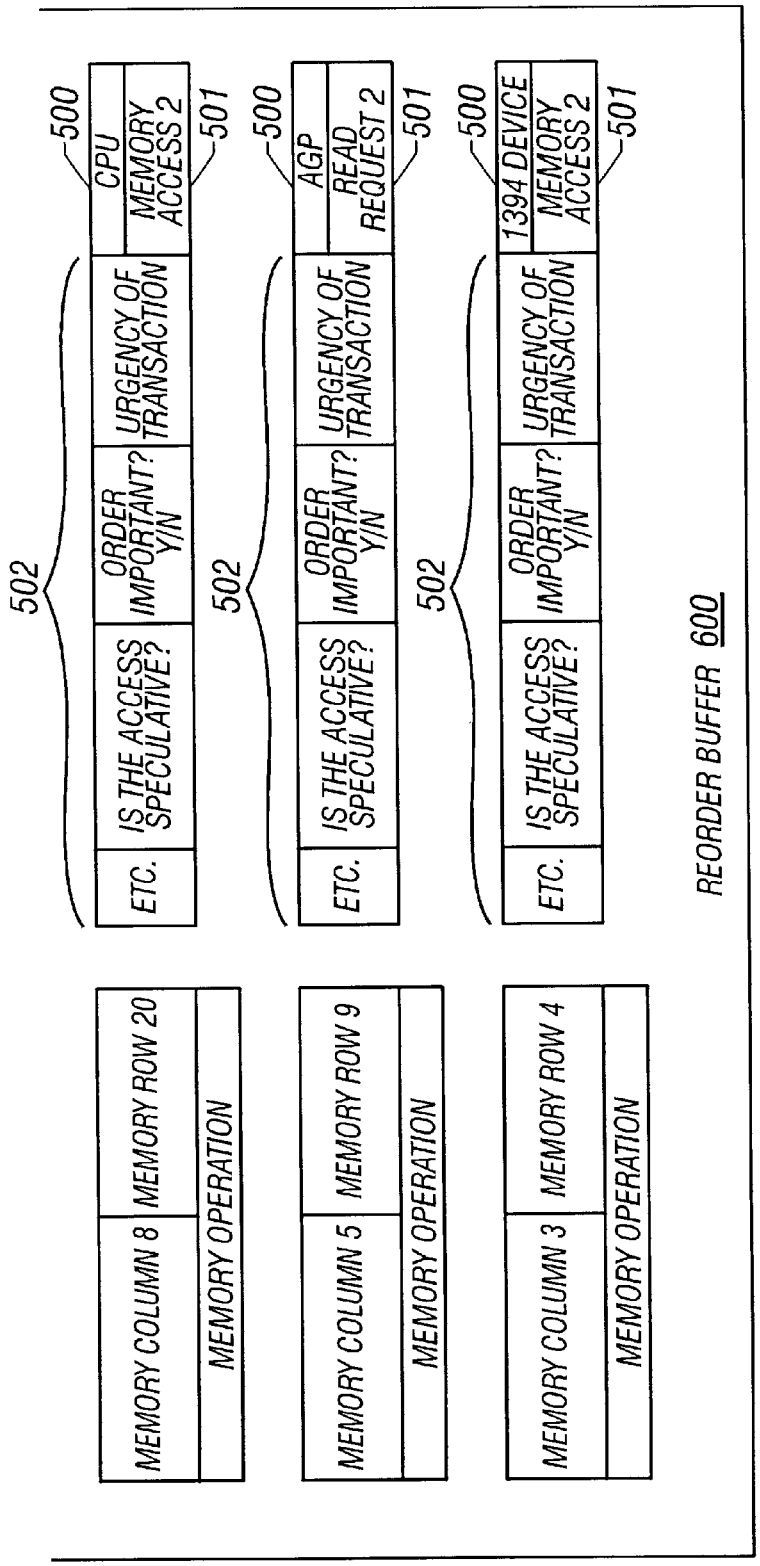

With reference now to FIG. 6, shown are, among other things, non-exclusive examples of information which may be contained within tags 502. Illustrated is an expanded view of a reorder buffer 600 typical of reorder buffers 5611–561S or 5111–511B. Depicted is that tags 502 may contain within them information related to the urgency of a transaction (such as a priority), whether the transaction received from an initiating source must be answered in the order received, whether the access is speculative, etc. Also shown are examples of indicator 500 of the initiator and examples of ordinal number delimiter 501. It is to be understood that although the identity of the initiator, the urgency (the ordinal number delimiter 501 gives an indication of ordering relative to other memory access requests originating from a particular memory access request source) of the transaction, the ordering information, and the speculative nature of the requested memory accesses are denoted, such specific items of information are exemplary and are not intended to be limiting, and that each of the items of information shown can appear in isolation or in combination with other items of like information; furthermore, it will be appreciated by those within the art that many other types of information related to each memory transaction are available at each system interface, and that such information is intended to be encompassed within the embodiment shown. Likewise it is to be understood that each tag 502 need not be of the same length nor contain the same type of information in order to fit within the spirit of the embodiment shown. Since indicator 500 of the initiator, ordinal number delimiter 501, and tags 502 can convey information related in some sense to a source of data, they (indicator 500 of initiator, ordinal number delimiter 501, and tags 502) can be thought of as specific instances of "source-specific informants."

Referring yet again to FIGS. 5A and 5B, it can be seen that, utilizing such information as was described in relation to FIG. 6, a number of different algorithms may be implemented within each reorder and bank select engine respectively paired with each reorder buffer. For example, one implementation could reorder the requests so that all requests sharing a single DRAM 130 page are placed together. When these requests are subsequently processed, the DRAM 130 page miss rate would be reduced, improving overall throughput. The exact choice of reorder algorithm depends on the source of the requests, and the information available within the requests. One advantage of an embodiment of the present invention is that the separate reorder and bank select engines, respectively paired with the separate reorder buffers, give rise to the ability to customize any algorithm utilized by each such pairings, which will allow multiple bus-specific and/or source-specific custom algorithms to be deployed contemporaneously.

Figure 7A:
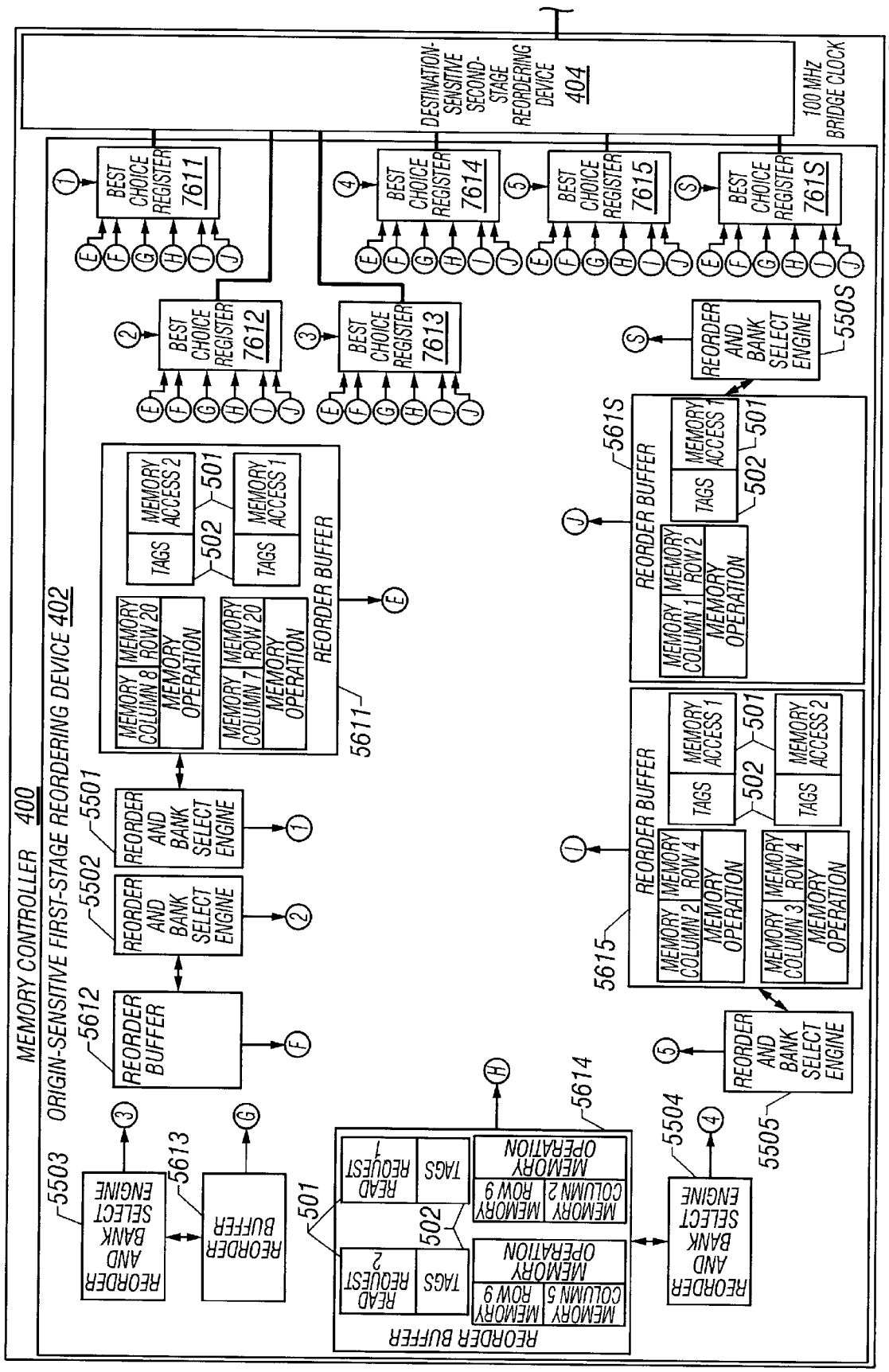
FIG. 7A depicts yet another embodiment wherein best choice registers are interposed between reorder buffers and a destination-sensitive second-stage memory access request reordering device.

With reference now to FIG. 7A, depicted is another embodiment. The embodiment illustrated functions in substantially the same way as that described in relation to FIG. 5A, except illustrated is that best choice registers 7611–761S are interposed between reorder buffers 5611–561S and destination-sensitive second-stage memory access request reordering device 404. Depicted is that each best choice register 7611–761S is connected to and accepts output from all reorder buffers 5611–561S. Shown is that reorder and bank select engines 5501–550S send control signals 1 to S to best choice registers 7611–761S, which then accept input from a selected reorder buffer 5611–561S in response to the control signals 1 to S. Best choice registers 7611–761S hold the "best choice" request available from each requester, along with specific information about each such best choice request. The information about the request, along with the identity of each requester which is implicit in the existence of the separate result registers for each reorder buffer, form the basis of the decision making within destination-sensitive second-stage memory access request reordering device 404. Destination-sensitive second-stage memory access request reordering device 404 utilizes this information, along with the current state of DRAMs 1301–130D (it will be understood by those within the art that although DRAMs are shown, such DRAMs could also be replaced by banks of memory) in system memory 116, to select the next memory operation for execution.

Those skilled in the art will recognize that a key data item in the information from best choice registers 7611–761S to destination-sensitive second-stage memory access request reordering device 404 is whether or not the current "best choice" cycle falls into the same page as the last request from this source placed into this register. The destination-sensitive second-stage memory access request reordering device 404 can use this data to increase DRAMs 1301–130D page hit percentage by giving preference to any requests for accesses that are in-page (within an open page).

Figure 7B:
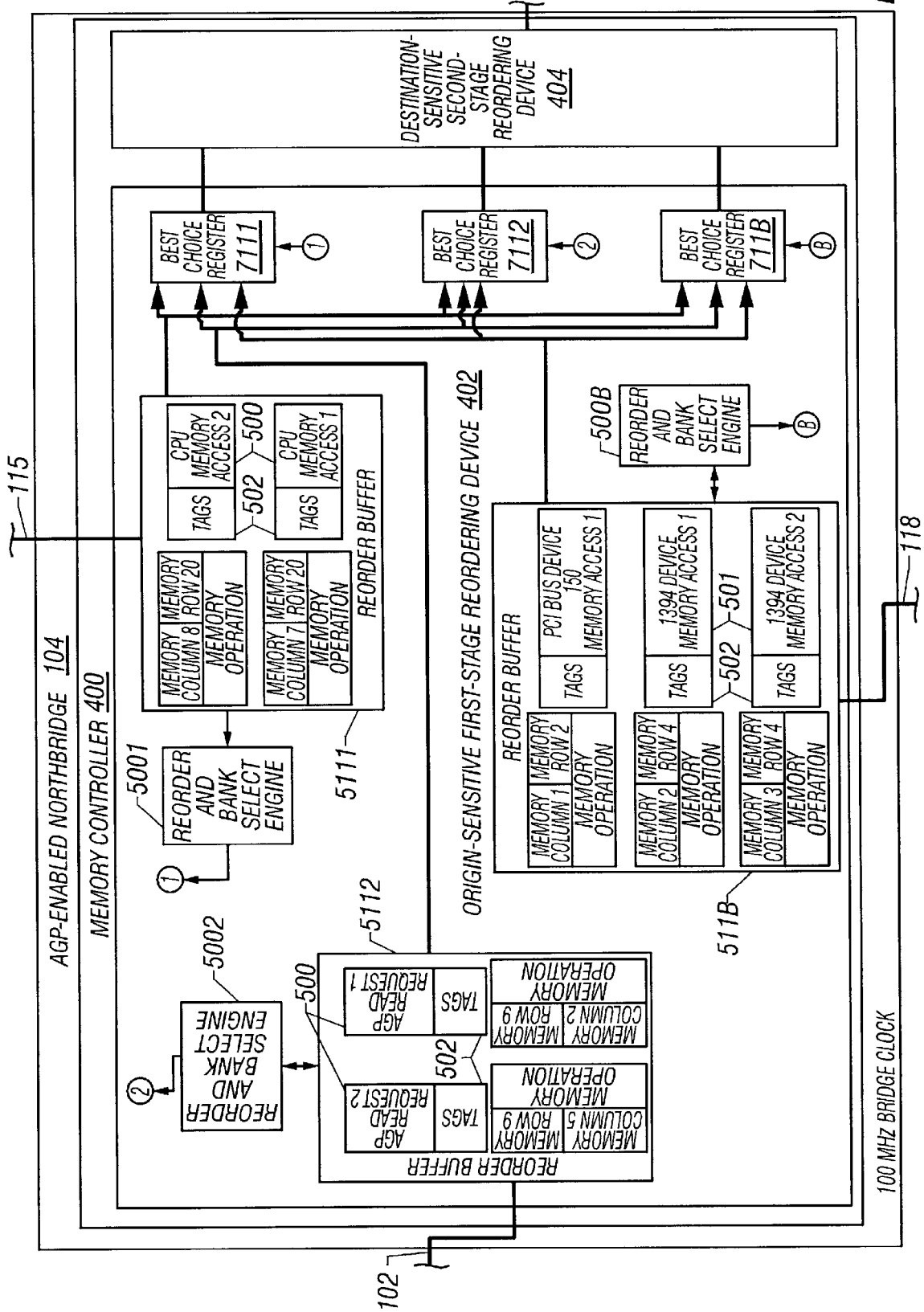
FIG. 7B depicts yet still another embodiment wherein best choice registers are interposed between reorder buffers and a destination-sensitive second-stage memory access request reordering device.

Referring now to FIG. 7B, depicted is another embodiment. The embodiment functions in substantially the same way as the embodiment described in relation to FIG. 5B, except that shown are best choice registers 7111–711B interposed between reorder buffers 5111–511B and destination-sensitive second-stage reorder device 404. Depicted is that each best choice register 7111–711B is connected to and accepts output from all reorder buffers 5111–511B. Shown is that reorder and bank select engines 5001–500B sends control signals 1 to S to best choice registers 7111–711B, which then accept input from a selected reorder buffer 5111–511B in response to the control signals 1 to B. Best choice registers 7111–711B hold the "best choice" request available from each requester, along with specific information about each such best choice request. The information about the request, along with the identity of each requester which is implicit in the existence of the separate result registers for each reorder buffer, form the basis of the decision making within destination-sensitive second-stage memory access request reordering device 404. Destination-sensitive second-stage memory access request reordering device 404 utilizes this information, along with the current state of DRAMs 1301–130D (it will be understood by those within the art that although DRAMs are shown, each such DRAMs could also be replaced by banks of memory) in system memory 116, to select the next memory operation for execution.

Those skilled in the art will recognize that a key data item in the information from best choice registers 7111–711B to destination-sensitive second-stage memory access request reordering device 404 is whether or not the current "best choice" cycle falls into the same page as the last request from this source placed into this register. The destination-sensitive second-stage memory access request reordering device 404 can use this data to increase the DRAMs 1301–130D page hit percentage by giving preference to any requests for accesses that are in-page (within an open page).

As a final point, it should be noted that implicit in FIGS. 5A, 5B, 7A, and 7B is that the outputs from each reorder buffer 5611–561S, reorder buffer 5111–511B, best choice register 7611–761S, or best choice register 7111–711B are presented to destination-sensitive second-stage memory access request reordering device 404. It will be noted that in order to allow destination-sensitive second-stage memory access request reordering device 404 to substantially maximize DRAM throughput and achieve low latencies, it is important that any algorithm(s) ultimately employed within destination-sensitive second-stage memory access request reordering device 404 use the information output from origin-sensitive first-stage memory access request reordering device 402.

IV. Structure and Operation for Destination-Sensitive Memory Control and Access in Data Processing Systems With reference now to FIG. 8A1, shown is an expanded view of an embodiment of destination-sensitive second-stage memory access request reordering device 404. Depicted is that origin-sensitive first-stage memory access request reordering device 402 is interfaced with destination-sensitive second-stage memory access request reordering device 404. Origin-sensitive first-stage memory access request reordering device 402 is essentially the embodiment shown in FIG. 5A. However, for sake of clarity the memory operations depicted internal to the reorder buffers shown in FIG. 5A are not shown in FIG. 8A1, although such operations are still presumed to be present.

Illustrated is that the outputs of reorder buffers 5611–561S feed into centralized state machine 800. Shown is that centralized state machine 800 receives system memory 116 state information related to the states of various devices in system memory 116, such as DRAM chips 1301–130D, via memory status lines[1] 8511–851D.

[1] While embodiments set forth herein describe centralized state machines (eg., 800) and/or components thereof (e.g. device arbiter and state engines 8001–800D) acquiring memory status via memory status lines (e.g., 8511–851D), it is to be understood that for each such described embodiment, corresponding alternate embodiments acquire memory status without such memory status lines. In such alternate embodiments, the centralized state machines and/or components thereof are operably connected to one or more memory devices (e.g., DRAM chips 1301–130D) not physically but by logical association whereby memory status is determined based on previous memory access activity (e.g., previous memory requests issued and/or elapsed time since requests issued can be used to determine/acquire the status of the one or more system memory devices).

Depicted is that within destination-sensitive second-stage memory access request reordering device 404 are memory device buffers 8011–801D, where each memory device buffer 8011–801D is associated with a respective DRAM chip 1301–130D.

As has been discussed in relation to FIG. 5A, the reorder and bank select engines 5501–550S have reordered the entries in their respective reorder buffers 5611–561S such that centralized state machine 800 is presented with what appears to be the most advantageous memory operation to be next executed within the respective reorder buffers 5611–561S. Centralized state machine 800 utilizes such information in conjunction with that information gleaned from memory status lines 8511–851D to dispatch the memory requests received from the various reorder buffers 5611–561S to the various memory device buffers 8011–801D for subsequent accessing of the various memory devices, or DRAM chips 1301–130D, in system memory 116.

Centralized state machine 800 can reorder the requests in each of the memory device buffers 8011–801D. Consequently, upon receipt of requested memory operations from the various reorder buffers 5611–561S, centralized state machine can use these preliminary "guesses" as to the memory operation to be next executed, in conjunction with the state of system memory received via memory status lines 8511–851D, in order both to dispatch the requested operations to an appropriate memory device buffer 8011–801D, and reorder the requests within the buffer to which the request is dispatched such that system memory 116 utilization and access is substantially maximized.

Those skilled in the art will recognize that there are numerous different algorithms which can be employed by centralized state machine 800 to ensure such near optimum system memory 116 utilization. For example, the received memory requests can be placed in the appropriate buffers and subsequently positioned within such buffers to take advantage of any pages in memory that may be open, or are likely to be opened given the current contents of any such memory device buffer 8011–851D. Another example of such algorithms are giving priority to memory access requests that result in not having to change direction of data flow.

With reference now to FIG. 8A2, shown is yet another embodiment of destination-sensitive second-stage memory access request reordering device 404. The embodiment depicted in FIG. 8A2 is substantially the same as that depicted in FIG. 8A1; however, centralized state machine 800 of FIG. 8A1 has been replaced in FIG. 8A2 by device arbiter and state engines 8001–800D.

Illustrated is that device arbiter and state engines 8001–800D are contained within distributed state machine 850. Device arbiter and state engines 8001–800D are shown as so encapsulated in order to illustrate that each individual device arbiter and state engine 8001–800D accepts as inputs all of the outputs of reorder buffers 5611–561S. Depicted is that each device arbiter and state engine 8001–800D is respectively paired with a particular memory device, or DRAM chip 1301–130D. That is, each device arbiter and state engine shown accepts the state of a particular system memory device (e.g., a DRAM chip 1301–130D) which allows independent algorithms to be utilized by each device arbiter and state machine 8001–800D to control the access of each associated DRAM chip 1301–130D.

Referring now to FIG. 8B1 depicted is another embodiment of destination-sensitive second-stage memory access request reordering device 404. Depicted is an expanded view of memory controller 400. Illustrated is that contained within memory controller 400 are origin-sensitive first-stage memory access request reordering device 402 and destination-sensitive second-stage memory access request reordering device 404. The embodiment shown of origin-sensitive first-stage memory access request reordering device 402 is substantially that shown in FIG. 5A. FIG. 8B1 is substantially the same as the embodiment shown in FIG. 8A1, except that further shown in FIG. 8B1 is that reorder and bank select engines 5501–550S communicate with centralized state machine 802.

That is, shown is that each reorder and bank select engine 5501–550S has emanating from it a control signal, shown as control signals 1 through S. These control signals are shown as being received by centralized state machine 802.

The control information communicated to centralized state machine 802 can contain any number of types of information such as the various addresses to be accessed by the requests in any particular reorder buffer 5611–561S, whether or not the requests in the various reorder buffers 5601–561S are highly correlated (meaning that they tend to sequentially access memory within various closely associated memory locations), and various other information. Examples of such various other information are direction of data flow (i.e. read or write), whether request is speculative, source identification, whether request pertains to isochronous stream, and also heat status of devices. This can also be determined by command history.

Centralized state machine 802 can now utilize this additional control information in conjunction with that information already discussed in relation to FIG. 8A1 to make yet more intelligent decisions as to the memory device buffers 8011–801D to which various memory access requests will be dispatched, as well as decisions related to the ordering of such requests within the memory device buffers 8011–801D to which the requests are dispatched.

With reference now to FIG. 8B2, shown is yet another embodiment of destination-sensitive second-stage memory access request reordering device 404. The embodiment depicted in FIG. 8B2 is substantially the same as that depicted in FIG. 8B1; however, centralized state machine 802 of FIG. 8B1 has been replaced in FIG. 8B2 by device arbiter and state engines 8021–802D.

Illustrated is that device arbiter and state engines 8021–802D are contained within distributed state machine 852. Device arbiter and state engines 8021–802D are shown as so encapsulated in order to illustrate that each individual device arbiter and state engine 8021–802D accepts as inputs all of the outputs of reorder buffers 5611–561S. Depicted is that each device arbiter and state engine 8021–802D is respectively paired with a particular memory device, or DRAM chip 1301–130D. That is, each device arbiter and state engine shown accepts the state of a particular system memory device (e.g., a DRAM chip 1301–130D) which allows independent algorithms to be utilized by each device arbiter and state machine 8021–802D to control the access of each associated DRAM chip 1301–130D.

With reference now to FIG. 8C1, shown is yet another embodiment of destination-sensitive second-stage memory access request reordering device 404. Depicted is origin-sensitive first-stage memory access request reordering device 402, which functions in substantially the same way as the embodiment of origin-sensitive first-stage memory access request reordering device 402 discussed in relation to FIG. 7A. Illustrated is that the outputs of best choice registers 7611–761S are received by centralized state machine 804.

Centralized state machine 804 utilizes the memory requests contained within best choice registers 7611–761S in conjunction with the other control signals and information, discussed previously in relation to FIGS. 8A1 and 8B1, to dispatch the memory requests received from best choice registers 7611–761S to the various memory device buffers 8011–801D and to reorder the requests within the various memory device buffers 8011–801D such that near optimum utilization of system memory 116 is achieved.

With reference now to FIG. 8C2, shown is yet another embodiment of destination-sensitive second-stage memory access request reordering device 404. The embodiment depicted in FIG. 8C2 is substantially the same as that depicted in FIG. 8C1; however, centralized state machine 804 of FIG. 8C1 has been replaced in FIG. 8C2 by device arbiter and state engines 8041–804D.

Illustrated is that device arbiter and state engines 8041–804D are contained within distributed state machine 854. Device arbiter and state engines 8041–804D are shown as so encapsulated in order to illustrate that each individual device arbiter and state engine 8041–804D accepts as inputs all of the outputs of best choice registers 7611–761S. Depicted is that each device arbiter and state engine 8041–804D is respectively paired with a particular memory device, or DRAM chip 1301–130D. That is, each device arbiter and state engine shown accepts the state of a particular system memory device (e.g., a DRAM chip 1301–130D) which allows independent algorithms to be utilized by each device arbiter and state machine 8041–804D to control the access of each associated DRAM chip 1301–130D.

With reference now to FIG. 9A1, shown is an expanded view of an embodiment of destination-sensitive second-stage memory access request reordering device 404.

Depicted is that origin-sensitive first-stage memory access request reordering device 402 is interfaced with destination-sensitive second-stage memory access request reordering device 404. Origin-sensitive first-stage memory access request reordering device 402 is essentially the embodiment shown in FIG. 5B. However, for sake of clarity the memory operations depicted internal to the reorder buffers shown in FIG. 5B are not shown in FIG. 9A1, although such operations are still presumed to be present.

Illustrated is that the outputs of reorder buffers 5111–511B feed into centralized state machine 900. Shown is that centralized state machine 900 receives system memory 116 state information related to the states of various devices in system memory 116, such as DRAM chips 1301–130D, via memory status lines 9511–951D.

Depicted is that within destination-sensitive second-stage memory access request reordering device 404 are memory device buffers 9011–901D, where each memory device buffer 9011–901D is associated with a respective DRAM chip 1301–130D.

As has been discussed in relation to FIG. 5B, the reorder and bank select engines 5001–500B have reordered the entries in their respective reorder buffers 5111–511B such that centralized state machine 900 is presented with what appears to be the most advantageous memory operation to be next executed within the respective reorder buffers 5111–511B. Centralized state machine 900 utilizes such information in conjunction with that information gleaned from memory status lines 9511–951D to dispatch the memory requests received from the various reorder buffers 5111–511B to the various memory device buffers 9011–901D for subsequent accessing of the various memory devices, or DRAM chips 1301–130D in system memory 116.

Centralized state machine 900 can reorder the requests in each of the memory device buffers 9011–901D. Consequently, upon receipt of requested memory operations from the various reorder buffers 5111–511B, centralized state machine can use these preliminary "guesses" as to the memory operation to be next executed, in conjunction with the state of system memory received via memory status lines 9511–951D, in order to both dispatch the requested operations to the appropriate memory device buffer 9011–901D, and reorder the requests within the buffer to which the request is dispatched such that system memory 116 utilization and access is substantially maximized.

Those skilled in the art will recognize that there are numerous different algorithms which can be employed by centralized state machine 900 to ensure such near optimum system memory 116 utilization. For example, the received memory requests can be placed in the appropriate buffers and subsequently positioned within such buffers to take advantage of any pages in memory that may be open, or are likely to be opened given the current contents of any such memory device buffer 9011–951D.

With reference now to FIG. 9A2, shown is yet another embodiment of destination-sensitive second-stage memory access request reordering device 404. The embodiment depicted in FIG. 9A2 is substantially the same as that depicted in FIG. 9A1; however, centralized state machine 900 of FIG. 9A1 has been replaced in FIG. 9A2 by device arbiter and state engines 9001–900D.

Illustrated is that device arbiter and state engines 9001–900D are contained within distributed state machine 950. Device arbiter and state engines 9001–900D are shown as so encapsulated in order to illustrate that each individual device arbiter and state engine 9001–900D accepts as inputs all of the outputs of reorder buffers 5111–511B. Depicted is that each device arbiter and state engine 9001–900D is respectively paired with a particular memory device, or DRAM chip 1301–130D. That is, each device arbiter and state engine shown accepts the state of a particular system memory device (e.g., a DRAM chip 1301–130D) which allows independent algorithms to be utilized by each device arbiter and state machine 9001–900D to control the access of each associated DRAM chip 1301–130D.

Referring now to FIG. 9B1, depicted is another embodiment of destination-sensitive second-stage memory access request reordering device 404. Depicted is an expanded view of memory controller 400. Illustrated is that contained within memory controller 400 are origin-sensitive first-stage memory access request reordering device 402 and destination-sensitive second-stage memory access request reordering device 404. The embodiment shown of origin-sensitive first-stage memory access request reordering device 402 is substantially that shown in relation to FIG. 5B. FIG. 9B1 is substantially the same as the embodiment shown in relation to FIG. 9A1, except that further shown in FIG. 9B1 is that reorder and bank select engines 5001–500B communicate with centralized state machine 902.

That is, shown is that each reorder and bank select engine 5001–500B has emanating from it a control signal shown as control signals 1 through S. These control signals are shown as being received by centralized state machine 902.

The control information communicated to centralized state machine 902 can contain any number of types of information such as the various addresses to be accessed by the requests in any particular reorder buffer 5111–511B, whether or not the requests in the various reorder buffers 5101–511B are highly correlated (meaning that they tend to sequentially access memory within various closely associated memory locations), and various other information. Special requirements or alerts (such as buffer-full conditions) are requesting the memory access requests.

Centralized state machine 902 can now utilize this additional control information in conjunction with that information already discussed in relation to FIG. 9A1 to make yet more intelligent decisions as to the memory device buffers 9011–901D to which various memory access requests will be dispatched as well as the ordering of such requests within such memory device buffers 9011–901D.

With reference now to FIG. 9B2, shown is yet another embodiment of destination-sensitive second-stage memory access request reordering device 404. The embodiment depicted in FIG. 9B2 is substantially the same as that depicted in FIG. 9B1; however, centralized state machine 902 of FIG. 9B1 has been replaced in FIG. 9B2 by device arbiter and state engines 9021–902D.

Illustrated is that device arbiter and state engines 9021–902D are contained within distributed state machine 952. Device arbiter and state engines 9021–902D are shown as so encapsulated in order to illustrate that each individual device arbiter and state engine 9021–902D accepts as inputs all of the outputs of reorder buffers 5111–511B. Depicted is that each device arbiter and state engine 9021–902D is respectively paired with a particular memory device, or DRAM chip 1301–130D. That is, each device arbiter and state engine shown accepts the state of a particular system memory device (e.g., a DRAM chip 1301–130D) which allows independent algorithms to be utilized by each device arbiter and state machine 9021–902D to control the access of each associated DRAM chip 1301–130D.

With reference now to FIG. 9C1, shown is yet another embodiment of destination-sensitive second-stage memory access request reordering device 404. Depicted is origin-sensitive first-stage memory access request reordering device 402, which functions in substantially the same way as the embodiment of origin-sensitive first-stage memory access request reordering device 402 discussed in relation to FIG. 7B. Illustrated is that the outputs of best choice registers 7111–711B are received by centralized state machine 904.

Centralized state machine 904 utilizes the memory requests contained within best choice registers 7111–711B in conjunction with the other control signals and information, discussed previously in relation to FIGS. 9A1 and 9B1, to dispatch the memory requests received from best choice registers 7111–711B to the various memory device buffers 9011–901D and to reorder the requests within the various memory device buffers 9011–901D such that near optimum utilization of system memory 116 is achieved.

With reference now to FIG. 9C2, shown is yet another embodiment of destination-sensitive second-stage memory access request reordering device 404. The embodiment depicted in FIG. 9C2 is substantially the same as that depicted in FIG. 9C1; however, centralized state machine 904 of FIG. 9C1 has been replaced in FIG. 9C2 by device arbiter and state engines 9041–904D.

Illustrated is that device arbiter and state engines 9041–904D are contained within distributed state machine 954. Device arbiter and state engines 9041–904D are shown as so encapsulated in order to illustrate that each individual device arbiter and state engine 9041–904D accepts as inputs the outputs of best choice registers 7111–711B. Depicted is that each device arbiter and state engine 9041–904D is respectively paired with a particular memory device, or DRAM chip 1301–130D. That is, each device arbiter and state engine shown accepts the state of a particular system memory device (e.g., a DRAM chip 1301–130D) which allows independent algorithms to be utilized by each device arbiter and state machine 9041–904D to control the access of each associated DRAM chip 1301–130D.

V. Structure and Operation for Generating and Utilizing Speculative Memory Access Requests in Data Processing Systems The foregoing description has set forth the various ways in which memory latency can be reduced. It has been discovered that another way in which observed latency from memory accesses can be reduced is to begin a memory access request before a request is actually issued by a requester. This method relies on a speculative cycle generator.

Referring now to FIG. 10A1, shown is an expanded view of an embodiment of memory controller 400 wherein is contained an embodiment of a speculative memory access request generation and utilization structure and operation. FIG. 10A1 is substantially the same as the embodiment shown in FIG. 8A1, except that further shown in FIG. 10A1 is that each reorder and bank select engine 5501–550S is now associated with a respective origin-sensitive speculative memory access request cycle generator 1501–150S. Also shown is that centralized state machine 800 has been replaced by centralized state machine 1800.

Each origin-sensitive speculative memory access request cycle generator 1501–150S operates in tandem with its respectively paired reorder and bank select engine 5501–550S. Each origin-sensitive speculative memory access request cycle generator 1501–150S is respectively paired with a reorder buffer 5611–561S, and uses as input the memory access request cycle requests present in each respectively paired reorder buffer 5611–561S; furthermore, each origin-sensitive speculative memory access request cycle generator 1501–150S may also maintain cycle history in memory or registers (not shown) private to each such origin-sensitive speculative memory access request cycle generator. Each origin-sensitive speculative memory access request cycle generator 1501–150S uses algorithms that are specific to each source 1 through S in order to generate speculative memory access request cycle requests.

Each origin-sensitive speculative memory access request cycle generator 1501–150S places speculative cycle requests into its associated reorder buffer 5611–561S. Speculative cycle requests are reordered along with other requests by reorder and bank select engines 5501–550S and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle request generators 1501–150S, which change the status flag from a default "true access" value to a value indicating "speculative access."

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or source. The origin-sensitive speculative memory access request cycle generator for each buffer can employ different algorithms suited to the sources. This is in contrast to a solution that looks at cycle requests from all sources lumped together and attempts to make cycle predictions from a unified request buffer.

The origin-sensitive speculative memory access request cycle generator paired with a respective reorder buffer embodiment also allows the benefits of speculative memory access request cycle s to be obtained while at the same time eliminating the worst case interference problems. Essential to eliminating the adverse impact of speculative memory access request cycle s is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other sources. Alternative solutions that do not allow rejection of the speculative prefetch cycles can decrease system performance when loading is high.

Further referring to FIG. 10A1, depicted is that centralized state machine 1800 has internal to it speculative buffer checking and control logic 1002 and speculative cycle response buffer 1004. As has been noted, destination-sensitive second-stage memory access request reordering device 404 receives memory requests as either speculative or true memory access requests. Thus, in light of the discussion set forth above, it is clear that centralized state machine 1800 will also receive such requests in that all memory access requests pass through it in the embodiments described herein.

Assuming that a request so received is a speculative request, centralized state machine 1800 will determine, using its control algorithms, whether the current pending memory operations in memory device buffers 8011–801D make the execution of such speculative request advantageous. Assuming that such execution is advantageous, centralized state machine 1800 will execute the speculative memory operation request. Typically, the speculative memory operation request will be a read request. When data is received by centralized state machine 1800 in response to a speculative read request, that data is placed in speculative cycle response buffer 1004.

Thereafter, when centralized state machine 1800 receives a memory access read request, which is not a speculative request, centralized state machine 1800 utilizes speculative buffer checking and control logic 1002 to determine whether speculative cycle response buffer has within it data associated with the address of such a received memory access read request. That is, a speculative memory access request will not hit in the speculative cycle response buffer 1004, but rather will be passed through as a candidate for subsequent execution.

In the event that data associated with the non-speculative memory access read request address is in the speculative cycle response buffer, centralized state machine 1800 can then satisfy the request merely by retrieving the data from the speculative cycle response buffer 1004 thereby avoiding the latency associated with accessing system memory 116. It should be noted that in the event that centralized state machine 1800 receives a write request to an address which is correspondent to data with the same address in speculative cycle response buffer 1004, centralized state machine 1800 will utilize speculative buffer checking and control logic 1002 to remove such data from speculative cycle response buffer, since it is likely that the write request will change the data in system memory 116 and thus gives rise to the likelihood that the data in speculative cycle response buffer 1004 will not be current. Alternatively, centralized state machine 1800 could replace the data associated with the address in speculative cycle response buffer 1004 with the data in the write request while simultaneously writing the data to system memory 116.

Referring now to FIG. 10A2, shown is an expanded view of an embodiment of memory controller 400 wherein is contained another embodiment of a speculative memory access request generation and utilization structure and operation. FIG. 10A2 is substantially the same as the embodiment shown in FIG. 8A2, except that further shown in FIG. 10A2 is that each reorder and bank select engine 5501–550S is now associated with a respective origin-sensitive speculative memory access request cycle generator 1501–150S. Also shown is that centralized state machine 850 has been replaced by centralized state machine 1850.

Each origin-sensitive speculative memory access request cycle generator 1501–150S operates in tandem with its respectively paired reorder and bank select engine 5501–550S. Each origin-sensitive speculative memory access request cycle generator 1501–150S is respectively paired with a reorder buffer 5611–561S, and uses as input the memory access requests present in each respectively paired reorder buffer 5611–561S; furthermore, each origin-sensitive speculative memory access request cycle generator 1501–150S may also maintain cycle history in memory or registers (not shown) private to each such origin-sensitive speculative memory access request cycle generator. Each origin-sensitive speculative memory access request cycle generator 1501–150S uses algorithms that are specific to each source 1 through S in order to generate speculative cycle requests.

Each origin-sensitive speculative memory access request cycle generator 1501–150S places speculative cycle requests into its associated reorder buffer 5611–561S. Speculative cycle requests are reordered along with other requests by reorder and bank select engines 5501–550S and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generators 1501–150S, which change the status flag from a default "true access" value to a value indicating "speculative access."

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or source. The origin-sensitive speculative memory access request cycle generator for each buffer can employ different algorithms suited to the sources. This is in contrast to a solution that looks at cycle requests from all sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other sources. Alternative solutions that do not allow rejection of the speculative prefetch cycles can decrease system performance when loading is high.

Further referring to FIG. 10A2, depicted is that centralized state machine 1850 has internal to it speculative buffer checking and control logic 1006 and speculative cycle response buffer 1008. As has been noted, destination-sensitive second-stage memory access request reordering device 404 receives memory requests as either speculative or true memory access requests. Thus, in light of the discussion set forth above, it is clear that centralized state machine 1850 will also receive such requests in that all memory access requests pass through it in the embodiments described herein.

Assuming that a request so received is a speculative request, centralized state machine 1850 will determine, using its control algorithms, whether the current pending memory operations in memory device buffers 8011–801D makes the execution of such speculative request advantageous. Assuming that such execution is advantageous, centralized state machine 1850 will execute the speculative memory operation request. Typically, the speculative memory operation request will be a read request. When data is received by centralized state machine 1850 in response to a speculative read request, that data is placed in speculative cycle response buffer 1008.

Thereafter, when centralized state machine 1850 receives a memory access read request, which is not a speculative request, centralized state machine 1850 utilizes speculative buffer checking and control logic 1006 to determine whether speculative cycle response buffer has within it data associated with the address of such a received memory access read request. That is, a speculative memory access request will not hit in the speculative cycle response buffer 1008, but rather will be passed through as a candidate for subsequent execution.

In the event that data associated with the non-speculative memory access read request address is in the speculative cycle response buffer, centralized state machine 1850 can then satisfy the request merely by retrieving the data from the speculative cycle response buffer 1008 thereby avoiding the latency associated with accessing system memory 116. It should be noted that in the event that centralized state machine 1850 receives a write request to an address which is correspondent to data with the same address in speculative cycle response buffer 1008, centralized state machine 1850 will utilize speculative buffer checking and control logic 1000 to remove such data from speculative cycle response buffer, since it is likely that the write request will change the data in system memory 116 and thus gives rise to the likelihood that the data in speculative cycle response buffer 1008 will not be current. Alternatively, centralized state machine 1850 could replace the data associated with the address in speculative cycle response buffer 1008 with the data in the write request while simultaneously writing the data to system memory 116.

Referring now to FIG. 10B1, shown is an expanded view of an embodiment of memory controller 400 wherein is contained another embodiment of a speculative memory access request generation and utilization structure and operation. FIG. 10B1 is substantially the same as the embodiment shown in FIG. 8B1, except that further shown in FIG. 10B1 is that each reorder and bank select engine 5501–550S is now associated with a respective origin-sensitive speculative memory access request cycle generator 1501–150S. Also shown is that centralized state machine 802 has been replaced by centralized state machine 1802.

Each origin-sensitive speculative memory access request cycle generator 1501–150S operates in tandem with its respectively paired reorder and bank select engine 5501–550S. Each origin-sensitive speculative memory access request cycle generator 1501–150S is respectively paired with a reorder buffer 5611–561S, and uses as input the memory access requests present in each respectively paired reorder buffer 5611–561S; furthermore, each origin-sensitive speculative memory access request cycle generator 1501–150S may also maintain cycle history in memory or registers (not shown) private to each such origin-sensitive speculative memory access request cycle generator. Each origin-sensitive speculative memory access request cycle generator 1501–150S uses algorithms that are specific to each source 1 through S in order to generate speculative cycle requests.

Each origin-sensitive speculative memory access request cycle generator 1501–150S places speculative cycle requests into its associated reorder buffer 5611–561S. Speculative cycle requests are reordered along with other requests by reorder and bank select engines 5501–550S and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generators 1501–150S, which change the status flag from a default "true access" value to a value indicating "speculative access." In another embodiment, origin-sensitive speculative memory access request cycle generators 1501–150S communicate with their respectively paired reorder and bank select engines 5501–550S, which subsequently transmit information indicating whether certain pending requests are speculative or not over control signal lines 1–S, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or source. The origin-sensitive speculative memory access request cycle generator for each buffer can employ different algorithms suited to the sources. This is in contrast to a solution that looks at cycle requests from all sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other sources. Alternative solutions that do not allow rejection of the speculative prefetch cycles can decrease system performance when loading is high.

Further referring to FIG. 10B1, depicted is that centralized state machine 1802 has internal to it speculative buffer checking and control logic 1010 and speculative cycle response buffer 1012. As has been noted, destination-sensitive second-stage memory access request reordering device 404 receives memory requests as either speculative or true memory access requests. Thus, in light of the discussion set forth above, it is clear that centralized state machine 1802 will also receive such requests in that all memory access requests pass through it in the embodiments described herein.

Assuming that a request so received is a speculative request, centralized state machine 1802 will determine, using its control algorithms, whether the current pending memory operations in memory device buffers 8011–801D makes the execution of such speculative request advantageous. Assuming that such execution is advantageous, centralized state machine 1802 will execute the speculative memory operation request. Typically, the speculative memory operation request will be a read request. When data is received by centralized state machine 1802 in response to a speculative read request, that data is placed in speculative cycle response buffer 1012.

Thereafter, when centralized state machine 1802 receives a memory access read request, which is not a speculative request, centralized state machine 1802 utilizes speculative buffer checking and control logic 1010 to determine whether speculative cycle response buffer has within it data associated with the address of such a received memory access read request. That is, a speculative memory access request will not hit in the speculative cycle response buffer 1012, but rather will be passed through as a candidate for subsequent execution.

In the event that data associated with the non-speculative memory access read request address is in the speculative cycle response buffer, centralized state machine 1802 can then satisfy the request merely by retrieving the data from the speculative cycle response buffer 1012 thereby avoiding the latency associated with accessing system memory 116. It should be noted that in the event that centralized state machine 1802 receives a write request to an address which is correspondent to data with the same address in speculative cycle response buffer 1012, centralized state machine 1802 will utilize speculative buffer checking and control logic 1010 to remove such data from speculative cycle response buffer, since it is likely that the write request will change the data in system memory 116 and thus gives rise to the likelihood that the data in speculative cycle response buffer 1012 will not be current. Alternatively, centralized state machine 1802 could replace the data associated with the address in speculative cycle response buffer 1012 with the data in the write request while simultaneously writing the data to system memory 116.

Referring now to FIG. 10B2, shown is an expanded view of an embodiment of memory controller 400 wherein is contained another embodiment of a speculative memory access request generation and utilization structure and operation. FIG. 10B2 is substantially the same as the embodiment shown in FIG. 8B2, except that further shown in FIG. 10B2 is that each reorder and bank select engine 5501–550S is now associated with a respective origin-sensitive speculative memory access request cycle generator 1501–150S. Also shown is that centralized state machine 852 has been replaced by centralized state machine 1852.

Each origin-sensitive speculative memory access request cycle generator 1501–150S operates in tandem with its respectively paired reorder and bank select engine 5501–550S. Each origin-sensitive speculative memory access request cycle generator 1501–150S is respectively paired with a reorder buffer 5611–561S, and uses as input the memory access requests present in each respectively paired reorder buffer 5611–561S; furthermore, each origin-sensitive speculative memory access request cycle generator 1501–150S may also maintain cycle history in memory or registers (not shown) private to each such origin-sensitive speculative memory access request cycle generator. Each origin-sensitive speculative memory access request cycle generator 1501–150S uses algorithms that are specific to each source 1 through S in order to generate speculative cycle requests.

Each origin-sensitive speculative memory access request cycle generator 1501–150S places speculative cycle requests into its associated reorder buffer 5611–561S. Speculative cycle requests are reordered along with other requests by reorder and bank select engines 5501–550S and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generators 1501–150S, which change the status flag from a default "true access" value to a value indicating "speculative access." In another embodiment, origin-sensitive speculative memory access request cycle generators 1501–150S communicate with their respectively paired reorder and bank select engines 5501–550S, which subsequently transmit information indicating whether certain pending requests are speculative or not over control signal lines 1–S, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or source. The origin-sensitive speculative memory access request cycle generator for each buffer can employ different algorithms suited to the sources. This is in contrast to a solution that looks at cycle requests from all sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other sources. Alternative solutions that do not allow rejection of the speculative prefetch cycles can decrease system performance when loading is high.

Further referring to FIG. 10B2, depicted is that centralized state machine 1852 has internal to it speculative buffer checking and control logic 1014 and speculative cycle response buffer 1016. As has been noted, destination-sensitive second-stage memory access request reordering device 404 receives memory requests as either speculative or true memory access requests. Thus, in light of the discussion set forth above, it is clear that centralized state machine 1852 will also receive such requests in that all memory access requests pass through it in the embodiments described herein.

Assuming that a request so received is a speculative request, centralized state machine 1852 will determine, using its control algorithms, whether the current pending memory operations in memory device buffers 8011–801D makes the execution of such speculative request advantageous. Assuming that such execution is advantageous, centralized state machine 1852 will execute the speculative memory operation request. Typically, the speculative memory operation request will be a read request. When data is received by centralized state machine 1852 in response to a speculative read request, that data is placed in speculative cycle response buffer 1016.

Thereafter, when centralized state machine 1852 receives a memory access read request, which is not a speculative request, centralized state machine 1852 utilizes speculative buffer checking and control logic 1014 to determine whether speculative cycle response buffer has within it data associated with the address of such a received memory access read request. That is, a speculative memory access request will not hit in the speculative cycle response buffer 1016, but rather will be passed through as a candidate for subsequent execution.

In the event that data associated with the non-speculative memory access read request address is in the speculative cycle response buffer, centralized state machine 1852 can then satisfy the request merely by retrieving the data from the speculative cycle response buffer 1016 thereby avoiding the latency associated with accessing system memory 116. It should be noted that in the event that centralized state machine 1852 receives a write request to an address which is correspondent to data with the same address in speculative cycle response buffer 1016, centralized state machine 1852 will utilize speculative buffer checking and control logic 1014 to remove such data from speculative cycle response buffer, since it is likely that the write request will change the data in system memory 116 and thus gives rise to the likelihood that the data in speculative cycle response buffer 1016 will not be current. Alternatively, centralized state machine 1852 could replace the data associated with the address in speculative cycle response buffer 1016 with the data in the write request while simultaneously writing the data to system memory 116.

Referring now to FIG. 10C1, shown is an expanded view of an embodiment of memory controller 400 wherein is contained another embodiment of a speculative memory access request generation and utilization structure and operation. FIG. 10C1 is substantially the same as the embodiment shown in FIG. 8C1, except that further shown in FIG. 10C1 is that each reorder and bank select engine 5501–550S is now associated with a respective origin-sensitive speculative memory access request cycle generator 1501–150S. Also shown is that centralized state machine 804 has been replaced by centralized state machine 1804.

Each origin-sensitive speculative memory access request cycle generator 1501–150S operates in tandem with its respectively paired reorder and bank select engine 5501–550S. Each origin-sensitive speculative memory access request cycle generator 1501–150S is respectively paired with a reorder buffer 5611–561S, and uses as input the memory access requests present in each respectively paired reorder buffer 5611–561S; furthermore, each origin-sensitive speculative memory access request cycle generator 1501–150S may also maintain cycle history in memory or registers (not shown) private to each such origin-sensitive speculative memory access request cycle generator. Each origin-sensitive speculative memory access request cycle generator 1501–150S uses algorithms that are specific to each source 1 through S in order to generate speculative cycle requests.

Each origin-sensitive speculative memory access request cycle generator 1501–150S places speculative cycle requests into its associated reorder buffer 5611–561S. Speculative cycle requests are reordered along with other requests by reorder and bank select engines 5501–550S and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1501–150S, which change the status flag from a default "true access" value to a value indicating "speculative access." In another embodiment, origin-sensitive speculative memory access request cycle generators 1501–150S communicate with their respectively paired reorder and bank select engines 5501–550S, which subsequently transmit information indicating whether certain pending requests are speculative or not over control signal lines 1–S, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or source. The origin-sensitive speculative memory access request cycle generator for each buffer can employ different algorithms suited to the sources. This is in contrast to a solution that looks at cycle requests from all sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other sources. Alternative solutions that do not allow rejection of the speculative prefetch cycles can decrease system performance when loading is high.

Further referring to FIG. 10C1, depicted is that centralized state machine 1804 has internal to it speculative buffer checking and control logic 1018 and speculative cycle response buffer 1020. As has been noted, destination-sensitive second-stage memory access request reordering device 404 receives memory requests as either speculative or true memory access requests. Thus, in light of the discussion set forth above, it is clear that centralized state machine 1804 will also receive such requests in that all memory access requests pass through it in the embodiments described herein.

Assuming that a request so received is a speculative request, centralized state machine 1804 will determine, using its control algorithms, whether the current pending memory operations in memory device buffers 8011–801D makes the execution of such speculative request advantageous. Assuming that such execution is advantageous, centralized state machine 1804 will execute the speculative memory operation request. Typically, the speculative memory operation request will be a read request. When data is received by centralized state machine 1804 in response to a speculative read request, that data is placed in speculative cycle response buffer 1020.

Thereafter, when centralized state machine 1804 receives a memory access read request, which is not a speculative request, centralized state machine 1804 utilizes speculative buffer checking and control logic 1018 to determine whether speculative cycle response buffer has within it data associated with the address of such a received memory access read request. That is, a speculative memory access request will not hit in the speculative cycle response buffer 1020, but rather will be passed through as a candidate for subsequent execution.

In the event that data associated with the non-speculative memory access read request address is in the speculative cycle response buffer, centralized state machine 1804 can then satisfy the request merely by retrieving the data from the speculative cycle response buffer 1020 thereby avoiding the latency associated with accessing system memory 116. It should be noted that in the event that centralized state machine 1804 receives a write request to an address which is correspondent to data with the same address in speculative cycle response buffer 1020, centralized state machine 1804 will utilize speculative buffer checking and control logic 1018 to remove such data from speculative cycle response buffer, since it is likely that the write request will change the data in system memory 116 and thus gives rise to the likelihood that the data in speculative cycle response buffer 1020 will not be current. Alternatively, centralized state machine 1804 could replace the data associated with the address in speculative cycle response buffer 1020 with the data in the write request while simultaneously writing the data to system memory 116.

Referring now to FIG. 10C2, shown is an expanded view of an embodiment of memory controller 400 wherein is contained another embodiment of a speculative memory access request generation and utilization structure and operation. FIG. 10C2 is substantially the same as the embodiment shown in FIG. 8C2, except that further shown in FIG. 10C2 is that each reorder and bank select engine 5501–550S is now associated with a respective origin-sensitive speculative memory access request cycle generator 1501–150S. Also shown is that centralized state machine 854 has been replaced by centralized state machine 1854.

Each origin-sensitive speculative memory access request cycle generator 1501–150S operates in tandem with its respectively paired reorder and bank select engine 5501–550S. Each origin-sensitive speculative memory access request cycle generator 1501–150S is respectively paired with a reorder buffer 5611–561S, and uses as input the memory access requests present in each respectively paired reorder buffer 5611–561S; furthermore, each origin-sensitive speculative memory access request cycle generator 1501–150S may also maintain cycle history in memory or registers (not shown) private to each such origin-sensitive speculative memory access request cycle generator. Each origin-sensitive speculative memory access request cycle generator 1501–150S uses algorithms that are specific to each source 1 through S in order to generate speculative cycle requests.

Each origin-sensitive speculative memory access request cycle generator 1501–150S places speculative cycle requests into its associated reorder buffer 5611–561S. Speculative cycle requests are reordered along with other requests by reorder and bank select engines 5501–550S and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1501–150S, which change the status flag from a default "true access" value to a value indicating "speculative access." In another embodiment, origin-sensitive speculative memory access request cycle generators 1501–150S communicate with their respectively paired reorder and bank select engines 5501–550S, which subsequently transmit information indicating whether certain pending requests are speculative or not over control signal lines 1–S, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or source. The origin-sensitive speculative memory access request cycle generator for each buffer can employ different algorithms suited to the sources. This is in contrast to a solution that looks at cycle requests from all sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other sources. Alternative solutions that do not allow rejection of the speculative prefetch cycles can decrease system performance when loading is high.

Further referring to FIG. 10C2, depicted is that centralized state machine 1854 has internal to it speculative buffer checking and control logic 1022 and speculative cycle response buffer 1024. As has been noted, destination-sensitive second-stage memory access request reordering device 404 receives memory requests as either speculative or true memory access requests. Thus, in light of the discussion set forth above, it is clear that centralized state machine 1854 will also receive such requests in that all memory access requests pass through it in the embodiments described herein.

Assuming that a request so received is a speculative request, centralized state machine 1854 will determine, using its control algorithms, whether the current pending memory operations in memory device buffers 8011–801D makes the execution of such speculative request advantageous. Assuming that such execution is advantageous, centralized state machine 1854 will execute the speculative memory operation request. Typically, the speculative memory operation request will be a read request. When data is received by centralized state machine 1854 in response to a speculative read request, that data is placed in speculative cycle response buffer 1024.

Thereafter, when centralized state machine 1854 receives a memory access read request, which is not a speculative request, centralized state machine 1854 utilizes speculative buffer checking and control logic 1022 to determine whether speculative cycle response buffer has within it data associated with the address of such a received memory access read request. That is, a speculative memory access request will not hit in the speculative cycle response buffer 1024, but rather will be passed through as a candidate for subsequent execution.

In the event that data associated with the non-speculative memory access read request address is in the speculative cycle response buffer, centralized state machine 1854 can then satisfy the request merely by retrieving the data from the speculative cycle response buffer 1024 thereby avoiding the latency associated with accessing system memory 116. It should be noted that in the event that centralized state machine 1854 receives a write request to an address which is correspondent to data with the same address in speculative cycle response buffer 1024, centralized state machine 1854 will utilize speculative buffer checking and control logic 1022 to remove such data from speculative cycle response buffer, since it is likely that the write request will change the data in system memory 116 and thus gives rise to the likelihood that the data in speculative cycle response buffer 1024 will not be current. Alternatively, centralized state machine 1854 could replace the data associated with the address in speculative cycle response buffer 1024 with the data in the write request while simultaneously writing the data to system memory 116.

Referring now to FIG. 11A1, shown is an expanded view of an embodiment of memory controller 400 wherein is contained another embodiment of a speculative memory access request generation and utilization structure and operation. FIG. 11A1 is substantially the same as the embodiment shown in FIG. 9A1, except that further shown in FIG. 11A1 is that each reorder and bank select engine 5001–505B is now associated with a respective origin-sensitive speculative memory access request cycle generator 1101–110B. Also shown is that centralized state machine 900 has been replaced by centralized state machine 1900.

Each origin-sensitive speculative memory access request cycle generator 1101–110B operates in tandem with its respectively paired reorder and bank select engine 5001–501B. Each origin-sensitive speculative memory access request cycle generator 1101–110B is respectively paired with a reorder buffer 5111–511B, and uses as input the memory access requests present in each respectively paired reorder buffer 5111–511B; furthermore, each origin-sensitive speculative memory access request cycle generator 1101–110B may also maintain cycle history in memory or registers (not shown) private to each such origin-sensitive speculative memory access request cycle generator. Each origin-sensitive speculative memory access request cycle generator 1101–110B uses algorithms that are specific to each buffer 1 through B in order to generate speculative cycle requests.

Each origin-sensitive speculative memory access request cycle generator 1101–110B places speculative cycle requests into its associated reorder buffer 5111–511B. Speculative cycle requests are reordered along with other requests by reorder and bank select engines 5001–501B and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1101–110B, which change the status flag from a default "true access" value to a value indicating "speculative access."

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or bus/source. The origin-sensitive speculative memory access request cycle generator for each buffer can employ different algorithms suited to the buses/sources. This is in contrast to a solution that looks at cycle requests from all buses/sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other buses/sources. Alternative solutions that do not allow rejection of the speculative prefetch cycles can decrease system performance when loading is high.

Further referring to FIG. 11A1, depicted is that centralized state machine 1900 has internal to it speculative buffer checking and control logic 1026 and speculative cycle response buffer 1028. As has been noted, destination-sensitive second-stage memory access request reordering device 404 receives memory requests as either speculative or true memory access requests. Thus, in light of the discussion set forth above, it is clear that centralized state machine 1900 will also receive such requests in that all memory access requests pass through it in the embodiments described herein.

Assuming that a request so received is a speculative request, centralized state machine 1900 will determine, using its control algorithms, whether the current pending memory operations in memory device buffers 801I–801D makes the execution of such speculative request advantageous. Assuming that such execution is advantageous, centralized state machine 1900 will execute the speculative memory operation request. Typically, the speculative memory operation request will be a read request. When data is received by centralized state machine 1900 in response to a speculative read request, that data is placed in speculative cycle response buffer 1028.

Thereafter, when centralized state machine 1900 receives a memory access read request, which is not a speculative request, centralized state machine 1900 utilizes speculative buffer checking and control logic 1026 to determine whether speculative cycle response buffer has within it data associated with the address of such a received memory access read request. That is, a speculative memory access request will not hit in the speculative cycle response buffer 1028, but rather will be passed through as a candidate for subsequent execution.

In the event that data associated with the non-speculative memory access read request address is in the speculative cycle response buffer, centralized state machine 1900 can then satisfy the request merely by retrieving the data from the speculative cycle response buffer 1028 thereby avoiding the latency associated with accessing system memory 116. It should be noted that in the event that centralized state machine 1900 receives a write request to an address which is correspondent to data with the same address in speculative cycle response buffer 1028, centralized state machine 1900 will utilize speculative buffer checking and control logic 1026 to remove such data from speculative cycle response buffer, since it is likely that the write request will change the data in system memory 116 and thus gives rise to the likelihood that the data in speculative cycle response buffer 1028 will not be current. Alternatively, centralized state machine 1900 could replace the data associated with the address in speculative cycle response buffer 1028 with the data in the write request while simultaneously writing the data to system memory 116.

Referring now to FIG. 11A2, shown is an expanded view of an embodiment of memory controller 400 wherein is contained another embodiment of a speculative memory access request generation and utilization structure and operation. FIG. 11A2 is substantially the same as the embodiment shown in FIG. 9A2, except that further shown in FIG. 11A2 is that each reorder and bank select engine 5001–505B is now associated with a respective origin-sensitive speculative memory access request cycle generator 1101–110B. Also shown is that centralized state machine 950 has been replaced by centralized state machine 1950.

Each origin-sensitive speculative memory access request cycle generator 1101–110B operates in tandem with its respectively paired reorder and bank select engine 5001–501B. Each origin-sensitive speculative memory access request cycle generator 1101–110B is respectively paired with a reorder buffer 5111–511B, and uses as input the memory access requests present in each respectively paired reorder buffer 5111–511B; furthermore, each origin-sensitive speculative memory access request cycle generator 1101–110B may also maintain cycle history in memory or registers (not shown) private to each such origin-sensitive speculative memory access request cycle generator. Each origin-sensitive speculative memory access request cycle generator 1101–110B uses algorithms that are specific to each buffer 1 through B in order to generate speculative cycle requests.

Each origin-sensitive speculative memory access request cycle generator 1101–110B places speculative cycle requests into its associated reorder buffer 5111–511B. Speculative cycle requests are reordered along with other requests by reorder and bank select engines 5001–505B and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1101–110B, which change the status flag from a default "true access" value to a value indicating "speculative access."

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or bus/source. The origin-sensitive speculative memory access request cycle generator for each buffer can employ different algorithms suited to the buses/sources. This is in contrast to a solution that looks at cycle requests from all buses/sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other buses/sources. Alternative solutions that do not allow rejection of the speculative prefetch cycles can decrease system performance when loading is high.

Further referring to FIG. 11A2, depicted is that centralized state machine 1950 has internal to it speculative buffer checking and control logic 1030 and speculative cycle response buffer 1032. As has been noted, destination-sensitive second-stage memory access request reordering device 404 receives memory requests as either speculative or true memory access requests. Thus, in light of the discussion set forth above, it is clear that centralized state machine 1950 will also receive such requests in that all memory access requests pass through it in the embodiments described herein.

Assuming that a request so received is a speculative request, centralized state machine 1950 will determine, using its control algorithms, whether the current pending memory operations in memory device buffers 8011–801D makes the execution of such speculative request advantageous. Assuming that such execution is advantageous, centralized state machine 1950 will execute the speculative memory operation request. Typically, the speculative memory operation request will be a read request. When data is received by centralized state machine 1950 in response to a speculative read request, that data is placed in speculative cycle response buffer 1032.

Thereafter, when centralized state machine 1950 receives a memory access read request, which is not a speculative request, centralized state machine 1950 utilizes speculative buffer checking and control logic 1030 to determine whether speculative cycle response buffer has within it data associated with the address of such a received memory access read request. That is, a speculative memory access request will not hit in the speculative cycle response buffer 1032, but rather will be passed through as a candidate for subsequent execution.

In the event that data associated with the non-speculative memory access read request address is in the speculative cycle response buffer, centralized state machine 1950 can then satisfy the request merely by retrieving the data from the speculative cycle response buffer 1032 thereby avoiding the latency associated with accessing system memory 116. It should be noted that in the event that centralized state machine 1950 receives a write request to an address which is correspondent to data with the same address in speculative cycle response buffer 1032, centralized state machine 1950 will utilize speculative buffer checking and control logic 1030 to remove such data from speculative cycle response buffer, since it is likely that the write request will change the data in system memory 116 and thus gives rise to the likelihood that the data in speculative cycle response buffer 1032 will not be current. Alternatively, centralized state machine 1950 could replace the data associated with the address in speculative cycle response buffer 1032 with the data in the write request while simultaneously writing the data to system memory 116.

Referring now to FIG. 11B1, shown is an expanded view of an embodiment of memory controller 400 wherein is contained another embodiment of a speculative memory access request generation and utilization structure and operation. FIG. 11B1 is substantially the same as the embodiment shown in FIG. 9B1, except that further shown in FIG. 11B1 is that each reorder and bank select engine 5001–501B is now associated with a respective origin-sensitive speculative memory access request cycle generator 1101–110B. Also shown is that centralized state machine 902 has been replaced by centralized state machine 1902.

Each origin-sensitive speculative memory access request cycle generator 1101–110B operates in tandem with its respectively paired reorder and bank select engine 5001–501B. Each origin-sensitive speculative memory access request cycle generator 1101–110B is respectively paired with a reorder buffer 5111–511B, and uses as input the memory access requests present in each respectively paired reorder buffer 5111–511B; furthermore, each origin-sensitive speculative memory access request cycle generator 1101–110B may also maintain cycle history in memory or registers (not shown) private to each such origin-sensitive speculative memory access request cycle generator. Each origin-sensitive speculative memory access request cycle generator 1101–110B uses algorithms that are specific to each buffer 1 through B in order to generate speculative cycle requests.

Each origin-sensitive speculative memory access request cycle generator 1101–110B places speculative cycle requests into its associated reorder buffer 5111–511B. Speculative cycle requests are reordered along with other requests by reorder and bank select engines 5001–501B and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1101–110B, which change the status flag from a default "true access" value to a value indicating "speculative access." In another embodiment, origin-sensitive speculative memory access request cycle generators 1101–110B communicate with their respectively paired reorder and bank select engines 5001–500B, which subsequently transmit information indicating whether certain pending requests are speculative or not over control signal lines 1–B, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or bus/source. The origin-sensitive speculative memory access request cycle generator for each buffer can employ different algorithms suited to the buses/sources. This is in contrast to a solution that looks at cycle requests from all buses/sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other buses/sources. Alternative solutions that do not allow rejection of the speculative prefetch cycles can decrease system performance when loading is high.

Further referring to FIG. 11B1, depicted is that centralized state machine 1902 has internal to it speculative buffer checking and control logic 1034 and speculative cycle response buffer 1036. As has been noted, destination-sensitive second-stage memory access request reordering device 404 receives memory requests as either speculative or true memory access requests. Thus, in light of the discussion set forth above, it is clear that centralized state machine 1902 will also receive such requests in that all memory access requests pass through it in the embodiments described herein.

Assuming that a request so received is a speculative request, centralized state machine 1902 will determine, using its control algorithms, whether the current pending memory operations in memory device buffers 8011–801D makes the execution of such speculative request advantageous. Assuming that such execution is advantageous, centralized state machine 1902 will execute the speculative memory operation request. Typically, the speculative memory operation request will be a read request. When data is received by centralized state machine 1902 in response to a speculative read request, that data is placed in speculative cycle response buffer 1036.

Thereafter, when centralized state machine 1902 receives a memory access read request, which is not a speculative request, centralized state machine 1902 utilizes speculative buffer checking and control logic 1034 to determine whether speculative cycle response buffer has within it data associated with the address of such a received memory access read request. That is, a speculative memory access request will not hit in the speculative cycle response buffer 1036, but rather will be passed through as a candidate for subsequent execution.

In the event that data associated with the non-speculative memory access read request address is in the speculative cycle response buffer, centralized state machine 1902 can then satisfy the request merely by retrieving the data from the speculative cycle response buffer 1036 thereby avoiding the latency associated with accessing system memory 116. It should be noted that in the event that centralized state machine 1902 receives a write request to an address which is correspondent to data with the same address in speculative cycle response buffer 1036, centralized state machine 1902 will utilize speculative buffer checking and control logic 1034 to remove such data from speculative cycle response buffer, since it is likely that the write request will change the data in system memory 116 and thus gives rise to the likelihood that the data in speculative cycle response buffer 1036 will not be current. Alternatively, centralized state machine 1900 could replace the data associated with the address in speculative cycle response buffer 1036 with the data in the write request while simultaneously writing the data to system memory 116.

Referring now to FIG. 11B2, shown is an expanded view of an embodiment of memory controller 400 wherein is contained another embodiment of a speculative memory access request generation and utilization structure and operation. FIG. 11B2 is substantially the same as the embodiment shown in FIG. 9B2, except that further shown in FIG. 11B2 is that each reorder and bank select engine 5001–501B is now associated with a respective origin-sensitive speculative memory access request cycle generator 1101–110B. Also shown is that centralized state machine 952 has been replaced by centralized state machine 1952.

Each origin-sensitive speculative memory access request cycle generator 1101–110B operates in tandem with its respectively paired reorder and bank select engine 5001–501B. Each origin-sensitive speculative memory access request cycle generator 1101–110B is respectively paired with a reorder buffer 5111–511B, and uses as input the memory access requests present in each respectively paired reorder buffer 5111–511B; furthermore, each origin-sensitive speculative memory access request cycle generator 1101–110B may also maintain cycle history in memory or registers (not shown) private to each such origin-sensitive speculative memory access request cycle generator. Each origin-sensitive speculative memory access request cycle generator 1101–110B uses algorithms that are specific to each buffer 1 through B in order to generate speculative cycle requests.

Each origin-sensitive speculative memory access request cycle generator 1101–110B places speculative cycle requests into its associated reorder buffer 5111–511B. Speculative cycle requests are reordered along with other requests by reorder and bank select engines 5001–501B and are ultimately presented to destination sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1101–110B, which change the status flag from a default "true access" value to a value indicating "speculative access." In another embodiment, origin-sensitive speculative memory access request cycle generators 1101–110B communicate with their respectively paired reorder and bank select engines 5001–500B, which subsequently transmit information indicating whether certain pending requests are speculative or not over control signal lines 1–B, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or bus/source. The origin-sensitive speculative memory access request cycle generator for each buffer can employ different algorithms suited to the buses/sources. This is in contrast to a solution that looks at cycle requests from all buses/sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other buses/sources. Alternative solutions that do not allow rejection of the speculative prefetch cycles can decrease system performance when loading is high.

Further referring to FIG. 11B2, depicted is that centralized state machine 1952 has internal to it speculative buffer checking and control logic 1038 and speculative cycle response buffer 1040. As has been noted, destination-sensitive second-stage memory access request reordering device 404 receives memory requests as either speculative or true memory access requests. Thus, in light of the discussion set forth above, it is clear that centralized state machine 1952 will also receive such requests in that all memory access requests pass through it in the embodiments described herein.

Assuming that a request so received is a speculative request, centralized state machine 1952 will determine, using its control algorithms, whether the current pending memory operations in memory device buffers 8011–801D makes the execution of such speculative request advantageous. Assuming that such execution is advantageous, centralized state machine 1952 will execute the speculative memory operation request. Typically, the speculative memory operation request will be a read request. When data is received by centralized state machine 1952 in response to a speculative read request, that data is placed in speculative cycle response buffer 1040.

Thereafter, when centralized state machine 1952 receives a memory access read request, which is not a speculative request, centralized state machine 1952 utilizes speculative buffer checking and control logic 1038 to determine whether speculative cycle response buffer has within it data associated with the address of such a received memory access read request. That is, a speculative memory access request will not hit in the speculative cycle response buffer 1040, but rather will be passed through as a candidate for subsequent execution.

In the event that data associated with the non-speculative memory access read request address is in the speculative cycle response buffer, centralized state machine 1952 can then satisfy the request merely by retrieving the data from the speculative cycle response buffer 1040 thereby avoiding the latency associated with accessing system memory 116. It should be noted that in the event that centralized state machine 1952 receives a write request to an address which is correspondent to data with the same address in speculative cycle response buffer 1040, centralized state machine 1952 will utilize speculative buffer checking and control logic 1038 to remove such data from speculative cycle response buffer, since it is likely that the write request will change the data in system memory 116 and thus gives rise to the likelihood that the data in speculative cycle response buffer 1040 will not be current. Alternatively, centralized state machine 1952 could replace the data associated with the address in speculative cycle response buffer 1040 with the data in the write request while simultaneously writing the data to system memory 116.

Referring now to FIG. 11C1, shown is an expanded view of an embodiment of memory controller 400 wherein is contained another embodiment of a speculative memory access request generation and utilization structure and operation. FIG. 11C1 is substantially the same as the embodiment shown in FIG. 9C1, except that further shown in FIG. 11C1 is that each reorder and bank select engine 5001–501B is now associated with a respective origin-sensitive speculative memory access request cycle generator 1101–110B. Also shown is that centralized state machine 904 has been replaced by centralized state machine 1904.

Each origin-sensitive speculative memory access request cycle generator 1101–110B operates in tandem with its respectively paired reorder and bank select engine 5001–501B. Each origin-sensitive speculative memory access request cycle generator 1101–110B is respectively paired with a reorder buffer 5111–511B, and uses as input the memory access requests present in each respectively paired reorder buffer 5111–511B; furthermore, each origin-sensitive speculative memory access request cycle generator 1101–110B may also maintain cycle history in memory or registers (not shown) private to each such origin-sensitive speculative memory access request cycle generator. Each origin-sensitive speculative memory access request cycle generator 1101–110B uses algorithms that are specific to each buffer 1 through B in order to generate speculative cycle requests.

Each origin-sensitive speculative memory access request cycle generator 1101–110B places speculative cycle requests into its associated reorder buffer 5111–511B. Speculative cycle requests are reordered along with other requests by reorder and bank select engines 5001–501B and are ultimately presented to destination sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1101–110B, which change the status flag from a default "true access" value to a value indicating "speculative access." In another embodiment, origin-sensitive speculative memory access request cycle generators 1101–110B communicate with their respectively paired reorder and bank select engines 5001–500B, which subsequently transmit information indicating whether certain pending requests are speculative or not over control signal lines 1–B, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or bus/source. The origin-sensitive speculative memory access request cycle generator for each buffer can employ different algorithms suited to the buses/sources. This is in contrast to a solution that looks at cycle requests from all buses/sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other buses/sources. Alternative solutions that do not allow rejection of the speculative prefetch cycles can decrease system performance when loading is high.

Further referring to FIG. 11C1, depicted is that centralized state machine 1904 has internal to it speculative buffer checking and control logic 1042 and speculative cycle response buffer 1044. As has been noted, destination-sensitive second-stage memory access request reordering device 404 receives memory requests as either speculative or true memory access requests. Thus, in light of the discussion set forth above, it is clear that centralized state machine 1904 will also receive such requests in that all memory access requests pass through it in the embodiments described herein.

Assuming that a request so received is a speculative request, centralized state machine 1904 will determine, using its control algorithms, whether the current pending memory operations in memory device buffers 8011–801D makes the execution of such speculative request advantageous. Assuming that such execution is advantageous, centralized state machine 1904 will execute the speculative memory operation request. Typically, the speculative memory operation request will be a read request. When data is received by centralized state machine 1904 in response to a speculative read request, that data is placed in speculative cycle response buffer 1044.

Thereafter, when centralized state machine 1904 receives a memory access read request, which is not a speculative request, centralized state machine 1904 utilizes speculative buffer checking and control logic 1042 to determine whether speculative cycle response buffer has within it data associated with the address of such a received memory access read request. That is, a speculative memory access request will not hit in the speculative cycle response buffer 1044, but rather will be passed through as a candidate for subsequent execution.

In the event that data associated with the non-speculative memory access read request address is in the speculative cycle response buffer, centralized state machine 1904 can then satisfy the request merely by retrieving the data from the speculative cycle response buffer 1044 thereby avoiding the latency associated with accessing system memory 116. It should be noted that in the event that centralized state machine 1904 receives a write request to an address which is correspondent to data with the same address in speculative cycle response buffer 1044, centralized state machine 1904 will utilize speculative buffer checking and control logic 1042 to remove such data from speculative cycle response buffer, since it is likely that the write request will change the data in system memory 116 and thus gives rise to the likelihood that the data in speculative cycle response buffer 1044 will not be current. Alternatively, centralized state machine 1904 could replace the data associated with the address in speculative cycle response buffer 1044 with the data in the write request while simultaneously writing the data to system memory 116.

Referring now to FIG. 11C2, shown is an expanded view of an embodiment of memory controller 400 wherein is contained another embodiment of a speculative memory access request generation and utilization structure and operation. FIG. 11C2 is substantially the same as the embodiment shown in FIG. 9C2, except that further shown in FIG. 11C2 is that each reorder and bank select engine 5001–501B is now associated with a respective origin-sensitive speculative memory access request cycle generator 1101–110B. Also shown is that centralized state machine 954 has been replaced by centralized state machine 1954.

Each origin-sensitive speculative memory access request cycle generator 1101–110B operates in tandem with its respectively paired reorder and bank select engine 5001–501B. Each origin-sensitive speculative memory access request cycle generator 1101–110B is respectively paired with a reorder buffer 5111–511B, and uses as input the memory access requests present in each respectively paired reorder buffer 5111–511B; furthermore, each origin-sensitive speculative memory access request cycle generator 1101–110B may also maintain cycle history in memory or registers (not shown) private to each such origin-sensitive speculative memory access request cycle generator. Each origin-sensitive speculative memory access request cycle generator 1101–110B uses algorithms that are specific to each buffer 1 through B in order to generate speculative cycle requests.

Each origin-sensitive speculative memory access request cycle generator 1101–110B places speculative cycle requests into its associated reorder buffer 5111–511B. Speculative cycle requests are reordered along with other requests by reorder and bank select engines 5001–501B and are ultimately presented to destination-sensitive second-stage memory access request reordering device 404 as potential memory access candidates in the fashion described above. In one embodiment, each memory operation candidate is flagged with information that characterizes its relationship to the last cycle request accepted by the second stage, and also with a status flag indicating whether the candidate is a true memory operation request or a speculative memory access, or cycle, request. Such flagging can be accomplished by use of tags 502, described above, and is performed by speculative memory access request cycle generator 1101–110B, which change the status flag from a default "true access" value to a value indicating "speculative access." In another embodiment, origin-sensitive speculative memory access request cycle generators 1101–110B communicate with their respectively paired reorder and bank select engines 5001–500B, which subsequently transmit information indicating whether certain pending requests are speculative or not over control signal lines 1–B, thereby eliminating the need to add on explicit flags (or tags) to each request.

For each active cycle request, destination-sensitive second-stage memory access request reordering device 404 uses a combination of the priority of the requester, the address status, the speculative status, the current state of the DRAM, and any other data which may be present, such as that described in relation to tags 502, above, for determining which candidate is selected as the next cycle issued to the DRAM (that is destination-sensitive second-stage memory access request reordering device 404 engages in the activity described above with the additional capability of responding to and taking notice of requests marked as speculative). In one embodiment, destination-sensitive second-stage memory access request reordering device 404 uses a "cost based" algorithm for determining which candidate is to be selected as the next memory access request cycle issued to a particular DRAM 1301–130D. A high cost is assigned to operations that will take longer to complete, and a low cost is assigned to operations that will be completed sooner (when such operations are compared to system memory state, and other information gleaned from other components within the system as has been discussed above). Such cost assessments may be further modified by the priority of the memory request initiator, and/or the speculative nature (real or speculative) of a request.

Destination-sensitive second-stage memory access request reordering device 404 may choose to disregard a speculative request when the cost of issuing the request would be high in comparison to the cost of other requests pending. The ability to discard the speculative requests under speculative loading situations reduces the worst case effects of speculative memory access request cycles while allowing them to occur when they can provide benefit at low cost.

A key advantage of the foregoing described embodiment is that this embodiment allows each origin-sensitive speculative memory access request cycle generator algorithm to be customized for each individual reorder buffer, or bus/source. The origin-sensitive speculative memory access request cycle generator for each buffer can employ different algorithms suited to the buses/sources. This is in contrast to a solution that looks at cycle requests from all buses/sources lumped together and attempts to make cycle predictions from a unified request buffer.

The origin-sensitive speculative memory access request cycle generator paired with a respective reorder buffer embodiment also allows the benefits of speculative memory access request cycles to be obtained while at the same time eliminating the worst case interference problems. Essential to eliminating the adverse impact of speculative memory access request cycles is the ability of destination-sensitive second-stage memory access request reordering device 404 to discard speculative memory operation requests when loading dictates. This ability is enabled because the destination-sensitive second-stage has the information as to the speculative nature of the request, the address (page) status with respect to the last cycle, the state of any one or more DRAMs 1301–130D present, and the outstanding requests from all other uses/sources. Alternative solutions that do not allow rejection of the speculative refetch cycles can decrease system performance when loading is high.

Further referring to FIG. 11C2, depicted is that centralized state machine 1954 has internal to it speculative buffer checking and control logic 1046 and speculative cycle response buffer 1048. As has been noted, destination-sensitive second-stage memory access request reordering device 404 receives memory requests as either speculative or true memory access requests. Thus, in light of the discussion set forth above, it is clear that centralized state machine 1954 will also receive such requests in that all memory access requests pass through it in the embodiments described herein.

Assuming that a request so received is a speculative request, centralized state machine 1954 will determine, using its control algorithms, whether the current pending memory operations in memory device buffers 8011–801D makes the execution of such speculative request advantageous. Assuming that such execution is advantageous, centralized state machine 1954 will execute the speculative memory operation request. Typically, the speculative memory operation request will be a read request. When data is received by centralized state machine 1954 in response to a speculative read request, that data is placed in speculative cycle response buffer 1048.

Thereafter, when centralized state machine 1954 receives a memory access read request, which is not a speculative request, centralized state machine 1954 utilizes speculative buffer checking and control logic 1046 to determine whether speculative cycle response buffer has within it data associated with the address of such a received memory access read request. That is, a speculative memory access request will not hit in the speculative cycle response buffer 1048, but rather will be passed through as a candidate for subsequent execution.

In the event that data associated with the non-speculative memory access read request address is in the speculative cycle response buffer, centralized state machine 1954 can then satisfy the request merely by retrieving the data from the speculative cycle response buffer 1048 thereby avoiding the latency associated with accessing system memory 116. It should be noted that in the event that centralized state machine 1954 receives a write request to an address which is correspondent to data with the same address in speculative cycle response buffer 1048, centralized state machine 1954 will utilize speculative buffer checking and control logic 1046 to remove such data from speculative cycle response buffer, since it is likely that the write request will change the data in system memory 116 and thus gives rise to the likelihood that the data in speculative cycle response buffer 1048 will not be current. Alternatively, centralized state machine 1954 could replace the data associated with the address in speculative cycle response buffer 1048 with the data in the write request while simultaneously writing the data to system memory 116.

The foregoing detailed description has set forth various embodiments of the present invention via the use of block diagrams, pictographic representations, and examples. It will be understood as notorious by those within the art that each component, step, and operation illustrated by the use of block diagrams, pictographic representations, and examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this specification.

Other Embodiments

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

For example, while the foregoing described embodiments have been described in the context of a single processor for the sake of clarity, it will be understood by those within the art that the present invention could be used in multiple processor environments. Accordingly, the described architectures are not intended to be limiting.

For example, it was mentioned in relation to the foregoing described embodiments that the memory status lines need not equate to physically connected devices; that is, it was explained that embodiments exist whereby operable connection is achieved and memory status obtained by system components (e.g., centralized state machines, device arbiter and state engines, or memory controllers) tracking past memory access activities and inferring the status of one or more memory devices from that past activity. Likewise, embodiments exist whereby other of the above-described connections can be achieved by analogous logical associations such that the desired functionality of the above-described connections can be achieved, and such alternate embodiments are intended to be covered by such connectivity of the above-set-forth embodiments; that is, it is to be understood that any reference to connection between components, as used herein, is intended to be representative of both the physical and logical connections. Accordingly, the described architectures are not intended to be limiting.

Also for example, while the embodiments have been described in the context of the AGP interface standard, it will be recognized that the embodiments herein can be applied to other similar problems which exist in other non-AGP interface standard systems wherein similar problems analogous to those solved by the present invention exist. For example, data processing systems wherein the AGP interface standard is not utilized, such as standard PCI and ISA systems. Thus, the specific protocols described are not intended to be limiting.

The foregoing described embodiments wherein the different components are contained within, or connected with, different other components (e.g., the speculative memory request response buffer checking and control logic unit contained within centralized state machine). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles.

What is claimed is:

1. A system comprising:

a first-stage origin-sensitive memory access request reordering device, wherein said first-stage origin-sensitive memory access request reordering device further includes:

one or more reorder and bank select engines, at least one of said one or more reorder and bank select engines associated with at least one origin of one or more memory access requests, wherein the at least one of said one or more reorder and bank select engines associated with at least one origin of one or more memory access requests further includes:

one or more reorder buffers, at least one of said one or more reorder buffers associated with the at least one origin of one or more memory access requests, wherein the at least one of said one or more reorder buffers associated with the at least one origin of one or more memory access requests further includes:

at least one of said one or more reorder buffers structured to receive source information, wherein said at least one of said one or more reorder buffers structured to receive source information further include:

at least one of said one or more reorder buffers structured to receive at least one source informant from a group comprising an indicator of an initiator of a memory access request, an ordinal number delimiter of a memory access request, and a memory access request tag wherein the tag is selected from a group comprising a tag indicative of a speculative nature of a memory access request and a tag indicative of a priority of a memory access request, and at least one of said one or more reorder and bank select engines operably coupled to at least one of said one or more reorder buffers; and a second-stage destination-sensitive memory access request reordering device operably coupled to said first-stage origin-sensitive memory access request reordering device.

2. The system of claim 1, wherein said one or more reorder buffers, at least one of said one or more reorder buffers associated with the at least one origin of one or more memory access requests, further include:

said at least one of said one or more reorder buffers associated with at least one bus.

3. The system of claim 2, wherein the at least one bus further includes: at least one processing unit bus.

4. The system of claim 2, wherein the at least one bus further includes: at least one graphics bus.

5. The system of claim 2, wherein the at least one bus further includes: at least one input-output bus.

6. The system of claim 1, wherein said first-stage origin-sensitive memory access request reordering device further includes:

one or more reorder and bank select engines, at least one of said one or more reorder and bank select engines associated with at least one origin of one or more memory access requests.

7. The system of claim 6, wherein said one or more reorder and bank select engines, at least one of said one or more reorder and bank select engines associated with at least one origin of one or more memory access requests, further include:

one or more best-choice registers, at least one of said one or more best choice registers associated with the at least one origin of one or more memory access requests; and at least one of said one or more reorder and bank select engines operably coupled to at least one of said one or more best-choice registers.

8. The system of claim 7, wherein said one or more best-choice registers, at least one of said one or more best choice registers associated with the at least one origin of one or more memory access requests, further include:

at least one of said one or more best choice registers associated with at least one source of memory access requests.

9. The system of claim 8, wherein the at least one source of memory access requests further includes:

at least one source from a group comprising a microprocessor, a graphics controller, a device operably connected to an input-output bus, an isochronous-stream device, and an input-output card.

10. The system of claim 7, wherein said one or more best-choice registers, at least one of said one or more best choice registers associated with the at least one origin of one or more memory access requests further include:

at least one of said one or more best-choice registers structured to receive source information.

11. The system of claim 10, wherein said at least one of said one or more best-choice registers structured to receive source information further include:

said at least one of said one or more best-choice registers structured to receive at least one source informant from the group comprising an indicator of an initiator of a memory access request, an ordinal number delimiter of a memory access request, and a memory access request tag wherein the tag is selected from the group comprising a tag indicative of a speculative nature of a memory access request and a tag indicative of a priority of a memory access request.

12. The system of claim 7, wherein said at least one of said one or more reorder and bank select engines operably coupled to at least one of said one or more best-choice registers further include:

said one or more reorder and bank select engines operably connected to said one or more best choice registers such that control information related to the at least one origin of one or more memory access requests can be conveyed.

13. The system of claim 1, wherein said second-stage destination-sensitive memory access request reordering device operably coupled to said first-stage origin-sensitive memory access request reordering device further includes:

a centralized state machine; and said centralized state machine operably connected to one or more system memory devices.

14. The system of claim 13, wherein said centralized state machine further includes:

said centralized state machine operably connected to one or more reorder and bank select engines of said first-stage origin-sensitive memory access request reordering device.

15. The system of claim 14, wherein said centralized state machine operably connected to one or more reorder and bank select engines of said first-stage origin-sensitive memory access request reordering device further includes:

one or more control lines connecting said centralized state machine to at least one of the one or more reorder and bank select engines of said first-stage origin-sensitive memory access request reordering device.

16. The system of claim 15, further comprising:

said centralized state machine structured such that control information can be received from at least one of the one or more reorder and bank select engines of said first-stage origin-sensitive memory access request reordering device over said one or more control lines connecting said centralized state machine to the at least one of the one or more reorder and bank select engines of said first-stage origin-sensitive memory access request reordering device.

17. The system of claim 13, wherein said centralized state machine further includes:

said centralized state machine structured to accept memory access requests.

18. The system of claim 17, wherein said centralized state machine structured to accept memory access requests further includes:
   said centralized state machine structured to accept one or more memory access requests having associated origin information.

19. The system of claim 18, wherein said centralized state machine structured to accept one or more memory access requests having associated origin information further includes:
   said centralized state machine structured such that one or more specific inputs to said centralized state machine are associated with one or more specific origins of the one or more specific memory access requests.

20. The system of claim 19, wherein said centralized state machine structured such that one or more specific inputs to said centralized state machine are associated with one or more specific origins of the one or more specific memory access requests further includes:
   said centralized state machine structured such that the one or more specific inputs to said centralized state machine are associated with one or more specific reorder buffers of said first-stage origin-sensitive memory access request reordering device.

21. The system of claim 20, wherein the one or more specific reorder buffers of said first-stage origin-sensitive memory access request reordering device further include:
   the one or more specific reorder buffers of said first-stage origin-sensitive memory access request reordering device associated with one or more buses over which one or more specific memory access requests traveled.

22. The system of claim 20, wherein the one or more specific reorder buffers of said first-stage origin-sensitive memory access request reordering device further include:
   the one or more specific reorder buffers of said first-stage origin-sensitive memory access request reordering device associated with one or more sources of the one or more specific memory access requests.

23. The system of claim 19, wherein said centralized state machine structured such that one or more specific inputs to said centralized state machine are associated with one or more specific origins of the one or more specific memory access requests further includes:
   said centralized state machine structured such that the one or more specific inputs to said centralized state machine are associated with one or more best-choice registers of said first-stage origin-sensitive memory access request reordering device.

24. The system of claim 23, wherein the one or more best-choice registers of said first-stage origin-sensitive memory access request reordering device further include:
   the one or more best-choice registers of said first-stage origin-sensitive memory access request reordering device associated with one or more buses over which the one or more specific memory access requests traveled.

25. The system of claim 23, wherein the one or more best-choice registers of said first-stage origin-sensitive memory access request reordering device further include:
   the one or more best-choice registers of said first-stage origin-sensitive memory access request reordering device associated with sources of the one or more specific memory access request.

26. The system of claim 18, wherein said centralized state machine structured to accept one or more memory access requests having associated origin information further includes:
   said centralized state machine structured to receive memory access request source information.

27. The system of claim 26, wherein said centralized state machine structured to receive memory access request source information further includes:
   said centralized state machine structured to receive at least one source informant from the group comprising an indicator of the initiator of a memory access request, an ordinal number delimiter of a memory access request, a memory access request tag selected from the group comprising, a tag indicative of a priority of a source of a memory access request and a tag indicative of a speculative nature of a memory access request.

28. The system of claim 13, wherein said centralized state machine operably connected to one or more memory devices further includes:
   said centralized state machine operably connected to at least one interface of the one or more system memory devices such that the state of the one or more system memory devices may be received.

29. The system of claim 20, wherein said centralized state machine operably connected to at least one interface of the one or more system memory devices such that the state of the one or more system memory devices may be received further includes:
   said centralized state machine operably connected to at least one interface of the one or more system memory devices via one or more memory status lines.

30. The system of claim 28, further comprising:
   at least one memory device buffer having at least one input and at least one output;
   the at least one input of said at least one memory device buffer operably coupled to at least one output of said centralized state machine; and
   the at least one output of said at least one memory device buffer operably connected to at least one interface of the one or more system memory devices.

31. The system of claim 30, wherein the one or more system memory devices further include:
   one or more DRAM chips.

32. The system of claim 30, wherein the one or more system memory devices further include:
   one or more banks of memory.

33. The system of claim 13, wherein said centralized state machine operably connected to one or more memory devices further includes:
   one or more device arbiter and state engines.

34. The system of claim 33, wherein said one or more device arbiter and state engines further include:
   at least one of said one or more device arbiter and state engines operably connected to one or more reorder and bank select engines of said first-stage origin-sensitive memory access request reordering device.

35. The system of claim 34, wherein said at least one of said one or more device arbiter and state engines operably connected to one or more reorder and bank select engines of said first-stage origin-sensitive memory access request reordering device further includes:
   one or more control lines connecting said at least one of said one or more device arbiter and state engines to at least one of the one or more reorder and bank select engines of said first-stage origin-sensitive memory access request reordering device.

36. The system of claim 35, further comprising:
   said at least one of said one or more device arbiter and state engines structured such that control information can be received from at least one of the one or more reorder and bank select engines of said first-stage origin-sensitive memory access request reordering device over said one or more control lines connecting said at least one of said one or more device arbiter and state machines to the one or more reorder and bank select engines of said first-stage origin-sensitive memory access request reordering device.

37. The system of claim 33, wherein said one or more device arbiter and state engines further include:
at least one of said one or more device arbiter and state engines structured to accept memory access requests.

38. The system of claim 37, wherein said at least one of said one or more device arbiter and state engines structured to accept memory access requests further includes:
said at least one of said one or more device arbiter and state engines structured to accept memory access requests having associated memory access request origin information.

39. The system of claim 38, wherein said at least one of said one or more device arbiter and state engines structured to accept memory access requests having associated memory access request origin information further includes:
said at least one of said one or more device arbiter and state engines structured such that one or more specific inputs to said at least one of said one or more device arbiter and state engines are associated with one or more specific origins of one or more specific memory access requests.

40. The system of claim 39, wherein said at least one of said one or more device arbiter and state engines structured such that one or more specific inputs to said at least one of said one or more device arbiter and state engines are associated with one or more specific origins of one or more specific memory access requests further includes:
said at least one of said one or more device arbiter and state engines structured such that at least one of the one or more specific inputs to said at least one of said one or more device arbiter and state engines is associated with at least one specific reorder buffer of said first-stage origin-sensitive memory access request reordering device.

41. The system of claim 40, wherein the at least one specific reorder buffer of said first-stage origin-sensitive memory access request reordering device further includes:
the at least one specific reorder buffer of said first-stage origin-sensitive memory access request reordering device associated with at least one bus over which the one or more specific memory access requests travel.

42. The system of claim 41, wherein the at least one specific reorder buffer of said first-stage origin-sensitive memory access request reordering device further includes:
the at least one specific reorder buffer of said first-stage origin-sensitive memory access request reordering device associated with at least one source of the one or more specific memory access requests.

43. The system of claim 39, wherein said at least one of said one or more device arbiter and state engines structured such that one or more specific inputs to said at least one of said one or more device arbiter and state engines are associated with one or more specific origins of one or more specific memory access requests further includes:
said at least one of said one or more device arbiter and state engines structured such that at least one of the one or more specific inputs to said one or more device arbiter and state engines is associated with at least one or more best-choice registers of said first-stage origin-sensitive memory access request reordering device associated with at least one specific origin of the one or more specific memory access requests.

44. The system of claim 43, wherein the at least one specific origin of the one or more specific memory access requests further includes:
at least one bus over which the one or more specific memory access requests travel.

45. The system of claim 43, wherein the at least one specific origin of the one or more specific memory access requests further includes:
at least one source of the one or more specific memory access requests.

46. The system of claim 38, wherein said at least one of said one or more device arbiter and state engines structured to accept memory access requests having associated memory access request origin information further includes:
said at least one of said one or more device arbiter and state engines structured to receive memory access request source information.

47. The system of claim 46, wherein said at least one of said one or more device arbiter and state engines structured to receive memory access request source information further includes:
said at least one of said one or more device arbiter and state engines structured to receive at least one source informant from the group comprising an indicator of the initiator of a memory access request, an ordinal number delimiter of a memory access request, and a memory access request tag selected from the group comprising a tag indicative of a priority of a source of a memory access request and a tag indicative of a speculative nature of a memory access request.

48. The system of claim 13, wherein said centralized state machine operably connected to one or more memory devices further includes:
one or more device arbiter and state engines operably connected to at least one interface of the one or more system memory devices such that the state of the one or more system memory devices may be received by at least one of the one or more device arbiter and state engines.

49. The system of claim 48, wherein said one or more device arbiter and state engines operably connected to at least one interface of the one or more system memory devices such that the state of the one or more system memory devices may be received by at least one of the one or more device arbiter and state engines further include:
at least one of said one or more device arbiter and state engines connected to at least one interface of the one or more memory devices via one or more memory status lines.

50. The system of claim 48, further comprising:
one or more memory device buffers with at least one memory device buffer having at least one input and at least one output;
the at least one input of said at least one memory device buffer operably coupled to at least one output of said one or more device arbiter and state engines; and
the at least one output of said at least one memory device buffer operably connected to at least one interface of at least one of the one or more system memory devices.

51. The system of claim 50, wherein the one or more system memory devices further include:
one or more DRAM chips.

52. The system of claim 50, wherein the one or more system memory devices further include:
one or more banks of memory.

53. The system of claim 1, wherein said system further comprises:
a processing unit,
a first bridge,
a system memory,
a graphics bus, and
an input-output bus.

54. The system of claim 53, further comprising:
a graphics controller;
a local frame buffer;
a display device; and
an input-output bridge.

55. A method comprising:
monitoring one or more origin-related memory access requests;
reordering the one or more origin-related memory access requests, wherein said reordering the one or more origin-related memory access requests further includes:
reordering the one or more origin-related memory access requests on the basis of origin-related information, wherein said reordering the one or more origin-related memory access requests on the basis of origin-related information further includes:
reordering the one or more origin-related memory access requests on the basis of at least one source-related informant selected from a group comprising,
at least one source indicator associated with the one or more origin-related memory access requests,
at least one ordinal indicator associated with the one or more origin-related memory access requests, and
at least one tag associated with the one or more origin-related memory access requests wherein the at least one tag comprises at least one tag selected from a group comprising a tag indicative of the priority of the one or more origin-related memory access requests and a tag indicative of a speculative nature of the one or more source origin-related memory access requests;
receiving the reordered one or more origin-related memory access requests; and
executing the one or more origin-related memory access requests.

56. The method of claim 55, wherein said monitoring one or more origin-related memory access requests further includes:
monitoring one or more memory access requests associated with one or more specific origins.

57. The method of claim 56, wherein said monitoring one or more memory access requests associated with one or more specific origins further includes:
monitoring one or more reorder buffers associated with the one or more specific origins.

58. The method of claim 57, wherein said monitoring one or more reorder buffers associated with the one or more specific origins further includes:
monitoring one or more reorder buffers associated with one or more specific buses over which the one or more memory access requests travel.

59. The method of claim 57, wherein said monitoring one or more reorder buffers associated with the one or more specific origins further includes:
monitoring one or more reorder buffers associated with one or more specific sources from which the one or more memory access requests originated.

60. The method of claim 56, wherein said reordering the one or more origin-related memory access requests further includes:
reordering the one or more origin-related memory access requests on the basis of the one or more specific origins.

61. The method of claim 55, further comprising:
presenting at least one of the reordered one or more original-related memory access requests for execution.

62. The method of claim 61, wherein said presenting at least one of the
reordered one or more origin-related memory access requests for execution further includes:
arranging the one or more original related memory access requests in a reorder buffer such that the at least one of the reordered one or more original-related memory access requests will be the request next retrieved from the reorder buffer.

63. The method of claim 55, further comprising:
selecting at least one of the one or more original-related memory access requests for execution, where said selecting is achieved by one or more best choice registers.

64. The method of claim 63, wherein said selecting at least one of the one or more original related memory access requests for execution, where said selecting is achieved by one or more best choice registers, further includes:
communicating control information to at least one of the one or more best choice registers; and
said one or more best choice registers selecting at least one of the one or more original related memory access requests for execution in response to the control information.

65. The method of claim 55, wherein said receiving the reordered one or more origin-related memory access requests further includes:
receiving one or more memory access requests associated with one or more specific origins.

66. The method of claim 60, wherein said receiving one or more memory access requests associated with one or more specific origins further includes:
receiving the one or more memory access requests from one or more reorder buffers associated with the one or more specific origins.

67. The method of claim 66, wherein said receiving the one or more memory access requests from one or more reorder buffers associated with the one or more specific origins further includes:
receiving the one or more memory access requests from one or more reorder buffers associated with one or more specific buses over which the one or more memory access requests travel.

68. The method of claim 66, wherein said receiving the one or more memory access requests from one or more reorder buffers associated with the one or more specific origins further includes:
receiving the one or more memory access requests from one or more reorder buffers associated with one or more specific sources from which the one or more memory access requests originated.

69. The method of claim 55, wherein said executing the one or more origin-related memory access requests further includes:
   executing at least one of the one or more origin-related memory access requests on basis of the one or more specific origins.

70. The method of claim 55, wherein said executing the one or more origin-related memory access requests further includes:
   executing at least one of the one or more origin-related memory access requests on the basis of origin-related information.

71. The method of claim 70, wherein said executing at least one of the one or more origin-related memory access requests on the basis of origin-related information further includes:
   executing the at least one of the one or more origin-related memory access requests on the basis of at least one source-related informant selected from the group comprising
      at least one source indicator associated with the one or more origin-related access requests,
      at least one ordinal indicator associated with the one or more origin-related access requests, and
      at least one tag associated with the one or more origin-related access requests wherein the at least one tag comprises at least one tag selected from the group comprising a tag indicative of the priority of the one or more origin-related memory access requests and a tag indicative of a speculative nature of the one or more origin-related memory access requests.

72. The method of claim 70, wherein said executing at least one of the one or more origin-related memory access requests on the basis of origin-related information further includes:
   receiving status information from one or more memory devices; and
   executing at least one of one or more speculative memory access requests in response to the status information from one or more memory devices.

73. The method of claim 72, wherein said receiving status information from one or more memory devices further includes:
   receiving status information from one or more DRAMs.

74. The method of claim 72, wherein said receiving status information from one or more memory devices further includes:
   receiving status information from one or more banks of memory.

75. The method of claim 72, wherein said executing at least one of the one or more speculative memory access requests in response to the status information from one or more memory devices further includes:
   determining contents of one or more memory device buffers; and
   executing the at least one of the one or more speculative memory access requests in response to the status information from one or more memory devices and the contents of the one or more memory device buffers.

* * * * *